United States Patent
Kondou et al.

(10) Patent No.: US 11,409,836 B2
(45) Date of Patent: Aug. 9, 2022

(54) OPTIMIZATION PROBLEM ARITHMETIC METHOD AND OPTIMIZATION PROBLEM ARITHMETIC APPARATUS

(71) Applicant: FUJITSU LIMITED, Kawasaki (JP)

(72) Inventors: Hiroshi Kondou, Yokohama (JP); Hiroshi Yagi, Yokohama (JP); Noriyuki Itakura, Yokohama (JP); Noriaki Shimada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 146 days.

(21) Appl. No.: 16/572,783

(22) Filed: Sep. 17, 2019

(65) Prior Publication Data
US 2020/0089729 A1    Mar. 19, 2020

(30) Foreign Application Priority Data
Sep. 19, 2018   (JP) .............................. JP2018-175387

(51) Int. Cl.
*G06F 17/11*   (2006.01)
*G06F 7/57*   (2006.01)

(52) U.S. Cl.
CPC ................ *G06F 17/11* (2013.01); *G06F 7/57* (2013.01)

(58) Field of Classification Search
CPC .. G06N 5/003; G06N 10/00; G06F 17/11–13; G06F 17/544;
(Continued)

(56) References Cited

U.S. PATENT DOCUMENTS

| | | | |
|---|---|---|---|
| 8,589,935 B2* | 11/2013 | Prasanna ............... | G06F 9/5072 718/104 |
| 2005/0050372 A1* | 3/2005 | Hagiwara ........... | G06F 9/30167 713/320 |

(Continued)

FOREIGN PATENT DOCUMENTS

| | | |
|---|---|---|
| JP | 2010-122758 | 6/2010 |
| JP | 2011-237844 | 11/2011 |

(Continued)

OTHER PUBLICATIONS

Fujitsu, Lab. "Fujitsu Technology to Solve Combinatorial Optimization Problems for Medium-Sized Drug Discovery." Fujitsu Technology to Solve Combinatorial Optimization Problems for Medium-Sized Drug Discovery—www.fujitsu.com/global/about/resources/news/press-releases/2018/0918-0 (Year: 2018) (Year: 2018).*

(Continued)

*Primary Examiner* — Matthew D Sandifer
*Assistant Examiner* — Huy Duong
(74) *Attorney, Agent, or Firm* — Fujitsu Patent Center

(57) ABSTRACT

A computer-implemented optimization problem arithmetic method includes determining, based on management information indicating a partition mode that defines a logically divided state of each of a plurality of arithmetic circuits and utilization information relating to each of the plurality of arithmetic circuits, a partition mode of each of the plurality of arithmetic circuits, receiving a combinatorial optimization problem, selecting, based on information relating to scale or requested accuracy of the combinatorial optimization problem and the determined partition mode of each of the plurality of arithmetic units, a first arithmetic circuit from among the plurality of arithmetic circuits, and causing the selected first arithmetic circuit to execute arithmetic operation of the combinatorial optimization problem based (Continued)

on a first partition mode determined as the partition mode of the first arithmetic circuit.

17 Claims, 33 Drawing Sheets

(58) Field of Classification Search
CPC ........... G06F 9/50–5005; G06F 9/5027; G06F 9/5044–505; G06F 9/5061; G06F 9/5077; G06F 9/3897; G06F 9/5038
See application file for complete search history.

(56) References Cited

U.S. PATENT DOCUMENTS

| | | | |
|---|---|---|---|
| 2009/0282411 A1* | 11/2009 | Carteri | G06F 9/5038 718/102 |
| 2010/0125847 A1 | 5/2010 | Hayashi | |
| 2011/0276982 A1 | 11/2011 | Nakayama et al. | |
| 2015/0278408 A1* | 10/2015 | Yoshimura | G06F 30/20 703/2 |
| 2016/0063391 A1* | 3/2016 | Hayashi | G06F 7/588 706/11 |
| 2018/0247691 A1 | 8/2018 | Okuyama et al. | |

FOREIGN PATENT DOCUMENTS

| | | |
|---|---|---|
| WO | 2017/033326 | 3/2017 |
| WO | 2017/037903 A1 | 3/2017 |

OTHER PUBLICATIONS

USOA—Non-Final Office Action of related U.S. Appl. No. 16/569,643 dated Jun. 21, 2021 [pending].
USOA—Notice of Allowance of related U.S. Appl. No. 16/569,643 dated Oct. 28, 2021 [allowed].
JPOA—Office Action of Japanese Patent Application No. 2018-175400 dated May 10, 2022 with Full Machine Translation.

* cited by examiner

SCALE: 2k BITS
ACCURACY: 64 BITS
LFE NUMBER: 2k

FIG. 13

LFE0

| | | | | 3d1 |
|---|---|---|---|---|
| $W_{0,4095}$ | | $W_{0,4094}$ | | |
| $W_{0,4093}$ | | $W_{0,4092}$ | | |
| ... | | ... | | |
| $W_{0,3}$ | | $W_{0,2}$ | | |
| $W_{0,1}$ | | $W_{0,0}$ | | |

63    47    31    15

LFE1

| | | | | 3d2 |
|---|---|---|---|---|
| $W_{1,4095}$ | | $W_{1,4094}$ | | |
| $W_{1,4093}$ | | $W_{1,4092}$ | | |
| ... | | ... | | |
| $W_{1,3}$ | | $W_{1,2}$ | | |
| $W_{1,1}$ | | $W_{1,0}$ | | |

63    47    31    15

⋮

LFE4095

| | | | | 3du |
|---|---|---|---|---|
| $W_{4095,4095}$ | | $W_{4095,4094}$ | | |
| $W_{4095,4093}$ | | $W_{4095,4092}$ | | |
| ... | | ... | | |
| $W_{4095,3}$ | | $W_{4095,2}$ | | |
| $W_{4095,1}$ | | $W_{4095,0}$ | | |

63    47    31    15

SCALE: 4k BITS
ACCURACY: 32 BITS
LFE NUMBER: 4k

FIG. 14

LFE0

| | | | | |
|---|---|---|---|---|
| $W_{0,8191}$ | $W_{0,8190}$ | $W_{0,8189}$ | $W_{0,8188}$ | ~4d1 |
| $W_{0,8187}$ | $W_{0,8186}$ | $W_{0,8185}$ | $W_{0,8184}$ | |
| ... | ... | ... | ... | |
| $W_{0,7}$ | $W_{0,6}$ | $W_{0,5}$ | $W_{0,4}$ | |
| $W_{0,3}$ | $W_{0,2}$ | $W_{0,1}$ | $W_{0,0}$ | |

63    47    31    15

LFE1

| | | | | |
|---|---|---|---|---|
| $W_{1,8191}$ | $W_{1,8190}$ | $W_{1,8189}$ | $W_{1,8188}$ | ~4d2 |
| $W_{1,8187}$ | $W_{1,8186}$ | $W_{1,8185}$ | $W_{1,8184}$ | |
| ... | ... | ... | ... | |
| $W_{1,7}$ | $W_{1,6}$ | $W_{1,5}$ | $W_{1,4}$ | |
| $W_{1,3}$ | $W_{1,2}$ | $W_{1,1}$ | $W_{1,0}$ | |

63    47    31    15

⋮

LFE8191

| | | | | |
|---|---|---|---|---|
| $W_{8191,8191}$ | $W_{8191,8190}$ | $W_{8191,8189}$ | $W_{8191,8188}$ | ~4dn |
| $W_{8191,8187}$ | $W_{8191,8186}$ | $W_{8191,8185}$ | $W_{8191,8184}$ | |
| ... | ... | ... | ... | |
| $W_{8191,7}$ | $W_{8191,6}$ | $W_{8191,5}$ | $W_{8191,4}$ | |
| $W_{8191,3}$ | $W_{8191,2}$ | $W_{8191,1}$ | $W_{8191,0}$ | |

63    47    31    15

SCALE: 8k BITS
ACCURACY: 16 BITS
LFE NUMBER: 8k

SCALE: 4k BITS
ACCURACY: 64 BITS
LFE NUMBER: 8k

FIG. 18

UTILIZATION SITUATION TABLE 1800

| UNIT ID | PARTITION MODE | PROBLEM SCALE | ACCURACY | UTILIZATION RATIO [%] | WAITING TIME [SECONDS] |
|---|---|---|---|---|---|
| 1 | FULL | 8K | 16 bit | 90 | 600 |
| 2-1, 2-2 | 2P | 4K | 32 bit | 50 | 10 |
| 3-1, 3-2, 3-3, 3-4 | 4P | 2K | 64 bit | 3 | 0 |

MODE SETTING TABLE ~2300

| UNIT ID | PARTITION MODE | PROBLEM SCALE | ACCURACY |
|---|---|---|---|
| 1 | FULL | 8K | 16bit |
| 2 | FULL | 4K | 64bit |
| 3-1 | 2P | 4K | 32bit |
| 3-2 | 2P | 4K | 32bit |
| 4-1 | 4P | 2K | 64bit |
| 4-2 | 4P | 2K | 64bit |
| 4-3 | 4P | 2K | 64bit |
| 4-4 | 4P | 2K | 64bit |
| 5-1 | 8P | 1K | 128bit |
| 5-2 | 8P | 1K | 128bit |
| 5-3 | 8P | 1K | 128bit |
| 5-4 | 8P | 1K | 128bit |
| 5-5 | 8P | 1K | 128bit |
| 5-6 | 8P | 1K | 128bit |
| 5-7 | 8P | 1K | 128bit |
| 5-8 | 8P | 1K | 128bit |

ASSIGNED UNIT TABLE — 2400

| PROBLEM NUMBER | PROBLEM SCALE | ACCURACY | AVAILABLE UNIT | ASSIGNED UNIT |
|---|---|---|---|---|
| Q1 | 1K | 128bit | 5-1,5-2,5-3,5-4,5-5,5-6,5-7,5-8 | 5-1 |
| Q2 | 4K | 32bit | 3-1,3-2 | 3-1 |
| Q3 | 8K | 16bit | 1 | 1 |
| Q4 | 4K | 64bit | 2 | 2 |
| Q5 | 2K | 64bit | 4-1,4-2,4-3,4-4 | 4-1 |
| Q6 | 1K | 128bit | 5-1,5-2,5-3,5-4,5-5,5-6,5-7,5-8 | 5-2 |
| Q7 | 1K | 128bit | 5-1,5-2,5-3,5-4,5-5,5-6,5-7,5-8 | 5-3 |
| Q8 | 4K | 32bit | 3-1,3-2 | 3-2 |

ASSIGNED UNIT TABLE — 2600

| | PROBLEM NUMBER | PROBLEM SCALE | ACCURACY | AVAILABLE UNIT | ASSIGNED UNIT |
|---|---|---|---|---|---|
| 2600-1 | Q1' | 1K | 128bit | 2-1,2-2,2-3,2-4,2-5,2-6,2-7,2-8 | 2-1 |
| 2600-2 | Q2' | 8K | 16bit | 1 | 1 |
| 2600-3 | Q3' | 1K | 128bit | 2-1,2-2,2-3,2-4,2-5,2-6,2-7,2-8 | 2-2 |
| 2600-4 | Q4' | 4K | 64bit | 1 | DURING WAITING |
| 2600-5 | Q5' | 1K | 128bit | 2-1,2-2,2-3,2-4,2-5,2-6,2-7,2-8 | 2-3 |

OPTIMIZATION PROBLEM ARITHMETIC METHOD AND OPTIMIZATION PROBLEM ARITHMETIC APPARATUS

CROSS-REFERENCE TO RELATED APPLICATION

This application is based upon and claims the benefit of priority of the prior Japanese Patent Application No. 2018-175387, filed on Sep. 19, 2018, the entire contents of which are incorporated herein by reference.

FIELD

The embodiment discussed herein relates to an optimization problem arithmetic technology.

BACKGROUND

As measures for solving a multivariate optimization problem at which Neumann computers are not good, an optimization apparatus that uses an Ising type energy function (sometimes called Ising machine or Boltzmann machine) is available. The optimization apparatus calculates a problem of a calculation target by replacing it with an Ising model that is a model representative of a spin behavior of a magnetic material.

The optimization apparatus may perform also modeling using, for example, a neural network. In this case, each of a plurality of bits (spin bits) corresponding to a plurality of spins included in an Ising model functions as a neuron that outputs 0 or 1 in response to a weighting factor (also called coupling factor) indicative of a magnitude of an interaction between a different bit and the own bit. The optimization apparatus determines, as a solution, a combination of values of bits with which a minimum value in regard to a value (called energy) of such an energy function (also called cost function or objective function) as described above is obtained by a probabilistic search method such as simulated annealing.

For example, a proposal of a semiconductor system that searches a ground state of an Ising model using a semiconductor chip on which a plurality of unit elements each corresponding to a spin are incorporated is available. In the proposed semiconductor system, in order to implement a semiconductor chip capable of coping with a large scale problem, a plurality of semiconductor chips in which a certain number of unit elements are incorporated are used to construct a semiconductor system.

Examples of the related art include International Publication Pamphlet No. WO 2017/037903.

SUMMARY

According to an aspect of the embodiment, a computer-implemented optimization problem arithmetic method includes determining, based on management information indicating a partition mode that defines a logically divided state of each of a plurality of arithmetic circuits and utilization information relating to each of the plurality of arithmetic circuits, a partition mode of each of the plurality of arithmetic circuits, receiving a combinatorial optimization problem, selecting, based on information relating to scale or requested accuracy of the combinatorial optimization problem and the determined partition mode of each of the plurality of arithmetic units, a first arithmetic circuit from among the plurality of arithmetic circuits, and causing the selected first arithmetic circuit to execute arithmetic operation of the combinatorial optimization problem based on a first partition mode determined as the partition mode of the first arithmetic circuit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13 is an explanatory view (part 3) depicting an example of storage of weighting factors;

FIG. 14 is an explanatory view (part 4) depicting an example of storage of weighting factors;

FIG. 18 is an explanatory view depicting an example of storage substance of a utilization situation table;

FIG. 23 is an explanatory view depicting an example of storage substance of a mode setting table;

FIG. 24 is an explanatory view depicting an example of storage substance of an assigned unit table;

FIG. 26 is an explanatory view depicting an example of storage substance of an assigned unit table;

DESCRIPTION OF EMBODIMENTS

In an optimization apparatus, the number of spin bits to be utilized (corresponding to the scale of a problem) or the number of bits of a weighting factor (corresponding to an accuracy of a condition expression in the problem) is changeable in response to a problem to be solved. For example, in a problem in a certain field, a comparatively small spin bit number is sometimes used while the bit number of a weighting factor may be comparatively small. On the other hand, in a problem in a different field, although the spin bit number may be comparatively small, a comparatively great bit number of a weighting factor is sometimes used. However, it is inefficient to manufacture an optimization apparatus, which includes a spin bit number and a bit number of a weighting factor suitable for a problem, individually for each problem.

In the following, an embodiment of an optimization problem arithmetic program, an optimization problem arithmetic method and an optimization problem arithmetic apparatus according to the present technology is described in detail with reference to the drawings.

Figure 1:
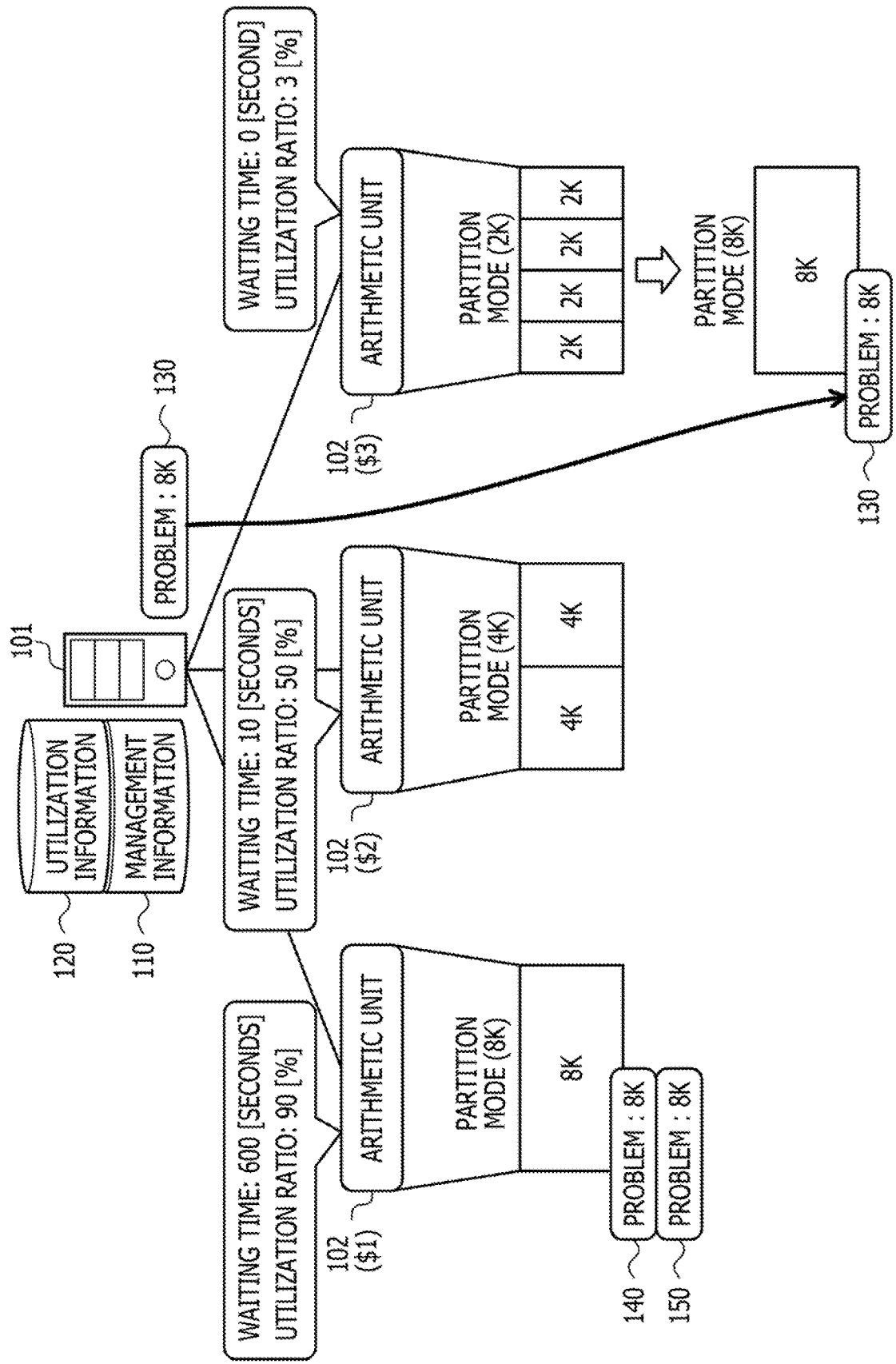
FIG. 1 is an explanatory view depicting a working example of an optimization problem arithmetic method according to an embodiment.

FIG. 1 is an explanatory view depicting a working example of an optimization problem arithmetic method according to an embodiment. Referring to FIG. 1, an optimization problem arithmetic apparatus 101 is a computer in which a plurality of arithmetic units 102 perform arithmetic operation of a combinatorial optimization problem. The arithmetic unit 102 is a device for solving a combinatorial optimization problem.

The arithmetic unit 102 can be logically divided into a plurality of partitions. To divide into partitions signifies to delimit the range of hardware resources to be utilized upon arithmetic operation. In the arithmetic unit 102, the individual partitions can solve different problems independently of each other.

For example, if the arithmetic unit 102 is divided into eight partitions, it is possible for eight users to simultaneously solve problems different from one another. The arithmetic unit 102 may be, for example, a separate device that is coupled to and used together with the optimization problem arithmetic apparatus 101 or may be a device built in the optimization problem arithmetic apparatus 101.

The optimization problem arithmetic apparatus 101 can change a partition mode for defining a logical division state of the arithmetic unit 102 by a setting to the arithmetic unit 102. Depending upon in what manner the arithmetic unit 102 is to be divided, the range of hardware resources that can be utilized upon arithmetic operation and the scale or the accuracy of a combinatorial optimization problem that can be solved by each partition is determined.

It is to be noted that it is arbitrarily settable in what manner the arithmetic units 102 are to be divided, for example, in what partition mode is to be set for the respective arithmetic units 102.

Here, in the optimization apparatus (Ising machine) that solves a combinatorial optimization problem, it is sometimes demanded to solve problems of different scales or different requested accuracies. However, the optimization apparatus in the related art has only one mode (the range of hardware resources utilized upon arithmetic operation is fixed) and is not configured such that it performs optimum operation in response to the scale or requested accuracy of the problem.

Accordingly, in the optimization apparatus in the related art, in the case where the scale or the accuracy of a problem to be solved is less than a maximum scale or a maximum accuracy of a problem that can be solved by hardware, the range in which the hardware searches or the memory size that is transferred by direct memory access (DMA) becomes great and increased operation time is required.

For example, in the case of solving a problem whose scale is "1024 bits (1K)" when the maximum scale of a problem that can be solved by hardware is "8192 bits (8K)," since the search range becomes great and wasteful DMA transfer is performed, the arithmetic operation performance is deteriorated.

Therefore, for example, it is conceivable to prepare a plurality of arithmetic units 102 whose partition modes are different from each other in advance and grasp the partition modes of the plurality of arithmetic units 102 and then perform selection of an arithmetic unit 102 according to the scale or the requested accuracy of a problem.

However, in the case where the setting of the partition modes for the plurality of arithmetic units 102 is not suitable, it sometimes occurs that processes (problems) are accumulated in a queue (waiting matrix) of a specific arithmetic unit 102 or an arithmetic unit 102 with regard to which the number of times of utilization is small appears, and the plurality of arithmetic units 102 fail to perform optimum operation as a whole.

Therefore, in the following description of the present embodiment, an optimization problem arithmetic method is described in which a partition mode for each of a plurality of arithmetic units 102 is determined in response to a utilization situation of the plurality of arithmetic units 102 and arithmetic operation of a combinatorial optimization problem is performed by the arithmetic unit 102 of a partition mode according to a scale of a problem or requested accuracy to solve the combinatorial optimization problem efficiently. In the following, an example of a processing of the optimization problem arithmetic apparatus 101 is described.

The optimization problem arithmetic apparatus 101 determines a partition mode for each of the plurality of arithmetic units 102 based on management information 110 of the plurality of arithmetic units 102 and utilization information 120 of the plurality of arithmetic units 102. Here, the management information 110 is information relating to a partition mode for defining a logical division state of each of the plurality of arithmetic units 102.

The utilization information 120 includes, for example, execution history information of problems whose arithmetic operation has been executed by any of the plurality of arithmetic units 102. The execution history information indicates hardware, scale of the problem, requested accuracy, waiting time, start time, completion time and so forth in an associated relation with the problem. The hardware indicates a hardware element (arithmetic unit 102) that is an assigned unit of the problem. The waiting time indicates waiting time before arithmetic operation of the problem is started. The start time indicates time at which arithmetic operation of the problem is started. The end time indicates time at which arithmetic operation of the problem is ended.

Further, the utilization information 120 may include, for example, information relating to a processing queue of the plurality of arithmetic units 102. The processing queue is a queue (waiting matrix) provided corresponding to each arithmetic unit 102, and information of a problem assigned to each arithmetic unit 102 is inputted to the processing queue.

For example, the optimization problem arithmetic apparatus 101 calculates waiting time of each of the plurality of arithmetic units 102 based on the utilization information 120. Here, the waiting time of the arithmetic unit 102 is one of index values indicative of a load situation of the arithmetic unit 102. The waiting time of the arithmetic unit 102 may be represented, for example, by the total of the waiting time of processes (problems) accumulated in the processing waiting queue corresponding to the arithmetic unit 102. The waiting time of the process is waiting time during waiting for completion of some other process.

Further, the optimization problem arithmetic apparatus 101 calculates a utilization ratio of each of the plurality of arithmetic units 102 based on the utilization information 120. Here, the utilization ratio of the arithmetic unit 102 is one of the index values indicative of the utilization situation of the arithmetic unit 102. The utilization ratio of each arithmetic unit 102 may be represented, for example, by a ratio of a period of time within which arithmetic operation of problems has been performed in the arithmetic unit 102 within a certain period in the past. The period of time within which arithmetic operation of problems has been performed in each arithmetic unit 102 is specified, for example, from start time and the end time of the execution history information included in the utilization information 120.

Here, as the waiting time of the arithmetic unit 102 increases, the time required to solve the problem assigned to the arithmetic unit 102 increases. Further, that the waiting time of a certain arithmetic unit 102 is long is considered to signify that the number of problems to be solved by the arithmetic unit 102 is great. On the other hand, it is considered that, as the utilization ratio of the arithmetic unit 102 decreases, the arithmetic unit 102 is utilized less. Further, that the utilization ratio of a certain arithmetic unit 102 is low is considered to signify that the number of problems to be solved by the arithmetic unit 102 is small.

Therefore, the optimization problem arithmetic apparatus 101 specifies, for example, the partition mode of the arithmetic unit 102 whose waiting time is long and changes the partition mode of the arithmetic unit 102 whose utilization ratio is low to the specified partition mode.

For example, the optimization problem arithmetic apparatus 101 specifies an arithmetic unit 102 whose waiting time is equal to or longer than a threshold value set in advance from among the plurality of arithmetic units 102 based on the utilization information 120. Then, the optimization problem arithmetic apparatus 101 specifies the partition mode of the specified arithmetic unit 102 based on the management information 110.

Further, the optimization problem arithmetic apparatus 101 specifies an arithmetic unit 102 whose utilization ratio is equal to or lower than a threshold value set in advance from among the plurality of arithmetic units 102 based on the utilization information 120. Then, the optimization problem arithmetic apparatus 101 determines the partition mode of the specified arithmetic unit 102 to the specified partition mode. It is to be noted that the remaining arithmetic units 102 other than the arithmetic unit 102 whose utilization ratio is equal to or lower than the threshold value from among the plurality of arithmetic units 102 maintain respective partition modes as they are.

In the example of FIG. 1, as the plurality of arithmetic units 102 coupled to the optimization problem arithmetic apparatus 101, an arithmetic unit 102($1), another arithmetic unit 102($2) and a further arithmetic unit 102($3) are assumed. It is to be noted that $1 to $3 are identifiers for identifying the arithmetic units 102.

A partition mode (8K) is set to the arithmetic unit 102($1). The partition mode (8K) is a partition mode that defines a state in which the arithmetic unit 102 is logically formed as one partition. The maximum scale of a problem that can be solved by the partition mode (8K) is "8192 bits (8K)."

A partition mode (4K) is set to the arithmetic unit 102($2). The partition mode (4K) is a partition mode that defines a state in which the arithmetic unit 102 is logically divided to two partitions. The maximum scale of a problem that can be solved by the partition mode (4K) is "4096 bits (4K)."

A partition mode (2K) is set to the arithmetic unit 102($3). The partition mode (2K) is a partition mode that defines a state in which the arithmetic unit 102 is logically divided to four partitions. The maximum scale of a problem that can be solved by the partition mode (2K) is "2048 bits (2K)."

Further, the waiting time of the arithmetic unit 102($1) is "600 [seconds]" and the utilization ratio of the arithmetic unit 102($1) within the last one hour is "90 [%]." The waiting time of the arithmetic unit 102($2) is "10 [seconds]," and the utilization ratio within the last one hour of the arithmetic unit 102($2) is and "50 [%]." The waiting time of the arithmetic unit 102($3) is "0 [second]," and the utilization ratio within the last one hour of the arithmetic unit 102($3) is "3 [%]."

Here, the threshold value for the waiting time is determined to "600 [seconds]" and the threshold value for the utilization ratio is determined to "10 [%]." In this case, the optimization problem arithmetic apparatus 101 specifies the arithmetic unit 102($1) whose waiting time is equal to or longer than the threshold value based on the utilization information 120 of the arithmetic units 102($1) to 102($3).

Then, the optimization problem arithmetic apparatus 101 specifies the partition mode (8K) of the specified arithmetic unit 102($1) based on the management information 110 of the arithmetic units 102($1) to 102($3). The optimization problem arithmetic apparatus 101 specifies the arithmetic unit 102($3) whose utilization ratio is equal to or lower than the threshold value based on the utilization information 120 of the arithmetic units 102($1) to 102($3).

Then, the optimization problem arithmetic apparatus 101 determines the partition mode of the specified arithmetic unit 102($3) to the specified partition mode (8K). In this case, the partition mode (8K) is set to the arithmetic unit 102($3) and the management information 110 is updated. For example, the partition mode is suitably changed in response to an execution situation of the arithmetic units 102($1) to 102($3) and the management information 110 is updated in response to the change.

The optimization problem arithmetic apparatus 101 accepts a combinatorial optimization problem. Here, the accepted combinatorial optimization problem is a problem of a calculation target to be solved and is, for example, a problem designated by the user. It is to be noted that an example of the combinatorial optimization problem is hereinafter described with reference to FIG. 6.

The optimization problem arithmetic apparatus 101 determines arithmetic units 102 to which the combinatorial optimization problem is to be assigned based on information relating to the scale or the requested accuracy of the combinatorial optimization problem and information relating to the partition mode for each of the plurality of determined arithmetic units 102.

Here, the information relating to the scale or the requested accuracy of the combinatorial optimization problem may be, for example, information indicating the scale or the requested accuracy itself of the combinatorial optimization problem or may be information such a flag corresponding to the scale or the requested accuracy of a combinatorial optimization problem. The scale of the combinatorial optimization problem is represented, for example, by the number of spin bits of an Ising model of the combinatorial optimization problem. The Ising model is a model that represents a behavior of a spin of a magnetic material. The arithmetic unit 102 replaces, for example, a problem of a calculation target into an Ising model and performs calculation. Further, the requested accuracy of the combinatorial optimization problem is represented, for example, by the number of bits of a weighting factor indicating a magnitude of an interaction between bits. Further, the information relating to the partition mode may be, for example, information indicative of the partition mode itself or may be information such as a flag corresponding to the partition mode.

For example, the optimization problem arithmetic apparatus 101 refers to the management information 110 after updated to specify any arithmetic unit 102 to which the partition mode that can solve a problem of a scale greater than that of the combinatorial optimization problem is set. Then, the optimization problem arithmetic apparatus 101 may determine an arithmetic unit 102 in which the maximum scale of a problem that can be solved is in the minimum from among the specified arithmetic units 102 to the arithmetic unit 102 to which the combinatorial optimization problem is to be assigned.

Further, the optimization problem arithmetic apparatus 101 refers to the management information 110 after updated to specify an arithmetic unit 102 to which the partition mode that can solve a problem of an accuracy higher than a requested accuracy of the combinatorial optimization problem is set. Then, the optimization problem arithmetic apparatus 101 may determine the specified arithmetic unit 102 to the arithmetic unit 102 to which the combinatorial optimization problem is to be assigned.

It is to be noted that the partition mode that can solve a problem having an accuracy higher than the requested accuracy of the combinatorial optimization problem is a partition mode in which the requested accuracy of the combinatorial optimization problem falls within the range of a maximum accuracy of a problem that can be solved.

Further, the optimization problem arithmetic apparatus 101 may refer to the updated management information 110 to specify an arithmetic unit 102 to which a partition mode that can solve a problem of a scale greater than the scale of the combinatorial optimization problem and can solve a problem having an accuracy higher than the requested accuracy of the combinatorial optimization problem is set. Then, the optimization problem arithmetic apparatus 101 may determine the specified arithmetic unit 102 to the arithmetic unit 102 to which the combinatorial optimization problem is to be assigned.

In the example of FIG. 1, taking a problem 130 as an example, a case in which an arithmetic unit 102 to which the problem 130 is to be assigned is determined in response to the scale of the problem 130 is described. The problem 130 is a combinatorial optimization problem whose scale is "8192 bits (8K)."

In this case, the optimization problem arithmetic apparatus 101 refers to the updated management information 110 to specify the arithmetic units 102($1) and 102($2) to which a partition mode that can solve a problem of a scale greater than that of the problem 130 is set. Then, the optimization problem arithmetic apparatus 101 determines one of the specified arithmetic units 102($1) and 102($2) to the arithmetic unit 102 to which the problem 130 is to be assigned.

For example, the optimization problem arithmetic apparatus 101 may determine the arithmetic unit 102 in which the load is low from between the arithmetic units 102($1) and 102($2) to the arithmetic unit 102 to which the problem 130 is to be assigned based on information relating to an execution situation of the arithmetic units 102($1) to 102($3).

Here, while problems 140 and 150 are assigned to the arithmetic unit 102($1), no problem is assigned to the arithmetic unit 102($2). In this case, the optimization problem arithmetic apparatus 101 determines the blank arithmetic unit 102($2) to which no problem is assigned from between the arithmetic units 102($1) and 102($2) to the arithmetic unit 102 to which the problem 130 is to be assigned.

The optimization problem arithmetic apparatus 101 causes the determined arithmetic unit 102 to execute arithmetic operation of the combinatorial optimization problem by the partition mode determined relating to the arithmetic unit 102. In the example of FIG. 1, the optimization problem arithmetic apparatus 101 causes the determined arithmetic unit 102($3) to execute arithmetic operation of the problem 130.

In this manner, with the optimization problem arithmetic apparatus 101, a partition mode for each of the plurality of arithmetic units 102 may be determined in response to a utilization situation of the plurality of arithmetic units 102. In the example of FIG. 1, the partition mode of the arithmetic unit 102($3) whose utilization ratio is low may be changed such that the arithmetic unit 102($3) has a same configuration as that of the arithmetic unit 102($1) whose waiting time is long.

Consequently, the number of hardware elements that can solve a problem having a scale and a requested accuracy similar to those of a problem with regard to which waiting occurs may be increased without increasing the number of the arithmetic units 102 to be used. Therefore, increase of waiting time of the arithmetic unit 102 (for example, the arithmetic unit 102($1)) may be suppressed. Further, opportunity loss arising from increase of time required to solve a problem requested from the user may be suppressed.

Further, with the optimization problem arithmetic apparatus 101, arithmetic operation of a combinatorial optimization problem may be performed by the arithmetic unit 102 set to the partition mode corresponding to the scale and the requested accuracy of a problem. Consequently, according to the scale and the requested accuracy of a problem, the range of hardware resources to be utilized for arithmetic operation may be selected suitably and increase of the speed of arithmetic operation processing by enhancement of the arithmetic operation performance may be implemented.

In the example of FIG. 1, arithmetic operation of the problem 130 may be performed by the arithmetic unit 102($3) to which the partition mode according to the scale "8K" of the problem 130 is set. Further, since waiting time does not occur in the arithmetic unit 102($3), time required to solve the problem 130 may be reduced in comparison with an alternative case in which the problem is assigned to the arithmetic unit 102($1).

Figure 2:
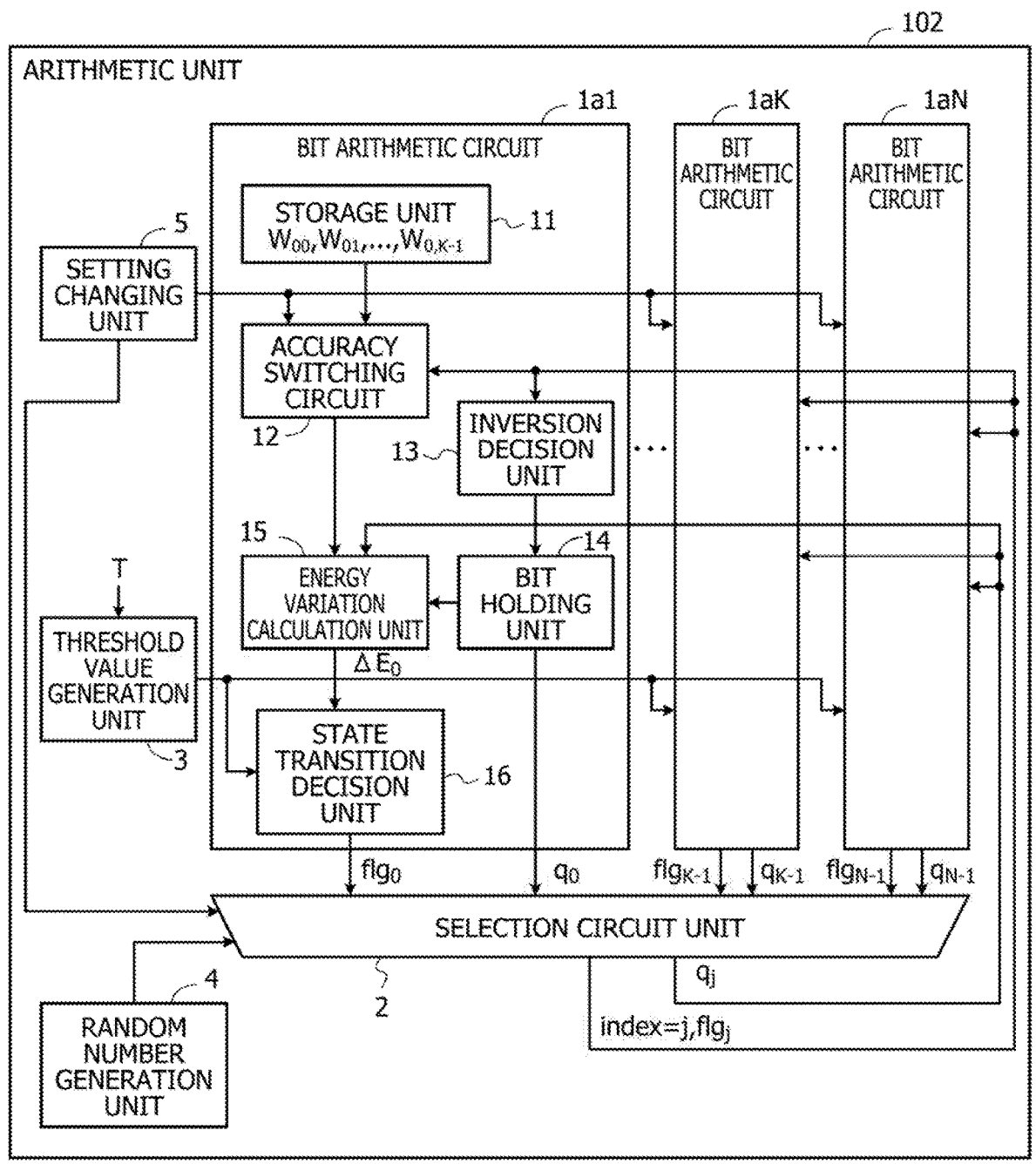
FIG. 2 is an explanatory view depicting a working example of an arithmetic unit.

FIG. 2 is an explanatory view depicting the working example of the arithmetic unit 102. Referring to FIG. 2, the arithmetic unit 102 searches for a value (ground state) of each bit when the energy function assumes a minimum value from among combinations (states) of values of a plurality of bits (spin bits) corresponding to a plurality of spins included in an Ising model into which the problem of the calculation target (combinatorial optimization problem) is converted.

An Ising type energy function E(x) is defined, for example, by the following expression (1).

$$E(x) = -\sum_{(i,j)} W_{ij} x_i x_j - \sum_i b_i x_i \qquad (1)$$

The first term on the right side indicates an integration of the product of the values (0 or 1) of two bits and a coupling factor in regard to all combinations of two bits selectable from all bits included in the Ising model without any leak and any overlap. The total bit number included in the Ising model is K (K is an integer equal to or greater than 2). Further, i and j are each an integer equal to or greater than 0 but equal to or smaller than K−1. $x_i$ is a variable (also called state variable) representative of a value of the ith bit. $x_j$ is a variable representative of a value of the jth bit. $W_{ij}$ is a weighting factor indicative of a magnitude of an interaction between the ith and jth bits. It is to be noted that $W_{ii}=0$. Further, in many cases, $W_{ij}=W_{ji}$ (for example, a factor matrix of weighting factors is, in many cases, a symmetrical matrix).

The second term on the right side of the expression (1) above indicates the sum total of the product of the bias factor and the bit value of all bits. $b_i$ indicates a bias factor of the ith bit.

Further, if the value of the variable $x_i$ varies to $1-x_i$, the increase amount of the variable $x_i$ may be represented as $\Delta x_i=(1-x_i)-x_i=1-2x_i$. Accordingly, the energy variation $\Delta E_i$ by spin inversion (variation in value) is represented by the following expression (2).

$$\begin{aligned}\Delta E_i &= E(x)|_{x_i \to 1-x_i} - E(x) \\ &= -\Delta x_i \left( \sum_j W_{ij} x_j + b_i \right) \\ &= -\Delta x_i h_i \\ &= \begin{cases} -h_i & (\text{for } x_i = 0 \to 1) \\ +h_i & (\text{for } x_i = 1 \to 0) \end{cases}\end{aligned} \qquad (2)$$

$h_i$ is called local field and is represented by the following expression (3).

$$h_i = \sum_j W_{ij} x_j + b_i \qquad (3)$$

An energy variation $\Delta E_i$ is the product of the local field $h_i$ by a sign (+1 or −1) in response to $\Delta x_i$. A variation $\Delta h_i$ of the local field $h_i$ is represented by the following expression (4).

$$\Delta h_i = \begin{cases} +W_{ij} & (\text{for } x_j = 0 \to 1) \\ -W_{ij} & (\text{for } x_j = 1 \to 0) \end{cases} \qquad (4)$$

Processing for updating the local field $h_i$ when a certain variable $x_j$ changes is performed in parallel.

The arithmetic unit 102 is, for example, a semiconductor integrated circuit of one chip and is implemented using a field programmable gate array (FPGA) or the like. The arithmetic unit 102 includes bit arithmetic circuits 1a1, ..., 1aK, ..., 1aN (a plurality of bit arithmetic circuits), a selection circuit unit 2, a threshold value generation unit 3, a random number generation unit 4 and a setting changing unit 5. Here, N is a total number of bit arithmetic circuits the arithmetic unit 102 includes. N is an integer equal to or greater than K. With the bit arithmetic circuits 1a1, ..., 1aK, ..., 1aN, identification information (whose index=0, ..., K−1, ..., N−1) is associated.

The bit arithmetic circuits 1a1, ..., 1aK, ..., 1aN are unit elements that provide 1 bit included in a bit string representative of a state of the Ising model. The bit string may be called spin bit string or state vector. Each of the bit arithmetic circuits 1a1, ..., 1aK, ..., 1aN stores a weighting factor between an own bit and a different bit, decides reversibility of the own bit according to inversion of the different bit based on the weighting factor and outputs a signal representative of the reversibility of the own bit to the selection circuit unit 2.

The selection circuit unit 2 selects a bit to be inverted (inversion bit) from within a spin bit string. For example, the selection circuit unit 2 accepts a signal of reversibility outputted from each of the bit arithmetic circuits 1a1, ..., 1aK that are used in search for a ground state of the Ising model from among the bit arithmetic circuits 1a1, ..., 1aK, ..., 1aN. The selection circuit unit 2 preferentially selects one of bits corresponding to bit arithmetic circuits from which a signal that inversion is possible is outputted from among the bit arithmetic circuits 1a1, ..., 1aK and determines the bit as an inversion bit. For example, the selection circuit unit 2 performs selection of the inversion bit based on a random number bit outputted from the random number generation unit 4. The selection circuit unit 2 outputs a signal indicative of the selected inversion bit to the bit arithmetic circuits 1a1, ..., 1aK. The signal indicative of the inversion bit includes identification information (index=j) of the inversion bit, a flag indicative of the reversibility (flg$_j$=1) and a signal indicative of a current value q$_j$ of the inversion bit (value before the inversion in the current cycle). However, no bit may be inverted. In the case where no bit is to be inverted, the selection circuit unit 2 outputs flg$_j$=0.

The threshold value generation unit 3 generates a threshold value that is used when the reversibility of a bit is decided for each of the bit arithmetic circuits 1a1, ..., 1aK, ..., 1aN. The threshold value generation unit 3 outputs a signal indicative of such threshold value to each of the bit arithmetic circuits 1a1, ..., 1aK, ..., 1aN. As hereinafter described, the threshold value generation unit 3 uses a parameter (temperature parameter) T indicative of a temperature and a random number in generation of a threshold value. The threshold value generation unit 3 includes a random number generator for generating the random number. The threshold value generation unit 3 preferably includes a random number generator individually for each of the bit arithmetic circuits 1a1, ..., 1aK, ..., 1aN, which individually perform generation and supply of a threshold value. However, in the threshold value generation unit 3, a random number generator may be shared by a given number of bit arithmetic circuits.

The random number generation unit 4 generates and outputs a random number bit to the selection circuit unit 2. The random number bit generated by the random number generation unit 4 is used for selection of an inversion bit by the selection circuit unit 2.

The setting changing unit 5 performs change of a first bit number (spin bit number) of a bit string (spin bit string) representative of a state of the Ising model of a calculation target from among the bit arithmetic circuits 1a1, ..., 1aK, ..., 1aN. Further, the setting changing unit 5 performs change of a second bit number of a weighting factor for each of the bit arithmetic circuits equal in number to the first bit number.

Here, the first bit number (spin bit number) is equivalent to the scale of the problem (combinatorial optimization problem). The second bit number (bit number of a weighting factor) is equivalent to the accuracy of the problem. The optimization problem arithmetic apparatus 101 controls the setting to the setting changing unit 5 in regard to the first and second bit numbers to set an arbitrary partition mode.

Now, a circuit configuration of the bit arithmetic circuit is described. Although description is given principally of the bit arithmetic circuit 1a1 (index=0), also the other bit arithmetic circuits are implemented by a similar circuit configuration (for example, it is sufficient if, for the Xth (X is an integer equal to or greater than 1 but equal to or smaller than N) bit arithmetic circuit, index=X−1 is applied).

The bit arithmetic circuit 1a1 includes a storage unit 11, an accuracy switching circuit 12, an inversion decision unit 13, a bit holding unit 14, an energy variation calculation unit 15 and a state transition decision unit 16.

The storage unit 11 is, for example, a register or a static random access memory (SRAM). The storage unit 11 stores a weighting factor between an own bit (here, a bit of index=0) and a different bit. Here, for the spin bit number (first bit number) K, the total number of weighting factors is $K^2$. In the storage unit 11, for the bit of index=0, K weighting factors $W_{00}, W_{01}, \ldots, W_{0,K-1}$ are stored. Here, the weighting factor is represented by a second bit number L. Accordingly, in the storage unit 11, K×L bits are required in order to store the weighting factors. It is to be noted that the storage unit 11 may be provided outside the bit arithmetic circuit 1a1 but inside the arithmetic unit 102 (this similarly applies also to the storage unit of the other bit arithmetic circuits).

If one of bits of a spin bit string is inverted, the accuracy switching circuit 12 reads out a weighting factor for the inverted bit from the own storage unit 11 (of the bit arithmetic circuit 1a1) and outputs the read out weighting factor to the energy variation calculation unit 15. For example, the accuracy switching circuit 12 accepts identification information of the inversion bit from the selection circuit unit 2, reads out a weighting factor corresponding to the set of the inversion bit and the own bit from the storage unit 11 and outputs the weighting factor to the energy variation calculation unit 15.

At this time, the accuracy switching circuit 12 performs reading out of a weighting factor represented by the second bit number set by the setting changing unit 5. The accuracy switching circuit 12 changes the second bit number of the factor to be read out from the storage unit 11 in response to the setting of the second bit number by the setting changing unit 5.

For example, the accuracy switching circuit 12 includes a selector for reading out a bit string of a given bit number from the storage unit 11. In the case where the given bit number to be read out by the selector is greater than the second bit number, the accuracy switching circuit 12 reads out a unit bit string including a weighting factor corresponding to the inversion bit by the selector and extracts a weighting factor represented by the second bit number from the read out unit bit string. As an alternative, in the case where the given bit number to be read out by the selector is smaller than the second bit number, the accuracy switching circuit 12 may extract a weighting factor represented by the second bit number from the storage unit 11 by coupling a plurality of bit strings read out by the selector.

The inversion decision unit 13 accepts a signal outputted from the selection circuit unit 2 and indicative of index=j and $flg_j$ and decides based on the signal whether or not the own bit is selected as the inversion bit. In the case where the own bit is selected as the inversion bit (for example, in the case where index=j indicates the own bit and $flg_j$ indicates that inversion is possible), the inversion decision unit 13 inverts the bit stored in the bit holding unit 14. For example, in the case where the bit held in the bit holding unit 14 is 0, the bit is changed to 1. On the other hand, in the case where the bit held in the bit holding unit 14 is 1, the bit is changed to 0.

The bit holding unit 14 is a register that holds 1 bit. The bit holding unit 14 outputs the held bit to the energy variation calculation unit 15 and the selection circuit unit 2.

The energy variation calculation unit 15 calculates the energy variation value $\Delta E_0$ of the Ising model using the weighting factor read out from the storage unit 11 and outputs the energy variation value $\Delta E_0$ to the state transition decision unit 16. For example, the energy variation calculation unit 15 accepts a value of the inversion bit (value before the inversion in the current cycle) from the selection circuit unit 2 and calculates $\Delta h_0$ by the expression (4) given hereinabove in response to whether the inversion bit is to be inverted from 1 to 0 or from 0 to 1. Then, the energy variation calculation unit 15 adds $\Delta h_0$ to $h_0$ in the preceding cycle to update $h_0$. The energy variation calculation unit 15 includes a register for holding $h_0$ and holds $h_0$ after updated by the register.

Further, the energy variation calculation unit 15 accepts the own bit at present from the bit holding unit 14 and calculates the energy variation value $\Delta E_0$ of the Ising model in the case where the own bit is to be inverted from 0 to 1 if it is 0 but is to be inverted from 1 to 0 if it is 1 by the expression (2) given hereinabove. The energy variation calculation unit 15 outputs the calculated energy variation value $\Delta E_0$ to the state transition decision unit 16.

The state transition decision unit 16 outputs a signal $flg_0$ indicative of reversibility of the own bit in response to calculation of an energy variation by the energy variation calculation unit 15 to the selection circuit unit 2. For example, the state transition decision unit 16 is a comparator that accepts the energy variation value $\Delta E_0$ calculated by the energy variation calculation unit 15 and compares reversibility of the own bit in response to comparison of the energy change value $\Delta E_0$ with the threshold value generated by the threshold value generation unit 3. Here, the decision by the state transition decision unit 16 is described.

It is known that, in simulated annealing, if an allowance probability $p(\Delta E, T)$ of a state transition that causes a certain energy variation ΔE is determined as indicated by the expression (5) given below, the state reaches an optimum solution (ground state) in the limit of time (number of iterations) infinity.

$$p(\Delta E, T) = f\left(-\frac{\Delta E}{T}\right) \tag{5}$$

In the expression (5) above, T is the temperature parameter T described hereinabove. Here, as the function f, the following expression (6) (metropolis algorithm) or the expression (7) (Gibbs method) given below is used.

$$f_{metro}(x) = \min(1, e^x) \tag{6}$$

$$f_{Gibbs}(x) = \frac{1}{1 + e^{-x}} \tag{7}$$

The temperature parameter T is represented, for example, by the following expression (8). For example, the temperature parameter T is given by a function that logarithmically decreases in response to the number of iterations. For example, the constant c is determined in response to the problem.

$$T = \frac{T_0 \log(c)}{\log(t + c)} \tag{8}$$

Here, $T_0$ is an initial temperature value and preferably has a value sufficiently high value in response to the problem.

In the case where the allowance probability p(ΔE, T) represented by the expression (5) above is used, if it is assumed that a steady state is reached after sufficient iterations of a state transition at a certain temperature, the state is generated in accordance with a Boltzmann distribution. For example, the occupancy probability of each individual state follows a Boltzmann distribution in a thermal equilibrium in thermodynamics. Therefore, by creating a state in accordance with a Boltzmann distribution at a certain temperature and then gradually lowering the temperature such that a state in accordance with a Boltzmann distribution is generated at a temperature lower than the certain temperature, a state in accordance with a Boltzmann distribution at different temperatures may be followed. Then, when the temperature is decreased to 0, a state (ground state) of the lowest energy by the Boltzmann distribution at the temperature 0 is implemented at a high possibility. Since this state is very similar to a state variation when a material is annealed, this method is called simulated annealing. At this time, that a state transition that the energy increases occurs stochastically is equivalent to thermal excitation in physics.

For example, a circuit that outputs a flag (flg=1) indicating that a state transition that causes an energy variation ΔE is allowed in the allowance probability p(ΔE, T) may be implemented by a comparator that outputs a value according to comparison between f(-ΔE/T) and a uniform random number u having a value within an interval [0, 1].

However, a same function may be implemented even if such transformation as described below is performed. Even if a same monotonically increasing function is applied to two numbers, the magnitude relation does not change. Accordingly, even if a same monotonically increasing function is applied to the two inputs of the comparator, the output of the comparator does not change. For example, as the monotonically increasing function to be applied to f(-ΔE, T), an inverse function $f^{-1}(-\Delta E, T)$ of f(-ΔE, T) may be used, and as the monotonically increasing function to be applied to the uniform random number u, $f^{-1}(u)$ where -ΔE/T of $f^{-1}(-\Delta E, T)$ is changed to u may be used. In this case, the circuit that has a function similar to that of the comparator described above may be a circuit that outputs 1 when -ΔE/T is greater than $f^{-1}$ (u). Further, since the temperature parameter T is in the positive, the state transition decision unit 16 may be a circuit that outputs $flg_0$=1 when -ΔE is greater than $T \cdot f^{-1}(u)$ (or when ΔE is smaller than $-(T \cdot f^{-1}(u))$).

The threshold value generation unit 3 generates a uniform random number u and outputs the value of $f^{-1}(u)$ using a conversion table for converting the uniform random number u into a value of $f^{-1}(u)$ described above. In the case where the metropolis method is applied, $f^{-1}(u)$ is given by the following expression (9). Meanwhile, in the case where Gibbs method is applied, $f^{-1}(u)$ is given by the expression (10) given below.

$$f_{metro}^{-1}(u) = \log(u) \tag{9}$$

$$f_{Gibbs}^{-1}(u) = \log\left(\frac{u}{1-u}\right) \tag{10}$$

The conversion table is stored into a memory (not depicted) such as a random access memory (RAM) or a flash memory coupled to the threshold value generation unit 3. The threshold value generation unit 3 outputs the product $(T \cdot f^{-1}(u))$ of the temperature parameter T and $f^{-1}(u)$ as a threshold value. Here, $T \cdot f^{-1}(u)$ corresponds to thermal excitation energy.

It is to be noted that, when $flg_j$ is inputted from the selection circuit unit 2 to the state transition decision unit 16 and indicates that a state transition is not allowed (for example, when no state transition occurs), the state transition decision unit 16 may perform comparison with a threshold value after an offset value is added to $-\Delta E_0$. Further, in the case where it continues that no state transition occurs, the state transition decision unit 16 may cause the offset value to be added to be increased. On the other hand, when $flg_j$ indicates that a state transition is allowed (for example, when a state transition occurs), the state transition decision unit 16 sets the offset value to 0. Addition of the offset value to $-\Delta E_0$ or increase of the offset value makes it ready to allow a state transition and, in the case where the current state is in a local solution, escape from the local solution is promoted.

A spin bit string in the case where the temperature parameter T is set gradually smaller in this manner and the value of the temperature parameter T is decreased, for example, by a given number of times (or in the case where the temperature parameter T reaches a minimum value) is retained into the bit arithmetic circuits 1a1, . . . , 1aK. The arithmetic unit 102 outputs the spin bit string in the case where the value of the temperature parameter T is decreased by the given number of times (or in the case where the temperature parameter T reaches the minimum value) as a solution. The arithmetic unit 102 may include a control unit (not depicted) that reads out and outputs the temperature parameter T, settings of a weighting factor to the storage units for the bit arithmetic circuits 1a1, . . . , 1aK and a spin bit string retained in the bit arithmetic circuits 1a1, . . . , 1aK.

In the arithmetic unit 102, the spin bit number (first bit number) of an Ising model and the bit number (second bit number) of a weighting factor between bits can be changed by the setting changing unit 5. Here, the spin bit number is equivalent to a scale of a circuit for implementing the Ising model (scale of the problem). As the scale increases, the arithmetic unit 102 may be applied to a combinatorial optimization problem having an increasing number of combination candidates. Meanwhile, the bit number of a weighting factor corresponds to an accuracy of a representation of an interrelation between bits (accuracy of a conditional representation in the problem). As the accuracy increases, a condition for an energy variation $\Delta E_i$ upon spin inversion may be set in increasing detail. In a certain problem, the spin bit number may be great while the bit number representative of a weighting factor is small. In another problem, the spin bit number may be small while the bit number representative of a weighting factor is great. It is inefficient to individually fabricate optimization apparatuses suitable for individual problems.

Therefore, in the arithmetic unit 102, the scale and the accuracy may be made variable by configuring the setting changing unit 5 so as to make it possible to set a spin bit number representative of a state of an Ising model and a bit number of a weighting factor. For example, the partition mode may be changed. As a result, it is possible for one arithmetic unit 102 to implement a scale and an accuracy suitable for a problem.

For example, each of the bit arithmetic circuits $1a1, \ldots, 1aK, \ldots, 1aN$ includes an accuracy switching circuit, by which the bit length of a weighting factor to be read out from the own storage unit is switched in response to a setting of the setting changing unit 5. Further, the selection circuit unit 2 inputs a signal indicative of an inversion bit to bit arithmetic circuits the number of which (for example, the number is K) corresponds to a spin bit number set by the setting changing unit 5 and selects an inversion bit from among the bits corresponding to the number of (K) bit arithmetic circuits. Consequently, even if optimization apparatuses each having a scale and an accuracy according to a problem are not fabricated individually, the single arithmetic unit 102 may implement an Ising model with the scale and the accuracy according to the problem.

Here, the storage unit provided in each of the bit arithmetic circuits $1a1, \ldots, 1aN$ is implemented by a storage device of a comparatively small capacity such as an SRAM as described hereinabove. Therefore, also it is considered that, if the spin bit number increases, depending upon the bit number of a weighting factor, the storage capacity of the storage unit may be insufficient. On the other hand, according to the arithmetic unit 102, also it is possible for the setting changing unit 5 to set a scale and an accuracy such that restriction to the capacity of the storage unit may be satisfied. For example, it is conceivable for the setting changing unit 5 to set the bit number of a weighting factor so as to decrease as the spin bit number increases. Also it is conceivable for the setting changing unit 5 to set the spin bit number so as to decrease as the bit number of a weighting factor increases.

Further, in the example described above, K bit arithmetic circuits from among N bit arithmetic circuits are used in an Ising model. In the case where $N-K \geq K$, the arithmetic unit 102 may implement an Ising model same as the Ising model described above using K bit arithmetic circuits from among the remaining N-K bit arithmetic circuits such that the degree of parallelism of processing of a same problem is increased by both Ising models to speed up the calculation.

Furthermore, the arithmetic unit 102 may implement a different Ising model corresponding to a different problem using some of the remaining N-K bit arithmetic circuits such that arithmetic operation of the different problem is performed in parallel with the problem represented by the Ising model described above.

As an alternative, the arithmetic unit 102 may not use the remaining N-K bit arithmetic circuits. In this case, the selection circuit unit 2 may compulsorily set all of the flags fig that are to be outputted from the remaining N-K bit arithmetic circuits to zero such that the bits corresponding to the remaining N-K bit arithmetic circuits are not selected at all as an inversion candidate.

Now, an example of a system configuration of an information processing system 300 including the optimization problem arithmetic apparatus 101 depicted in FIG. 1 is described.

Figure 3:
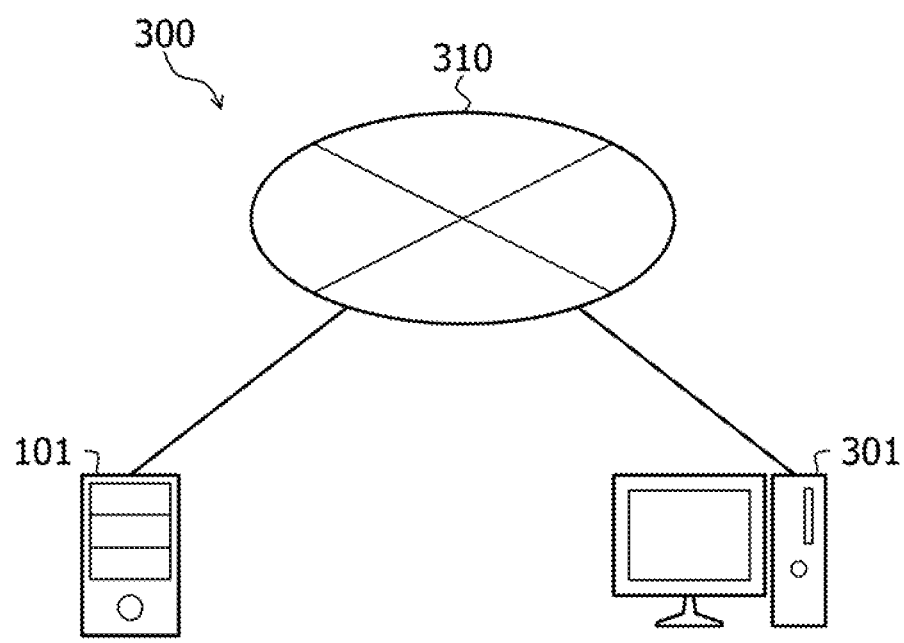
FIG. 3 is an explanatory view depicting an example of a system configuration of an information processing system.

FIG. 3 is an explanatory view depicting an example of a system configuration of the information processing system 300. Referring to FIG. 3, the information processing system 300 includes an optimization problem arithmetic apparatus 101 and a client apparatus 301. In the information processing system 300, the optimization problem arithmetic apparatus 101 and the client apparatus 301 are coupled to each other by a wired or wireless network 310. The network 310 is, for example, a local area network (LAN), a wide area network (WAN), the Internet or the like.

The optimization problem arithmetic apparatus 101 provides a function for replacing a combinatorial optimization problem with an Ising model and solving the combinatorial optimization problem by a search for a ground state of the Ising model. The optimization problem arithmetic apparatus 101 is, for example, an on-premise server or a crowd computing server.

The client apparatus 301 is a client computer used by a user and is used for inputting, for example, of a problem to be solved by the user to the optimization problem arithmetic apparatus 101. The client apparatus 301 is, for example, a personal computer (PC), a tablet type PC or the like.

Figure 4:
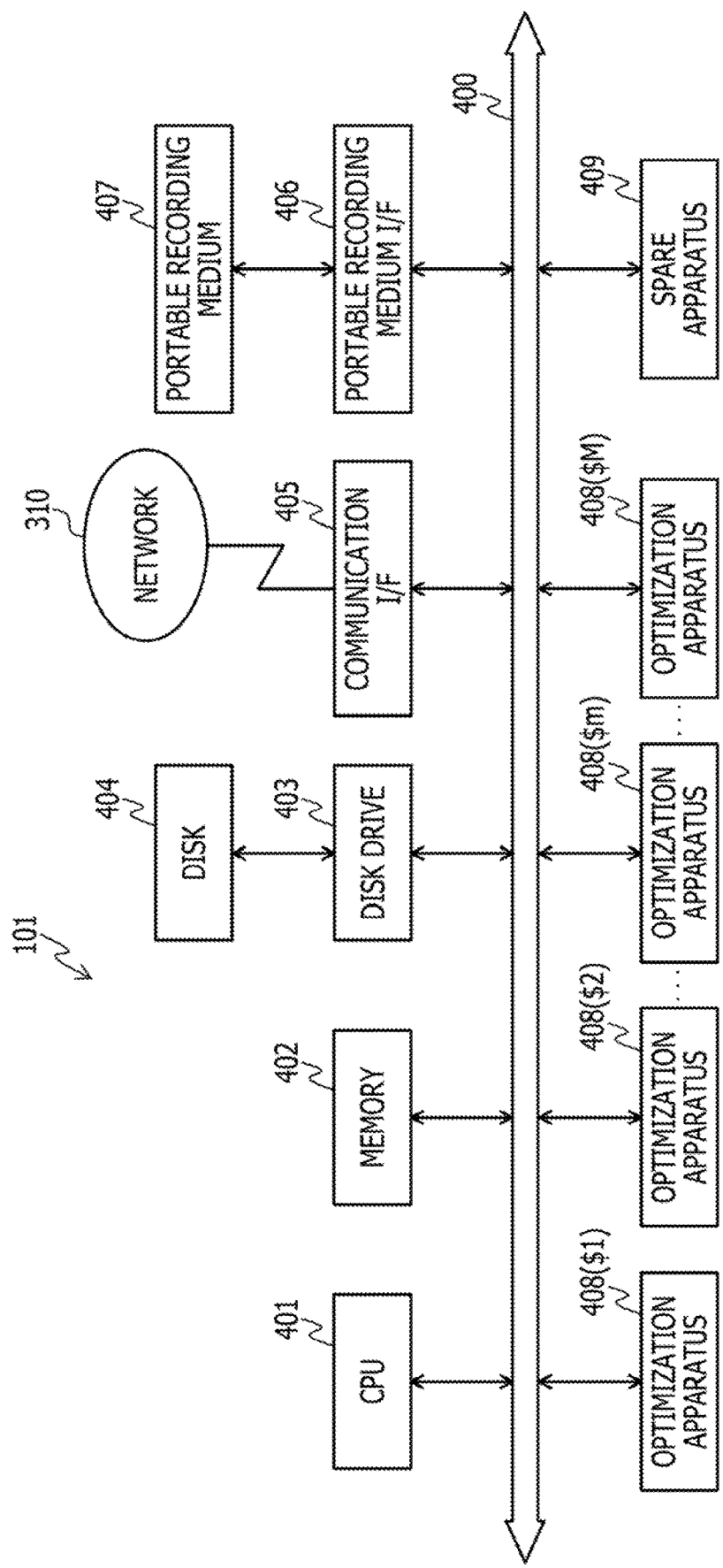
FIG. 4 is a block diagram depicting an example of a hardware configuration of an optimization problem arithmetic apparatus.

FIG. 4 is a block diagram depicting an example of a hardware configuration of an optimization problem arithmetic apparatus. The optimization problem arithmetic apparatus depicted in FIG. 4 may be the optimization problem arithmetic apparatus 101 depicted in FIG. 1. Referring to FIG. 4, the optimization problem arithmetic apparatus 101 includes a central processing unit (CPU) 401, a memory 402, a disk drive 403, a disk 404, a communication interface (I/F) 405, a portable recording medium I/F 406, a portable recording medium 407, a plurality of optimization apparatuses 408 and a spare apparatus 409. The components mentioned are coupled to one another by a bus 400. The bus 400 is, for example, a peripheral component interconnect express (PCIe) bus.

Here, the CPU 401 is responsible for control of the entire optimization problem arithmetic apparatus 101. The CPU 401 may include a plurality of cores. The memory 402 includes, for example, a read only memory (ROM), a RAM, a flash ROM and so forth. For example, the flash ROM stores programs of an operating system (OS); the ROM stores application programs; and the RAM is used as a working area of the CPU 401. A program stored in the memory 402 is loaded into the CPU 401 such that processes coded therein are executed by the CPU 401.

The disk drive 403 controls read/write of data from/into the disk 404 under the control of the CPU 401. The disk 404 stores data written therein under the control of the disk drive 403. The disk 404 may be, for example, a magnetic disk or an optical disk.

The communication I/F 405 is coupled to the network 310 through a communication line and is coupled to an external computer (for example, the client apparatus 301 depicted in FIG. 3) through the network 310. The communication I/F 405 is responsible for interfacing between the network 310 and the inside of the apparatus and controls inputting/outputting from/to the external computer. For the communication I/F 405, for example, a model or a LAN adapter may be adopted.

The portable recording medium I/F 406 controls read/write of data from/into the portable recording medium 407 under the control of the CPU 401. The portable recording medium 407 stores data written therein under the control of the portable recording medium I/F 406. As the portable recording medium 407, for example, a compact disc (CD)-ROM, a digital versatile disk (DVD), a universal serial bus (USB) memory and so forth are applicable.

The optimization apparatus 408 searches for a ground state of an Ising model under the control of the CPU 401. The optimization apparatus 408 is an example of the arithmetic unit 102 depicted in FIG. 1. $1 to $M are identifiers for identifying each of the optimization apparatuses 408 (M is an integer equal to or greater than 2). In the following description, an arbitrary optimization apparatus 408 from among optimization apparatuses 408($1) to 408($M) is sometimes represented as "optimization apparatus 408($j)" (j=1, 2, . . . , M).

The spare apparatus 409 is a spare unit having the same configuration as that of the optimization apparatus 408. The spare apparatus 409 is activated under the control of the CPU 401 and operates as an optimization apparatus 408. Although only one spare apparatus 409 is depicted in the example of FIG. 4, the optimization problem arithmetic apparatus 101 may include two or more spare apparatuses 409.

It is to be noted that the optimization problem arithmetic apparatus 101 may include, for example, a solid state drive (SSD), an inputting apparatus, a display and so forth in addition to the components described above. Further, the optimization problem arithmetic apparatus 101 may not include, for example, the disk drive 403, disk 404, portable recording medium I/F 406 or portable recording medium 407 among the components described above. Meanwhile, the client apparatus 301 depicted in FIG. 3 includes, for example, a CPU, a memory, a communication I/F, an inputting apparatus, a display and so forth.

Figure 5:
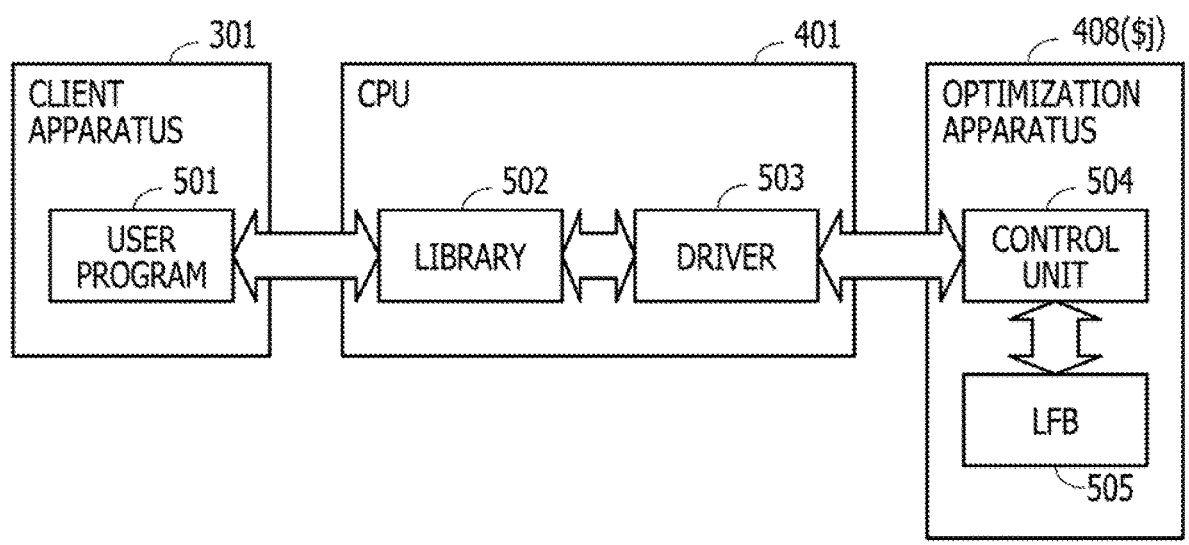
FIG. 5 is an explanatory view depicting an example of a relation of hardware components in an information processing system.

FIG. 5 is an explanatory view depicting an example of a relation of hardware components in an information processing system. The information processing system described with reference to FIG. 5 may be the information processing system 300 depicted in FIG. 3. Referring to FIG. 5, the client apparatus 301 executes a user program 501. The user program 501 is provided to perform inputting of various data (for example, the substance of a problem to be solved, an operation condition of a utilization schedule of the optimization apparatus 408 and so forth) to the optimization problem arithmetic apparatus 101 and displaying and so forth of an arithmetic operation result by the optimization apparatus 408.

The CPU 401 is a processor (arithmetic unit) for executing a library 502 and a driver 503. A program of the library 502 and a program of the driver 503 are stored, for example, in the memory 402 (refer to FIG. 4).

The library 502 accepts various data inputted by the user program 501 and converts a problem to be solved by the user into a problem for searching for a lowest energy state of an Ising model. The library 502 provides information relating to the problem after the conversion (for example, a spin bit number, a bit number representative of a weighting factor, a value of the weighting factor, an initial value of a temperature parameter and so forth) to the driver 503. Further, the library 502 acquires a search result for a solution by the optimization apparatus 408($j) from the driver 503, converts the search result into result information that may be recognized easily by the user (for example, information of a result display screen image) and provides the result information to the user program 501.

The driver 503 supplies information provided from the library 502 to the optimization apparatus 408($j). Further, the driver 503 acquires a search result for a solution by an Ising model from the optimization apparatus 408($j) and provides the search result to the library 502.

The optimization apparatus 408($j) includes a control unit 504 and a local field block (LFB) 505 as hardware components.

The control unit 504 includes a RAM for storing an operation condition of the LFB 505 accepted from the driver 503 and controls arithmetic operation by the LFB 505 based on the operation condition. Further, the control unit 504 performs setting of initial values to various registers provided in the LFB 505, storage of weighting factors into the SRAM, reading out of a spin bit string (search result) after completion of the arithmetic operation and so forth. The control unit 504 is implemented, for example, by an FPGA.

The LFB 505 includes a plurality of local field elements (LFEs). The LFEs are unit elements corresponding to spin bits. One LFE corresponds to one spin bit. As hereinafter described, the optimization apparatus 408($j) includes, for example, a plurality of LFBs.

Figure 6:
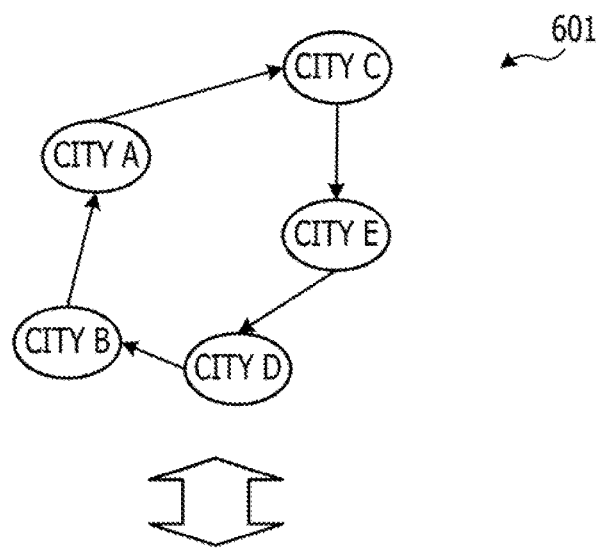
FIG. 6 is an explanatory view depicting an example of a combinatorial optimization problem.

FIG. 6 is an explanatory view depicting an example of a combinatorial optimization problem. As an example of the combinatorial optimization problem, a traveling salesman problem is considered. Here, it is assumed that a route along which a salesman travels around five cities including cities A, B, C, D and E at the lowest cost (distance, fee and so forth). A graph 601 indicates one route where a city is represented by a node and a movement between cities is represented by an edge. This route is represented, for example, by a matrix 602 in which a row is associated with an order number and a column is associated with a city. The matrix 602 indicates that cities to which a bit "1" is set are visited in an ascending order of the row number.

Further, the matrix 602 can be converted into a binary value 603 corresponding to the spin bit string. In the example of the matrix 602, the binary value 603 is represented by 5×5=25 bits. The bit number of the binary value 603 (spin bit string) increases as the number of cities of a traveling target increases. For example, as the scale of the combinatorial optimization problem increases, an increased number of spin bits are required and the bit number (scale) of the spin bit string increases.

Figure 7:
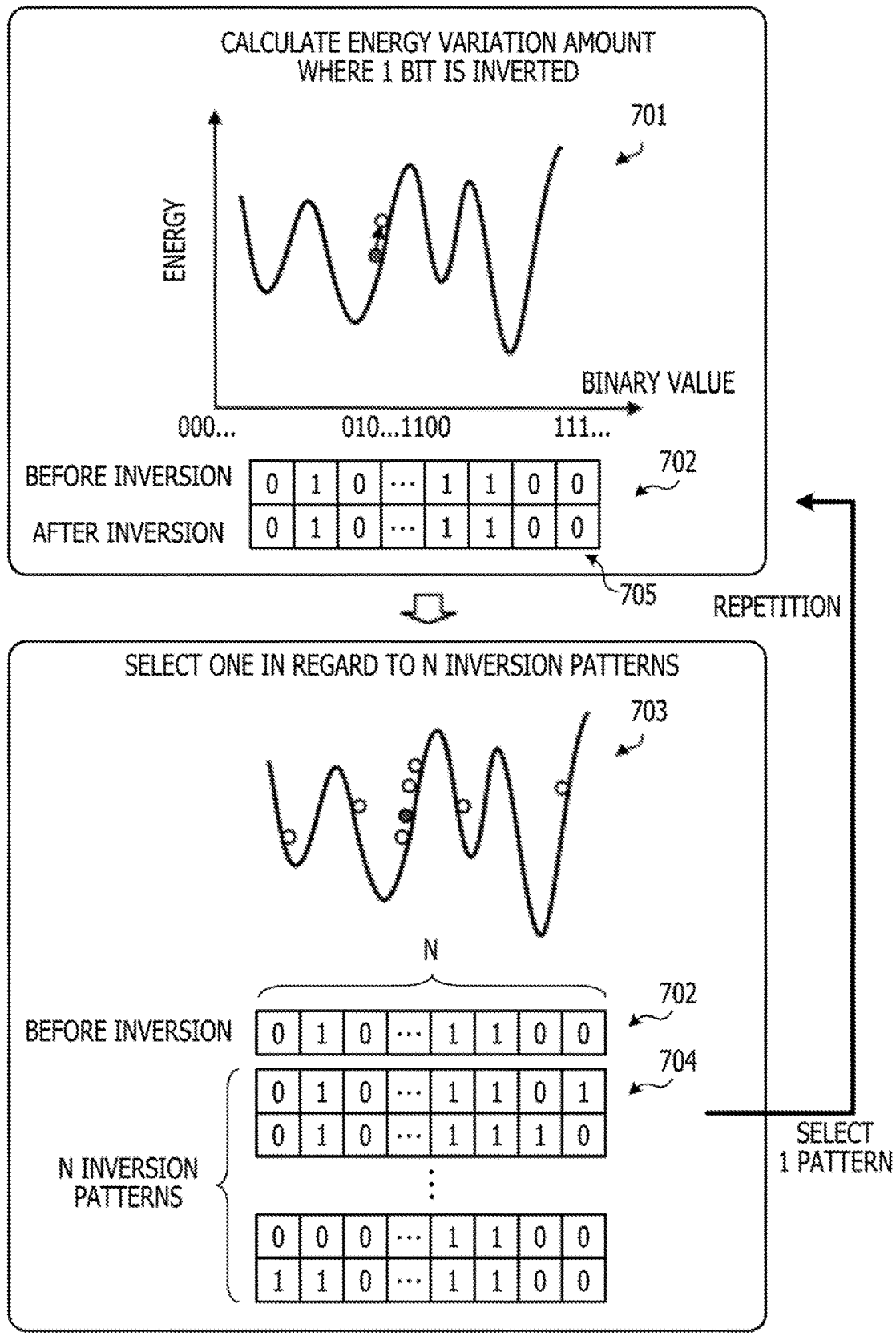
FIG. 7 is an explanatory view depicting an example of a search for a binary value that indicates lowest energy.

FIG. 7 is an explanatory view depicting an example of a search for a binary value that indicates lowest energy. Referring to FIG. 7, the energy before one bit in a binary value 702 is inverted (before spin inversion) is represented by $E_{init}$ first.

The optimization apparatus 408 calculates the energy variation amount ΔE when an arbitrary one bit of the binary value 702 is inverted. A graph 701 exemplifies an energy variation by one-bit inversion according to an energy function where the axis of abscissa indicates the binary value and the axis of ordinate indicates the energy. The optimization apparatus 408 determines ΔE, for example, by the expression (2) given hereinabove.

The optimization apparatus 408 applies the calculation described above to all bits of the binary value 702 to calculate the energy variation amount ΔE by inversion of each bit. For example, when the bit number of the binary value 702 is N, N inversion patterns 704 are obtained. A graph 701 exemplifies the state of the energy variation for each inversion pattern.

The optimization apparatus 408 selects one of the inversion patterns 704, which satisfy an inversion condition (given decision condition between the threshold value and ΔE), at random based on ΔE of the inversion patterns. The optimization apparatus 408 adds or subtracts ΔE corresponding to the selected inversion pattern to or from $E_{init}$ before the spin inversion to calculate an energy value E after the spin inversion. The optimization apparatus 408 sets the determined energy value E as $E_{init}$ and performs the procedure described above repeatedly using the binary value 705 after the spin inversion.

As described hereinabove, one factor of W used in the expressions (2) and (3) given hereinabove is a weighting factor for spin inversion indicative of a magnitude of an interaction between bits. The bit number representing a weighting factor is called accuracy. As the accuracy increases, a condition for the energy variation amount ΔE upon spin inversion may be set in increasing detail. For example, the total size of W is "accuracy×spin bit number× spin bit number" in regard to all combinations of two bits included in the spin bit string. As an example, in the case where the spin bit number is 8K (=8192), the total size of W is "accuracy×8K×8K" bits.

Now, an example of a circuit configuration of the LFB 505 that performs the search exemplified in FIG. 5 is described. The optimization apparatus 408($j) includes, for example, eight LFBs 505.

Figure 8:
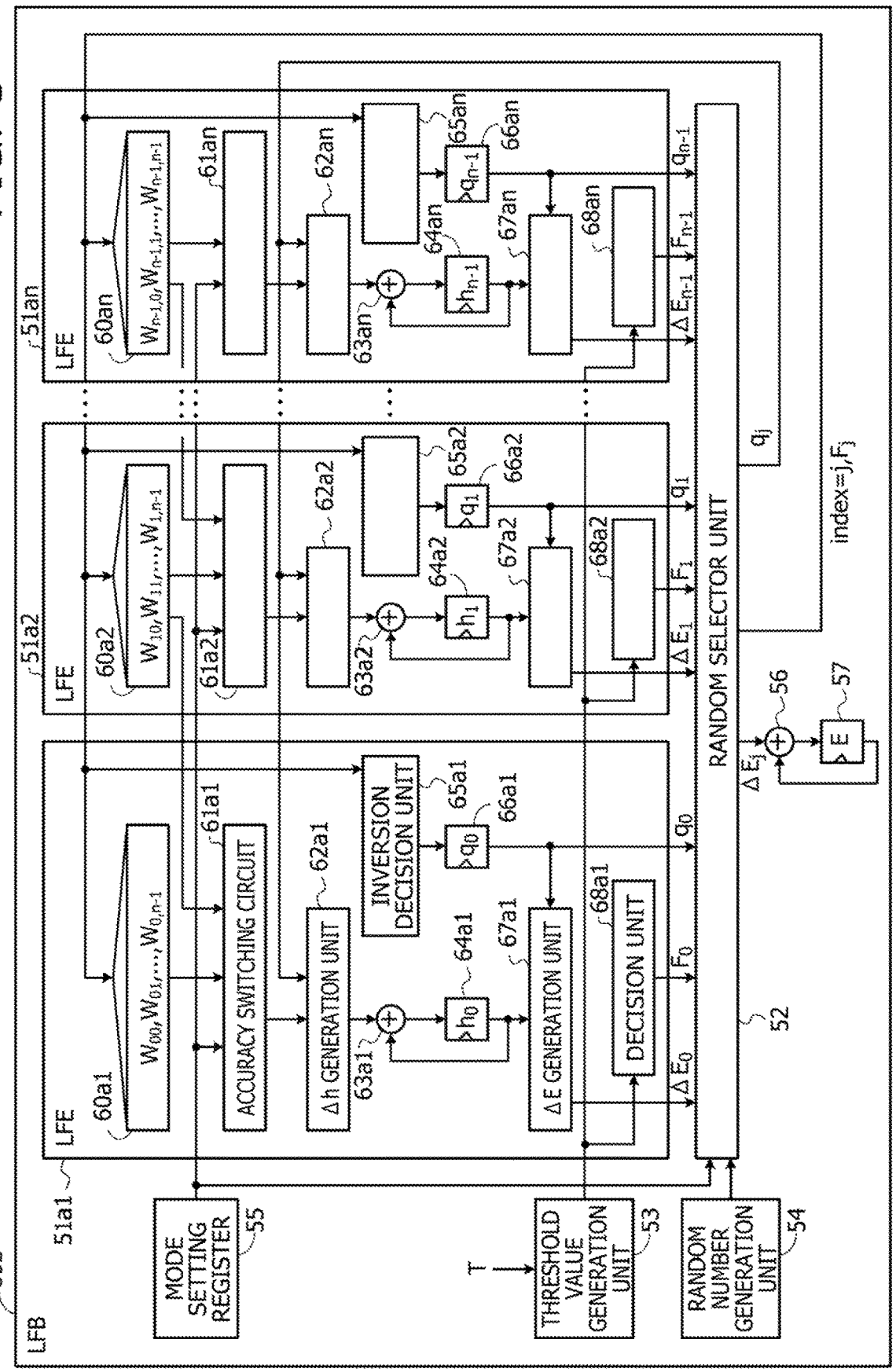
FIG. 8 is an explanatory view depicting an example of a circuit configuration of an LFB.

FIG. 8 is an explanatory view depicting an example of a circuit configuration of an LFB. Referring to FIG. 8, the LFB 505 includes LFEs 51a1, 51a2, . . . , 51an, a random selector unit 52, a threshold value generation unit 53, a random number generation unit 54, a mode setting register 55, an adder 56 and an E storage register 57.

Each of the LFEs 51a1, 51a2, . . . , 51an is used as one bit of a spin bit. n is an integer equal to or greater than 2 and indicates the number of LFEs provided in the LFB 505. With each of the LFEs 51a1, 51a2, . . . , 51an, identification information (index) of the LFE is associated. With the LFEs 51a1, 51a2, . . . , 51an, index=0, 1, . . . , n−1 are associated, respectively. The LFEs 51a1, 51a2, . . . , 51an are an example of the bit arithmetic circuits 1a1, . . . , 1aN depicted in FIG. 2.

In the following, a circuit configuration of the LFE 51a1 is described. Also the LFEs 51a2, . . . , 51an are implemented by a circuit configuration similar to that of the LFE 51a1. It is sufficient, for description of the circuit configuration of the LFEs 51a2, . . . , 51an, if the representation "a1" at the tail end of a reference character of each factor in the following description is replaced with "a2," . . . , "an" (for example, in such a manner that the reference character of "60a1" is replaced with "60an"). Also in regard to a suffix to each value such as h, q, ΔE or W, it may be replaced with a suffix corresponding to each of "a2," . . . , "an."

The LFE 51a1 includes an SRAM 60a1, an accuracy switching circuit 61a1, a Δh generation unit 62a1, an adder 63a1, an h storage register 64a1, an inversion decision unit 65a1, a bit storage register 66a1, a ΔE generation unit 67a1 and a decision unit 68a1.

The SRAM 60a1 stores weighting factors W. The SRAM 60a1 corresponds to the storage unit 11 depicted in FIG. 2. In the SRAM 60a1, weighting factors W from among the weighting factors W of all spin bits, equal in number to the weighting factors W that are to be used in the LFE 51a1, are stored. Therefore, if the spin bit number is K (K is an integer equal to or greater than 2 but equal to or smaller than n), the size of all weighting factors stored in the SRAM 60a1 is "accuracy×K" bits. In FIG. 8, as an example, a case in which the spin bit number K=n is exemplified. In this case, in the SRAM 60a1, weighting factors $W_{00}, W_{01}, \ldots, W_{0,n-1}$ are stored.

The accuracy switching circuit 61a1 acquires index that is identification information of an inversion bit and a flag F indicating that inversion is allowed from the random selector unit 52 and extracts a weighting factor corresponding to the inversion bit from the SRAM 60a1. The accuracy switching circuit 61a1 outputs the extracted weighting factor to the Δh generation unit 62a1. For example, the accuracy switching circuit 61a1 may acquire index and the flag F stored in the SRAM 60a1 by the random selector unit 52 from the SRAM 60a1. As an alternative, the accuracy switching circuit 61a1 may include a signal line (not depicted) for receiving index and the flag F supplied from the random selector unit 52.

Here, the accuracy switching circuit 61a1 accepts a setting of a bit number (accuracy) of a weighting factor set to the mode setting register 55 and switches the bit number of a weighting factor to be read out from the SRAM 60a1 in response to the setting.

For example, the accuracy switching circuit 61a1 includes a selector for reading out a bit string of a given unit number of bits (unit bit string) from the SRAM 60a1. The accuracy switching circuit 61a1 reads out a unit bit string of a bit number r including a weighting factor corresponding to the inversion bit by the selector. For example, in the case where the unit bit number r to be read out by the selector is greater than a bit number z of the weighting factor, the accuracy switching circuit 61a1 shifts the bit portion indicative of the weighting factor corresponding to the inversion bit from within the read out bit string to the least significant bit (LSB) side and substitutes 0 into any other bit portion and then performs reading out of the weighting factor. As an alternative, a case may be conceivable in which the unit bit number r is smaller than the bit number z set by the mode setting register 55. In this case, the accuracy switching circuit 61a1 may combine the plurality of unit bit strings read out by the selector to extract the weighting factor with the set bit number z.

It is to be noted that the accuracy switching circuit 61a1 is coupled also to the SRAM 60a2 provided in the LFE 51a2. As hereinafter described, also it is possible for the accuracy switching circuit 61a1 to read out a weighting factor from the SRAM 60a2.

The Δh generation unit 62a1 accepts a current bit value (bit value before inversion in the current cycle) of the inversion bit from the random selector unit 52, and calculates a variation amount $\Delta h_0$ of a local field $h_0$ by the expression (4) given hereinabove using the weighting factor acquired from the accuracy switching circuit 61a1. The Δh generation unit 62a1 outputs $\Delta h_0$ to the adder 63a1.

The adder 63a1 adds $\Delta h_0$ to the local field $h_0$ stored in the h storage register 64a1 and outputs the sum to the h storage register 64a1.

The h storage register 64a1 fetches a value outputted from the adder 63a1 (local field $h_0$) in synchronism with a dock signal not depicted. The h storage register 64a1 is, for example, a flip-flop. It is to be noted that the initial value of the local field $h_0$ stored in the h storage register 64a1 is a bias factor $b_0$. The initial value is set by the control unit 504.

The inversion decision unit 65a1 accepts index=j of the inversion bit and the flag $F_j$ indicative of the reversibility from the random selector unit 52 and decides whether or not the own bit is selected as the inversion bit. In the case where the own bit is selected as the inversion bit, the inversion decision unit 65a1 inverses the spin bit stored in the bit storage register 66a1.

The bit storage register 66a1 holds a spin bit corresponding to the LFE 51a1. The bit storage register 66a1 is, for example, a flip-flop. The spin bit stored in the bit storage register 66a1 is inverted by the inversion decision unit 65a1. The bit storage register 66a1 outputs the spin bit to the ΔE generation unit 67a1 and the random selector unit 52.

The ΔE generation unit 67a1 calculates the energy variation amount $\Delta E_0$ of the Ising model according to the inversion of the own bit by the expression (2) given hereinabove based on the local field $h_0$ of the h storage register 64a1 and the spin bit of the bit storage register 66a1. The ΔE generation unit 67a1 outputs the energy variation amount $\Delta E_0$ to the decision unit 68a1 and the random selector unit 52.

The decision unit 68a1 compares the energy variation amount $\Delta E_0$ outputted from the ΔE generation unit 67a1 with the threshold value generated by the threshold value generation unit 53 to generate a flag $F_0$ indicative of whether or not inversion of the own bit is to be allowed (indicative of reversibility of the own bit) and outputs the flag $F_0$ to the random selector unit 52. For example, the decision unit 68a1 outputs $F_0=1$ (inversion is allowed) when $\Delta E_0$ is smaller than the threshold value $-(T \cdot f^{-1}(u))$, but outputs $F_0=0$ (inversion is not allowed) when $\Delta E_0$ is equal to or greater than the threshold value $-(T \cdot f^{-1}(u))$. Here, $f^{-1}(u)$ is a function given by one of the expression (9) and the expression (10) in accordance with an applicable rule. Further, u is a uniform random number within the interval [0, 1].

The random selector unit 52 accepts an energy variation amount, a flag indicative of reversibility of a spin bit and the spin bit from each of the LFEs 51a1, 51a2, ..., 51an, and selects a bit (inversion bit) to be inverted from among spin bits whose inversion is allowed.

The random selector unit 52 supplies the current bit value (bit $q_j$) of the selected inversion bit to the Δh generation units 62a1, 62a2, ..., 62an provided in the LFEs 51a1, 51a2, ..., 51an, respectively. The random selector unit 52 is an example of the selection circuit unit 2 depicted in FIG. 2.

The random selector unit 52 outputs index=j of the inversion bit and the flag $F_j$ indicative of the reversibility to the SRAMs 60a1, 60a2, ..., 60an provided in the LFEs 51a1, 51a2, ..., 51an, respectively. It is to be noted that the random selector unit 52 may output index=j of the inversion bit and the flag $F_j$ indicative of the reversibility to the accuracy switching circuits 61a1, 61a2, ..., 61an provided in the LFEs 51a1, 51a2, ..., 51an, respectively, as described hereinabove.

Further, the random selector unit 52 outputs index=j of the inversion bit and the flag $F_j$ indicative of the reversibility to the inversion decision units 65a1, 65a2, ..., 65an provided in the LFEs 51a1, 51a2, ..., 51an, respectively. Furthermore, the random selector unit 52 supplies $\Delta E_j$ corresponding to the selected inversion bit to the adder 56.

Here, the random selector unit 52 accepts a setting of a spin bit number in a certain Ising model (for example, the number of LFEs to be used) from the mode setting register 55. For example, the random selector unit 52 uses the LFEs corresponding in number to the set spin bit number in an ascending order of index such that a search for a solution is performed. For example, in the case where K LFEs are to be used from among the n LFEs, the random selector unit 52 selects an inversion bit from within a spin bit string corresponding to the LFEs 51a1, ..., 51aK. At this time, it is conceivable that, for example, the random selector unit 52 compulsorily sets the flag F outputted from each of the n–K LFEs 51a(K-1), ..., 51an that are not used to zero.

The threshold value generation unit 53 generates and supplies a threshold value to be used for comparison with the energy variation amount ΔE to the decision units 68a1, 68a2, ..., 68an provided in the LFEs 51a1, 51a2, ..., 51an, respectively. As described hereinabove, the threshold value generation unit 53 generates a threshold value using the temperature parameter T, a uniform random number u within the interval [0, 1] and $f^{-1}(u)$ indicated by the expression (9) or the expression (10). The threshold value generation unit 53 includes a random number generator, for example, individually for each LFE and generates a threshold value using the uniform random number u for each LFE. However, a random number generator may be shared by several LFEs. The initial value of the temperature parameter T and the decreasing cycle or the decreasing amount of the temperature parameter T in simulated annealing and so forth are controlled by the control unit 504.

The random number generation unit 54 generates a random number bit to be used for selection of an inversion bit in the random selector unit 52 and supplies the random number bit to the random selector unit 52.

The mode setting register 55 supplies a signal indicative of a bit number of a weighting factor (for example, an accuracy of a problem) to the accuracy switching circuits 61a1, 61a2, ..., 61an provided in the LFEs 51a1, 51a2, ..., 51an, respectively. Further, the mode setting register 55 supplies a signal indicative of a spin bit number (for example, a scale of a problem) to the random selector unit 52. Setting of a spin bit number or a bit number of a weighting factor to the mode setting register 55 is performed by the control unit 504. The mode setting register 55 is an example of the setting changing unit 5 depicted in FIG. 2.

The adder 56 adds an energy variation amount $\Delta E_j$ outputted from the random selector unit 52 to the energy value E stored in the E storage register 57 and outputs a result of the addition to the E storage register 57.

The E storage register 57 fetches the energy value E outputted from the adder 56 in synchronism with a clock signal not depicted. The E storage register 57 is, for example, a flip-flop. It is to be noted that the initial value of the energy value E is calculated using the expression (1) given hereinabove by the control unit 504 and is set to the E storage register 57.

For example, in the case where K LFEs are used for a search for a solution, the control unit 504 obtains a spin bit string by reading out the spin bits of the bit storage registers 66a1, ..., 66aK.

Figure 9:
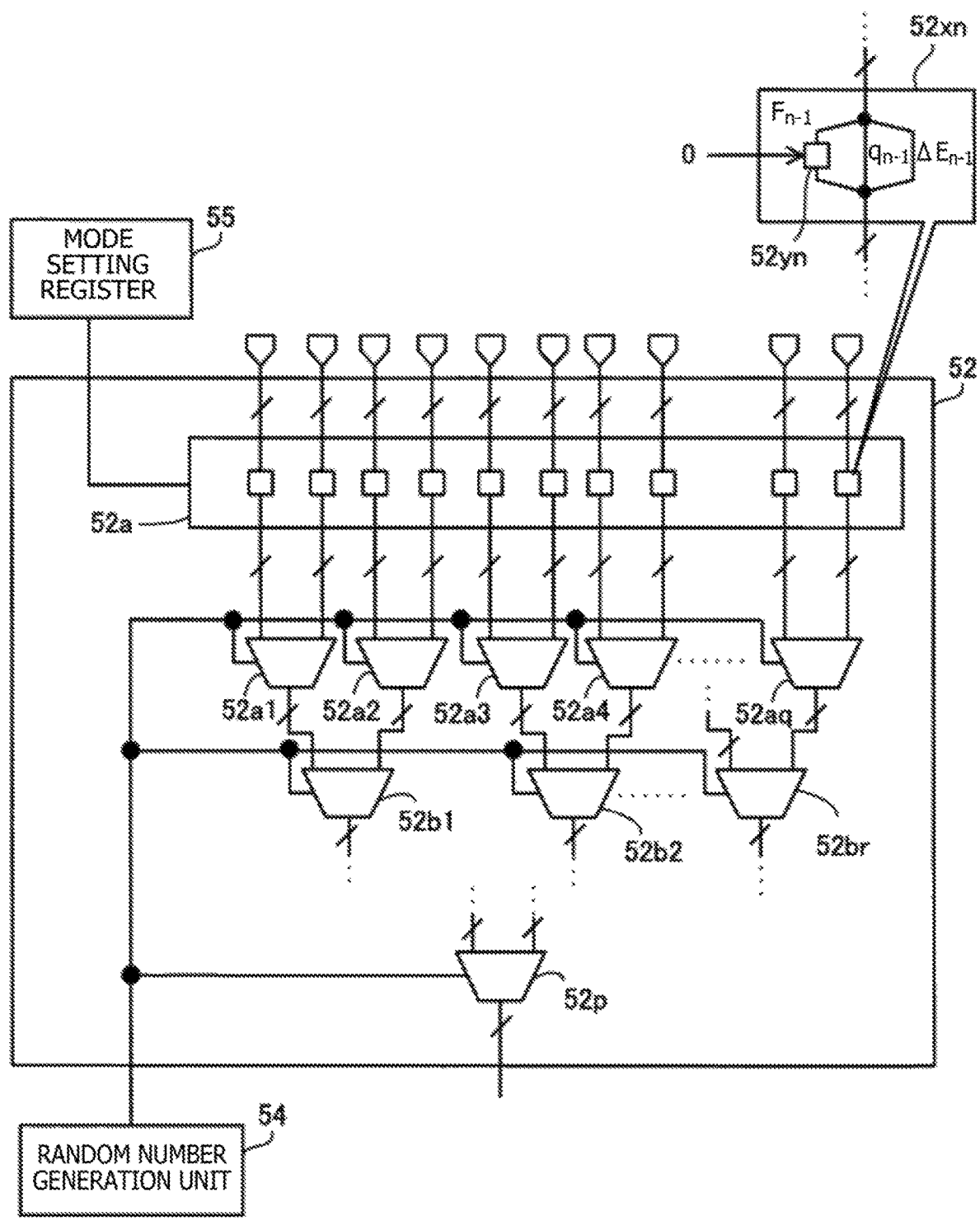
FIG. 9 is an explanatory view depicting an example of a circuit configuration of a random selector unit.

FIG. 9 is an explanatory view depicting an example of a circuit configuration of a random selector unit. Referring to FIG. 9, the random selector unit 52 includes a flag controlling unit 52a and a plurality of selection circuits coupled in a tree state including a plurality of stages.

The flag controlling unit 52a controls the value of a flag to be inputted to each of selection circuits 52a1, 52a2, 52a3, 52a4, ..., 52aq at the first stage in response to a setting of the spin bit number of the mode setting register 55. In FIG.

9, a partial circuit $52xn$ for controlling the value of a flag to be inputted to one input of the selection circuit $52aq$ (corresponding to an output of the LFE $51an$) is exemplified. A flag setting unit $52yn$ of the partial circuit $52xn$ is a switch for compulsorily setting a flag Fn to be outputted from the LFE $51an$ that is not used to zero.

To each of the selection circuits $52a1$, $52a2$, $52a3$, $52a4, \ldots, 52aq$ at the first stage, two sets each including a variable $q_i$, which is outputted from each of the LFEs $51a1$, $51a2, \ldots, 51an$, $F_i$ and $\Delta E_i$, are inputted. For example, to the selection circuit $52a1$, a set including a variable $q_0$ outputted from the LFE $51a1$, $F_0$ and $\Delta E_0$ and another set including a variable $q_1$ outputted from the LFE $51a2$, $F_1$ and $\Delta E_1$ are inputted. Further, to the selection circuit $52a2$, a set including a variable $q_2$, $F_2$ and $\Delta E_2$ and another set including a variable $q_3$, $F_3$ and $\Delta E_3$ are inputted, and to the selection circuit $52a3$, a set including a variable $q_4$, $F_4$ and $\Delta E_4$ and another set including a variable $q_5$, $F_5$ and $\Delta E_5$ are inputted. Furthermore, to the selection circuit $52a4$, a set including a variable $q_6$, $F_6$ and $\Delta E_6$ and another set including a variable $q_7$, $F_7$ and $\Delta E_7$ are inputted, and to the selection circuit $52aq$, a set including a variable $q_{n-2}$, $F_{n-2}$ and $\Delta E_{n-2}$ and another set including a variable $q_{n-1}$, $F_{n-1}$ and $\Delta E_{n-1}$ are inputted.

Then, each of the selection circuits $52a1, \ldots, 52aq$ selects, based on the two sets of the variable $q_i$, $F_i$ and $\Delta E_i$ inputted thereto and a one-bit random number outputted from the random number generation unit $54$, a variable $q_i$, $F_i$ and $\Delta E_i$ of one set. At this time, each of the selection circuits $52a1, \ldots, 52aq$ preferentially selects a set in which $F_i$ is 1 and selects, in the case where $F_i$ is 1 in both sets, one of the sets based on the one-bit random number (this similarly applies also to the other selection circuits). Here, the random number generation unit $54$ generates a one-bit random number individually for each selection circuit and supplies the one-bit random number to each selection circuit. Further, each of the selection circuits $52a1, \ldots, 52aq$ generates an identification value of one bit indicative of the variable $q_i$, $F_i$ and $\Delta E_i$ of which set are selected and outputs a signal including the selected variable $q_i$, $F_i$ and $\Delta E_i$ and the identification value (referred to as state signal). It is to be noted that the number of the selection circuits $52a1, \ldots, 52aq$ at the first stage is one half the number of LFEs $51a1$, $51a2, \ldots, 51an$, for example, n/2.

To each of the selection circuits $52b1$, $52b2, \ldots, 52br$ at the second stage, two state signals outputted from the selection circuits $52a1, \ldots, 52aq$ are inputted. For example, to the selection circuit $52b1$, state signals outputted from the selection circuits $52a1$ and $52a2$ are inputted, and to the selection circuit $52b2$, state signals outputted from the selection circuits $52a3$ and $52a4$ are inputted.

Then, each of the selection circuits $52b1, \ldots, 52br$ selects, based on two state signals and a one-bit random number outputted from the random number generation unit $54$, one of the two state signals. Further, each of the selection circuits $52b1, \ldots, 52br$ adds, to an identification value included in the selected state signal, one bit such that it indicates which one of the state signals is selected to update the identification value and outputs the selected state signal.

Similar processing is performed also by the selection circuits at the third and succeeding stages and the bit width of an identification value successively increases by one bit at the selection circuit at each stage, and a state signal that is an output of the random selector unit $52$ is outputted from the selection circuit $31p$ at the last stage. The identification value included in the state signal outputted from the random selector unit $52$ is index indicative of an inversion bit represented by a binary number.

It is to be noted that the random selector unit $52$ may accept index corresponding to the LFE together with the flag F from each LFE and output index corresponding to an inversion bit by performing selection of index by each selection circuit similarly to the variable $q_i$, $F_i$ and $\Delta E_i$. In this case, each LFE includes a register for storage of index and outputs index from the register to the random selector unit $52$.

In this manner, the random selector unit $52$ sets a signal, which is outputted from each of the LFEs $51a(K+1), \ldots, 51an$ other than the LFEs $51a1, \ldots, 51aK$ equal in number to the set spin bit number K from among the LFEs $51a1, \ldots, 51an$ and is indicative of the reversibility, compulsorily so as to indicate that inversion is not allowed. The random selector unit $52$ selects an inversion bit based on the signals indicative of the reversibility and outputted from the LFEs $51a1, \ldots, 51aK$ and the signals set to the LFEs $51a(K+1), \ldots, 51an$ and indicating that inversion is not allowed. The random selector unit $52$ outputs a signal indicative of the inversion bit to the bit arithmetic circuits $51a1, \ldots, 51aK$ and also to the LFEs $51a(K+1), \ldots, 51an$.

Since the flag F of any LFE that is not used is compulsorily set to 0 under the control of the flag controlling unit $52a$ in this manner, the bits corresponding to the LFEs that are not used for the spin bit string may be excluded from inversion candidates.

Now, an example of storage of weighting factors into the SRAMs $60a1$, $60a2, \ldots, 60an$ of the LFEs $51a1$, $51a2, \ldots, 51an$ is described. First, a tradeoff relation between the scale and the accuracy in regard to the SRAM capacity is described.

Figure 10:
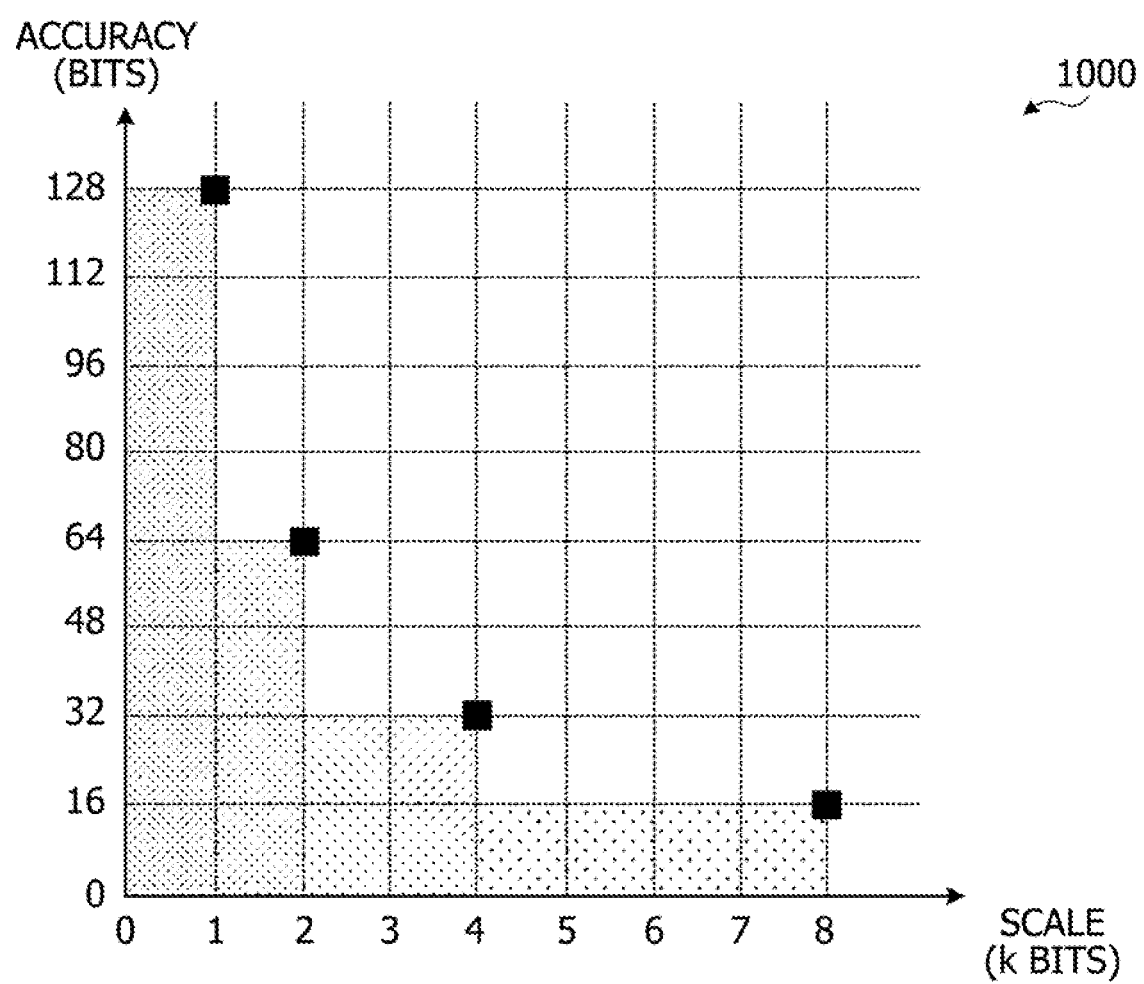
FIG. 10 is an explanatory view depicting an example of a tradeoff relation between a scale and an accuracy.

FIG. 10 is an explanatory view depicting an example of a tradeoff relation between the scale and the accuracy. Referring to FIG. 10, a graph $1000$ indicates a tradeoff relation between the scale and the accuracy in the case where the upper limit to the capacity for storage of weighting factors in an SRAM for each LFE is 128K (kilo) bits. Here, 1K=1024. The axis of abscissa of the graph $1000$ is the scale (Kbit) and the axis of ordinate is the accuracy (bit). Note that, as an example, n=8192 is assumed.

In this case, for the scale of 1 Kbit, the accuracy is 128 bits in the maximum. Further, for the scale of 2 Kbits, the accuracy is 64 bits in the maximum. For the scale of 4 Kbits, the accuracy is 32 bits in the maximum. For the scale of 8 Kbits, the accuracy is 16 bits in the maximum.

Therefore, it is assumed that the optimization apparatus $408$($j) can utilize, for example, the following four modes. Each mode corresponds to a partition mode. The first mode is a mode of the scale 1 Kbit/accuracy 128 bits. The second mode is a mode of the scale 2 Kbits/accuracy 64 bits. The third mode is a mode of the scale 4 Kbits/accuracy 32 bits. The fourth mode is a mode of the scale 8 Kbits/accuracy 16 bits.

Now, an example of storage of weighting factors according to each of the four modes is described. The weighting factors are individually stored into the SRAMs $60a1$, $60a2, \ldots, 60an$ by the control unit $504$. Note that it is assumed that the unit bit number to be read out from the SRAMs $60a1$, $60a2, \ldots, 60an$ by the selectors of the accuracy switching circuits $61a1$, $61a2, \ldots, 61an$, respectively, is 128 bits as an example.

Figure 11:
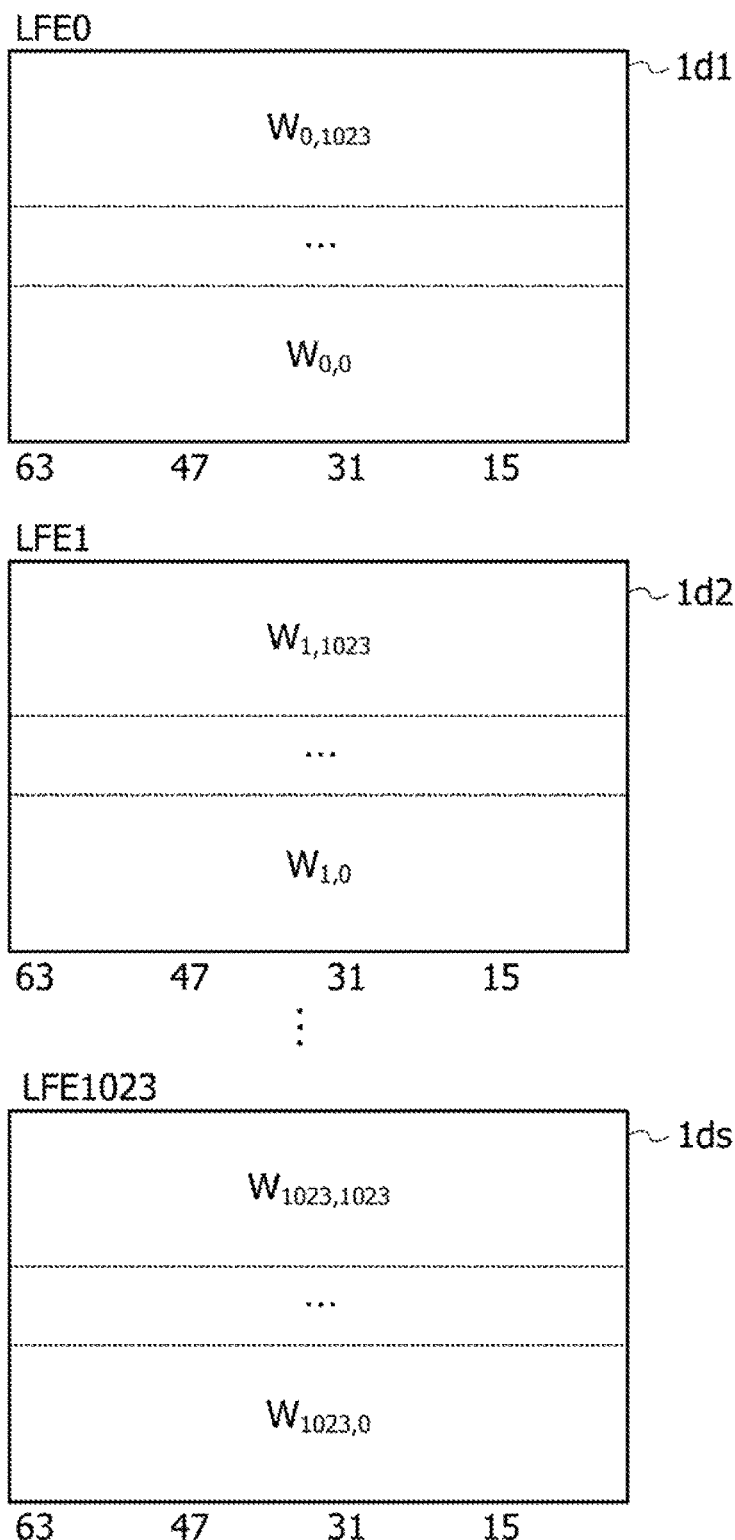
FIG. 11 is an explanatory view (part 1) depicting an example of storage of weighting factors.

FIG. 11 is an explanatory view (part 1) depicting an example of storage of weighting factors. In the case where the first mode (scale 1 Kbit/accuracy 128 bits) is used, the weighting factor W is represented by the following expression (11).

$$W = \begin{pmatrix} W_{0,0} & \cdots & W_{0,1023} \\ \vdots & \ddots & \vdots \\ W_{1023,0} & \cdots & W_{1023,1023} \end{pmatrix} \quad (11)$$

Data $1d1, 1d2, \ldots, 1ds$ indicate an example of storage of weighting factors in the SRAMs $60a1, 60a2, \ldots, 60as$ in the case where the first mode (scale 1 Kbit/accuracy 128 bits) is used. Here, s=1024. The data $1d1, 1d2, \ldots, 1ds$ are stored into the SRAMs $60a1, 60a2, \ldots, 60as$, respectively. In this mode, 1K (=1024) LFEs are used. It is to be noted that, in FIG. 11, the LFEs $51a1, \ldots, 51as$ are sometimes represented, using the individual identification numbers, as LFE0, ..., LFE1023 (this similarly applies also to the succeeding figures).

The data $1d1$ indicates $W_{0,0}$ to $W_{0,1023}$ stored in the SRAM $60a1$ of the LFE $51a1$ (LFE0). The data $1d2$ indicates $W_{1,0}$ to $W_{1,1023}$ stored in the SRAM $60a2$ of the LFE $51a2$ (LFE1). The data $1ds$ indicates $W_{1023,0}$ to $W_{1023,1023}$ stored in the SRAM $60as$ of the LFE $51as$ (LFE1023). The bit number of one weighting factor $W_{ij}$ is 128 bits.

Figure 12:
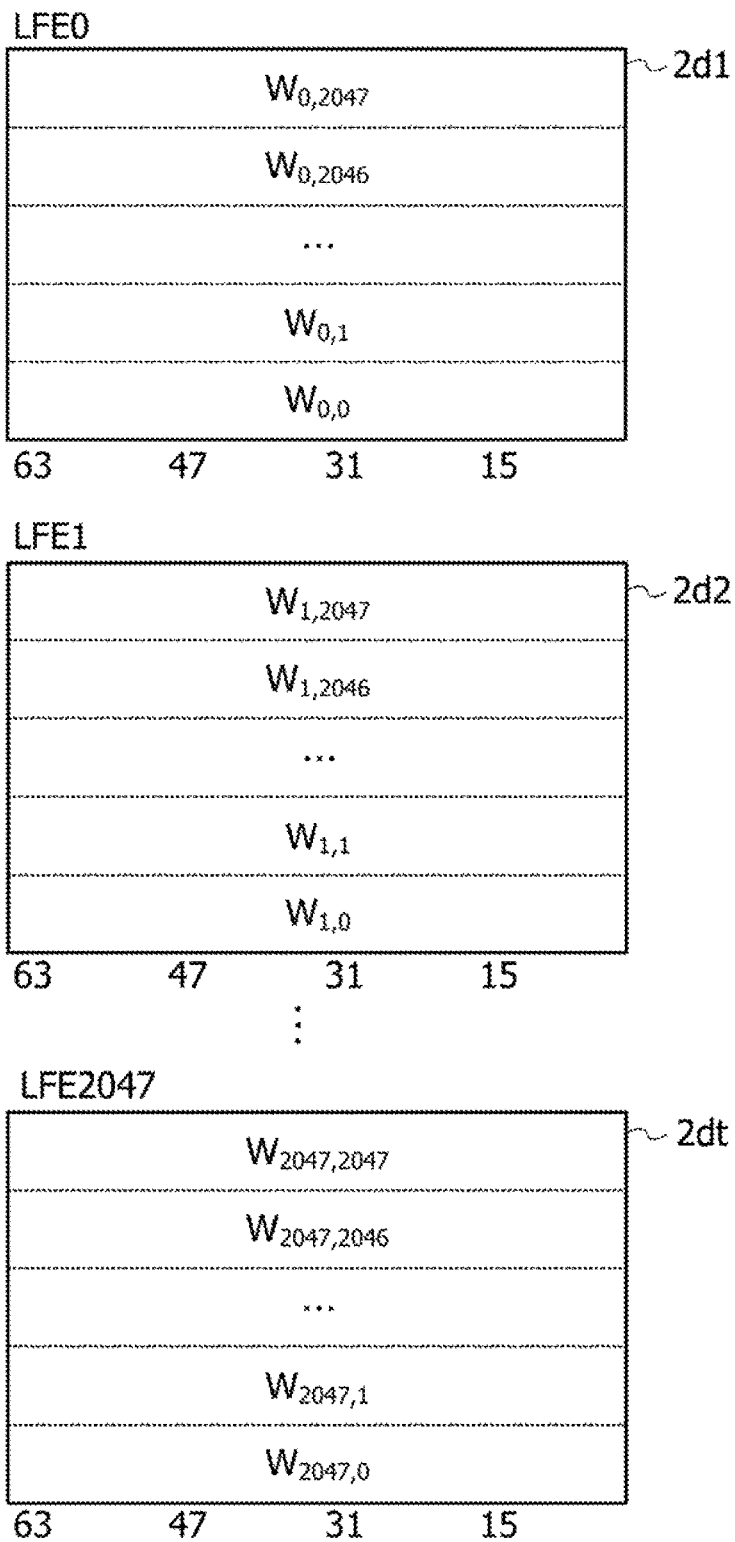
FIG. 12 is an explanatory view (part 2) depicting an example of storage of weighting factors.

FIG. 12 is an explanatory view (part 2) depicting an example of storage of weighting factors. In the case where the second mode (scale 2 Kbits/accuracy 64 bits) is used, the weighting factor W is represented by the following expression (12).

$$W = \begin{pmatrix} W_{0,0} & \cdots & W_{0,2047} \\ \vdots & \ddots & \vdots \\ W_{2047,0} & \cdots & W_{2047,2047} \end{pmatrix} \quad (12)$$

Data $2d1, 2d2, \ldots, 2dt$ indicate an example of storage of weighting factors in the SRAMs $60a1, 60a2, \ldots, 60at$ in the case where the second mode (scale 2 Kbits/accuracy 64 bits) is used. Here, t=2048. The data $2d1, 2d2, \ldots, 2dt$ are stored into the SRAMs $60a1, 60a2, \ldots, 60at$, respectively. In this mode, 2K (=2048) LFEs are used.

The data $2d1$ indicates $W_{0,0}$ to $W_{0,2047}$ stored in the SRAM $60a1$ of the LFE $51a1$ (LFE0). The data $2d2$ indicates $W_{1,0}$ to $W_{1,2047}$ stored in the SRAM $60a2$ of the LFE $51a2$ (LFE1). The data $2dt$ indicates $W_{2047,0}$ to $W_{2047,2047}$ stored in the SRAM $60at$ of the LFE $51at$ (LFE2047). The bit number of one weighting factor $W_{ij}$ is 64 bits.

FIG. 13 is an explanatory view (part 3) depicting an example of storage of weighting factors. In the case where the third mode (scale 4 Kbits/accuracy 32 bits) is used, the weighting factor W is represented by the following expression (13).

$$W = \begin{pmatrix} W_{0,0} & \cdots & W_{0,4095} \\ \vdots & \ddots & \vdots \\ W_{4095,0} & \cdots & W_{4095,4095} \end{pmatrix} \quad (13)$$

Data $3d1, 3d2, \ldots, 3du$ indicate an example of storage of weighting factors in the SRAMs $60a1, 60a2, \ldots, 60au$ in the case where the third mode (scale 4 Kbits/accuracy 32 bits) is used. Here, u=4096. The data $3d1, 3d2, \ldots, 3du$ are stored into the SRAMs $60a1, 60a2, \ldots, 60au$, respectively. In this mode, 4K (=4096) LFEs are used.

The data $3d1$ indicates $W_{0,0}$ to $W_{0,4095}$ stored in the SRAM $60a1$ of the LFE $51a1$ (LFE0). The data $3d2$ indicates $W_{1,0}$ to $W_{1,4095}$ stored in the SRAM $60a2$ of the LFE $51a2$ (LFE1). The data $3du$ indicates $W_{4095,0}$ to $W_{4095,4095}$ stored in the SRAM $60au$ of the LFE $51au$ (LFE4095). The bit number of one weighting factor $W_{ij}$ is 32 bits.

FIG. 14 is an explanatory view (part 4) depicting an example of storage of weighting factors. In the case where the fourth mode (scale 8 Kbits/accuracy 16 bits) is used, the weighting factor W is represented by the following expression (14).

$$W = \begin{pmatrix} W_{0,0} & \cdots & W_{0,8191} \\ \vdots & \ddots & \vdots \\ W_{8191,0} & \cdots & W_{8191,8191} \end{pmatrix} \quad (14)$$

Data $4d1, 4d2, \ldots, 4dn$ indicate an example of storage of weighting factors in the SRAMs $60a1, 60a2, \ldots, 60an$ in the case where the fourth mode (scale 8 Kbits/accuracy 16 bits) is used. Here, n=8192. The data $4d1, 4d2, \ldots, 4dn$ are stored into the SRAMs $60a1, 60a2, \ldots, 60an$, respectively. In this mode, 8K (=8192) LFEs are used.

The data $4d1$ indicates $W_{0,0}$ to $W_{0,8191}$ stored in the SRAM $60a1$ of the LFE $51a1$ (LFE0). The data $4d2$ indicates $W_{1,0}$ to $W_{1,8191}$ stored in the SRAM $60a2$ of the LFE $51a2$ (LFE1). The data $4dn$ indicates $W_{8191,0}$ to $W_{8191,8191}$ stored in the SRAM $60an$ of the LFE $51an$ (LFE8191). The bit number of one weighting factor $W_{ij}$ is 16 bits.

Now, an arithmetic processing procedure of the optimization apparatus $408(\$j)$ is described. It is to be noted that initial values and operation conditions according to a problem are inputted to the optimization apparatus $408(\$j)$. The initial values include, for example, initial values of the energy value E, local field $h_i$, spin bit $q_i$ and temperature parameter T, weighting factor W and so forth. The operation conditions include those of an update time number N1 of a state with one temperature parameter, a change time number N2 of the temperature parameter, the decreasing width of the temperature parameter, and so forth. The control unit 504 sets the inputted initial values and operation conditions to the registers and the SRAMs of the LFEs described hereinabove.

Figure 15:
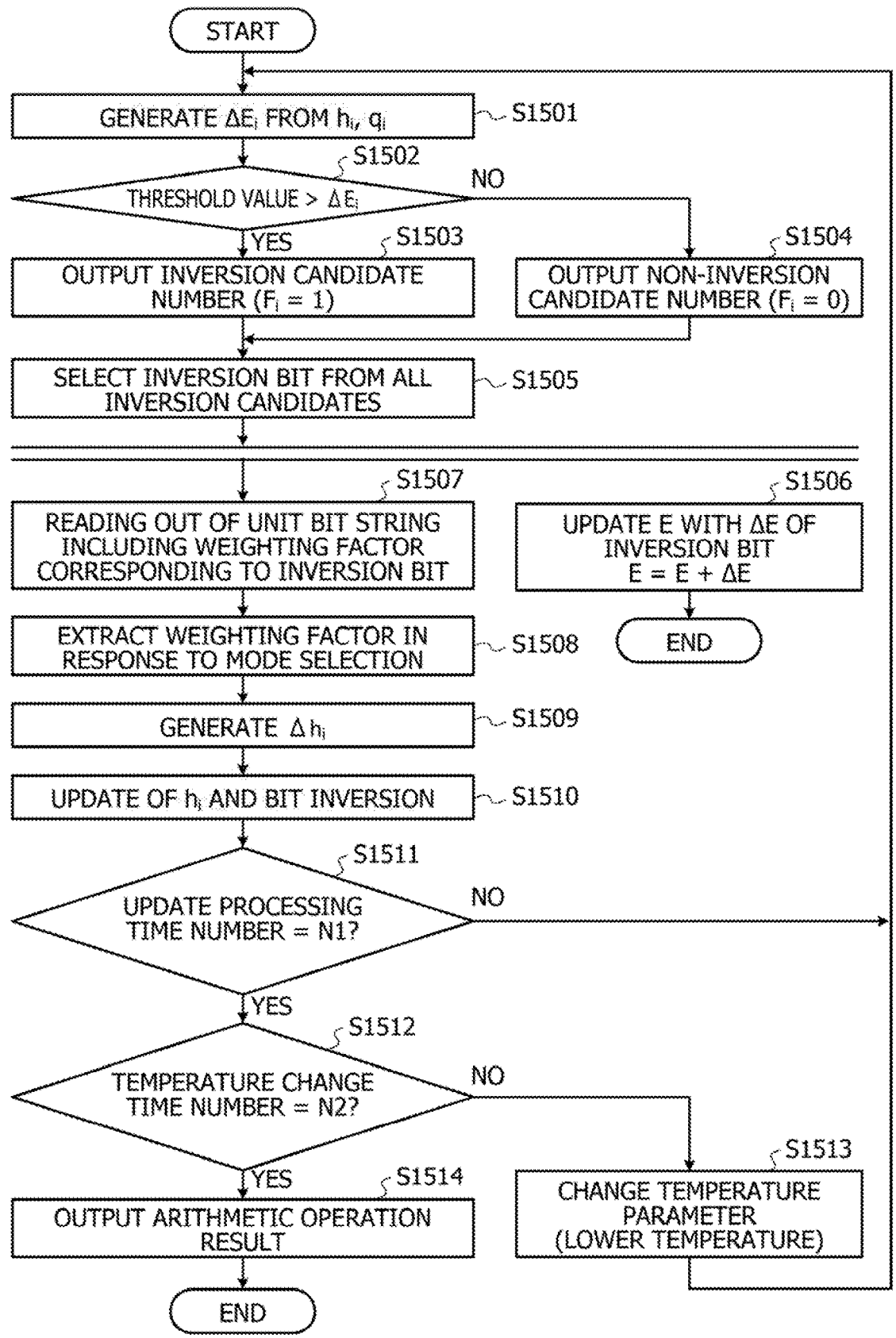
FIG. 15 is a flow chart depicting an example of an arithmetic operation processing procedure of an optimization apparatus.

FIG. 15 is a flow chart depicting an example of the arithmetic operation processing procedure of the optimization apparatus $408(\$j)$. In the description of FIG. 15, it is written that the LFE corresponding to index=i is the LFE $51ax$ (the first LFE is the LFE $51a1$ and the nth LFE is the LFE $51an$). Also each component included in the LFE $51ax$ is written with "x" added to the tall end of a reference character like, for example, SRAM $60ax$. Arithmetic operations by the LFEs $51a1, \ldots, 51an$ are executed in parallel.

Referring to the flow chart of FIG. 15, the $\Delta E$ generation unit $67ax$ generates an energy variation amount $\Delta E_i$ in the case where the bit $q_i$ is inverted based on the local field $h_i$ stored in the h storage register $64ax$ and the bit $q_i$ stored in the bit storage register $66ax$ (step S1501). For generation of $\Delta E_i$, the expression (2) given hereinabove is used.

The decision unit $68ax$ compares the energy variation amount $\Delta E_i$ generated by the $\Delta E$ generation unit $67ax$ and the threshold value $(=-(T \cdot f^{-1}(u)))$ generated by the threshold value generation unit 53 with each other to decide whether or not the threshold value>$\Delta E_i$ is satisfied (step S1502). Here, in the case where the threshold value>$\Delta E_i$ (step S1502: Yes) is satisfied, the processing advances to step S1503. In the case where the threshold value $\leq \Delta E_i$ (step S1502: No) is satisfied, the processing advances to step S1504.

The decision unit 68*ax* outputs an inversion candidate signal ($F_i$=1) to the random selector unit 52 (step S1503). Then, the processing advances to step S1505.

The decision unit 68*ax* outputs a non-inversion candidate signal ($F_i$=0) to the random selector unit 52 (step S1504). Then, the processing advances to step S1505.

At step S1505, the random selector unit 52 selects one inversion bit from among all inversion candidates (bits corresponding to the LFEs that satisfy $F_i$=1) outputted from the LFEs 51*a*1, ..., 51*a*n. The random selector unit 52 outputs index=j, $F_j$ and $q_j$ corresponding to the selected inversion bit to the LFEs 51*a*1, ..., 51*a*n. Further, the random selector unit 52 outputs $\Delta E_j$ corresponding to the selected inversion bit to the adder 56. Consequently, the next steps S1506 (energy update process) and S1507 (state update process) are started in parallel.

The adder 56 adds the energy variation amount $\Delta E$ corresponding to the inversion bit to the energy value E to update the energy value E stored in the E storage register 57 (step S1506). For example, E=E+$\Delta E$. Then, the energy update process ends.

The accuracy switching circuit 61*ax* acquires index=j and the flag $F_j$ corresponding to the inversion bit and reads out a unit bit string including a weighting factor corresponding to the inversion bit from the SRAM 60*ax* (step S1507). The unit bit string is a unit of a bit string that is read out all at once from the SRAM 60*ax* by the selector of the accuracy switching circuit 61*ax*. The bit number of the unit bit string (unit bit number) is 128 bits as an example (may be some other number). In this case, at step S1507, a unit bit string of 128 bits is read out from the SRAM 60*ax*.

For example, in the case where 128/a (a=1, 2, 4 or 8) bits are selected as the accuracy, the accuracy switching circuit 61*ax* reads out the "Integer(J/a)"th unit bit string as counted from the top (top is counted as 0th) unit bit string of the SRAM 60*ax*. Here, Integer(j/a) is a function for extracting the integer part from a value of (j/a).

The accuracy switching circuit 61*ax* extracts, from the unit bit string read out at step S1507, a weighting factor $W_{ij}$ (weighting factor corresponding to the inversion bit $q_j$) of a bit number according to the mode selection set by the mode setting register 55 (step S1508). For example, where a bit string of z bits is to be extracted from a unit bit string of 128 bits, the accuracy switching circuit 61*ax* shifts the bit range of z bits corresponding to the inversion bit to the LSB side and sets 0 to the other upper bits to extract a weighting factor of z bits as described hereinabove.

It is to be noted that the accuracy switching circuit 61*ax* specifies the bit range depending upon to what numbered partition from the top (0th) the bit range corresponds to the inversion bit when the unit bit string read out at step S1507 is divided into partitions of a bit length according to the accuracy from the top.

According to the examples of FIGS. 12 to 14, in the case of the accuracy of 64 bits, the bit range is the 0th partition when j is an even number while the bit range is the first partition when j is an odd number. On the other hand, in the case of the accuracy of 32 bits, the bit range is the 0th partition when mod(j, 4)=0; the bit range is the first partition when mod(j, 4)=1; the bit range is the second partition when mod(j, 4)=2; and the bit range is the third partition when mod(j, 4)=3. Here, mod(u, v) is a function indicative of a remainder when u is divided by v. Also in the case of the accuracy of 16 bits, the "mod(j, 8)"th partition from the top of the read out unit bit string of 128 bits is the bit range corresponding to the inversion bit similarly. It is to be noted that, in the case of the accuracy of 128 bits, the accuracy switching circuit 61*ax* determines the unit bit string of 128 bits read out at step S1507 as it is as the weighting factor corresponding to the inversion bit.

In the example described above, for the accuracy of 128/a (a=1, 2, 4, 8) bits, the "mod(J, a)"th partition (the size of one partition is 128/a bits) from the top of the unit bit string of 128 bits read out at step S1507 is the bit range indicative of the weighting factor corresponding to the inversion bit.

The $\Delta h$ generation unit 62*ax* generates $\Delta h_i$ based on the inversion direction of the inversion bit and the weighting factor $W_{ij}$ extracted by the accuracy switching circuit 61*ax* (step S1509). For the generation of $\Delta h_i$, the expression (4) given hereinabove is used. Further, the inversion direction of the inversion bit is decided from the inversion bit $q_j$ outputted from the random selector unit 52 (bit before the inversion in the current cycle).

At step S1510, the adder 63*ax* adds $\Delta h_i$ generated by the $\Delta h$ generation unit 62*ax* to the local field $h_i$ stored in the h storage register 64*ax* to update the local field $h_i$ stored in the h storage register 64*ax*. Further, the inversion decision unit 65*ax* decides based on index=j and the flag $F_j$ outputted from the random selector unit 52 whether or not the own bit is selected as the inversion bit. In the case where the own bit is selected as the inversion bit, the inversion decision unit 65*ax* inverts the spin bit stored in the bit storage register 66*ax*, but in the case where the own bit is not selected as the inversion bit, the inversion decision unit 65*ax* maintains the spin bit of the bit storage register 66*ax*. Here, the case where the own bit is selected as the inversion bit is a case in which index=j=i and $F_j$=1 are satisfied in regard to the signal outputted from the random selector unit 52.

The control unit 504 decides from the temperature parameter T at present whether or not the update processing time number of each of the spin bits held in the LFEs 51*a*1, ..., 51*a*n reaches N1 (whether the update processing time number=N1) (step S1511). In the case where the update processing time number reaches N1 (step S1511: Yes), the processing advances to step S1512. In the case where the update processing time number does not reach N1 (step S1511: No), the control unit 504 increments the update processing time number by 1 and advances the processing to step S1501.

The control unit 504 decides whether or not the update time number of the temperature parameter T reaches N2 (whether or not the temperature changing time number=N2 is satisfied) (step S1512). In the case where the temperature changing time number reaches N2 (step S1512: Yes), the processing advances to step S1514. In the case where the temperature changing time number does not reach N2 (step S1512: No), the control unit 504 increments the temperature changing time number by 1 and advances the processing to step S1513.

The control unit 504 changes the temperature parameter T (step S1513). For example, the control unit 504 decreases the value of the temperature parameter T with a decreasing width according to the operation condition (this is equivalent to that the temperature is lowered). Then, the processing advances to step S1501.

The control unit 504 reads out the spin bit stored in the bit storage register 66*ax* and outputs the spin bit as an arithmetic operation result (step S1514). For example, the control unit 504 reads out spin bits stored individually in the storage registers 66*a*1, ..., 66*a*K corresponding to the spin bit number K set by the mode setting register 55 and outputs the spin bits to the CPU 401. For example, the control unit 504 supplies the read out spin bit string to the CPU 401. Then, the arithmetic process ends.

It is to be noted that, at step S1505, the random selector unit 52 may exclude LFEs that are not to be used from candidates for bit inversion by compulsorily setting 0 to the value of F to be outputted from the LFEs that are not to be used in response to the setting of the mode setting register 55.

According to the optimization apparatus 408($j), it is made possible by the mode setting register 55 to set a spin bit number and a weighting factor representative of a state of an Ising model, and an arbitrary partition mode may be implemented by the optimization apparatus 408($j) of one chip.

For example, the accuracy switching circuit 61ax switches the bit length of a weighting factor to be read out from the SRAM 60ax in response to the setting of the mode setting register 55. By using the accuracy switching circuit 61ax, various accuracies may be implemented without changing the unit bit number to be read out from the SRAM 60ax by the selector of the accuracy switching circuit 61ax as indicated by step S1508. For example, the accuracy may be varied, for example, without requiring remake of signal lines for reading out for the unit bit number from the SRAM 60ax by the selector of the accuracy switching circuit 61ax.

Further, the random selector unit 52 inputs a signal representative of an inversion bit to LFEs the number of which (for example, the number is K) corresponds to the spin bit number set by the mode setting register 55 and selects an inversion bit from among bits corresponding to the number of (K) LFEs. Although the random selector unit 52 inputs the signal indicative of an inversion bit also to the n-K LFEs that are not to be used, by setting the flag F to be outputted from the n-K LFEs compulsorily to 0 (inversion not allowed), the LFEs not to be used are excluded from selection candidates for an inversion bit.

Consequently, even if optimization apparatuses each having a scale and an accuracy according to a problem are not fabricated individually, an Ising model may be implemented with the scale and the accuracy according to the problem by preparing a plurality of optimization apparatuses 408 having different partition modes.

Now, another example of mode setting is described. For example, the optimization apparatus 408 may also provide a fifth mode of a scale 4 Kbits/accuracy 64 bits in addition to the four modes described hereinabove by storing weighting factors into the SRAMs 60a1, . . . , 60an in the following manner.

Figure 16:
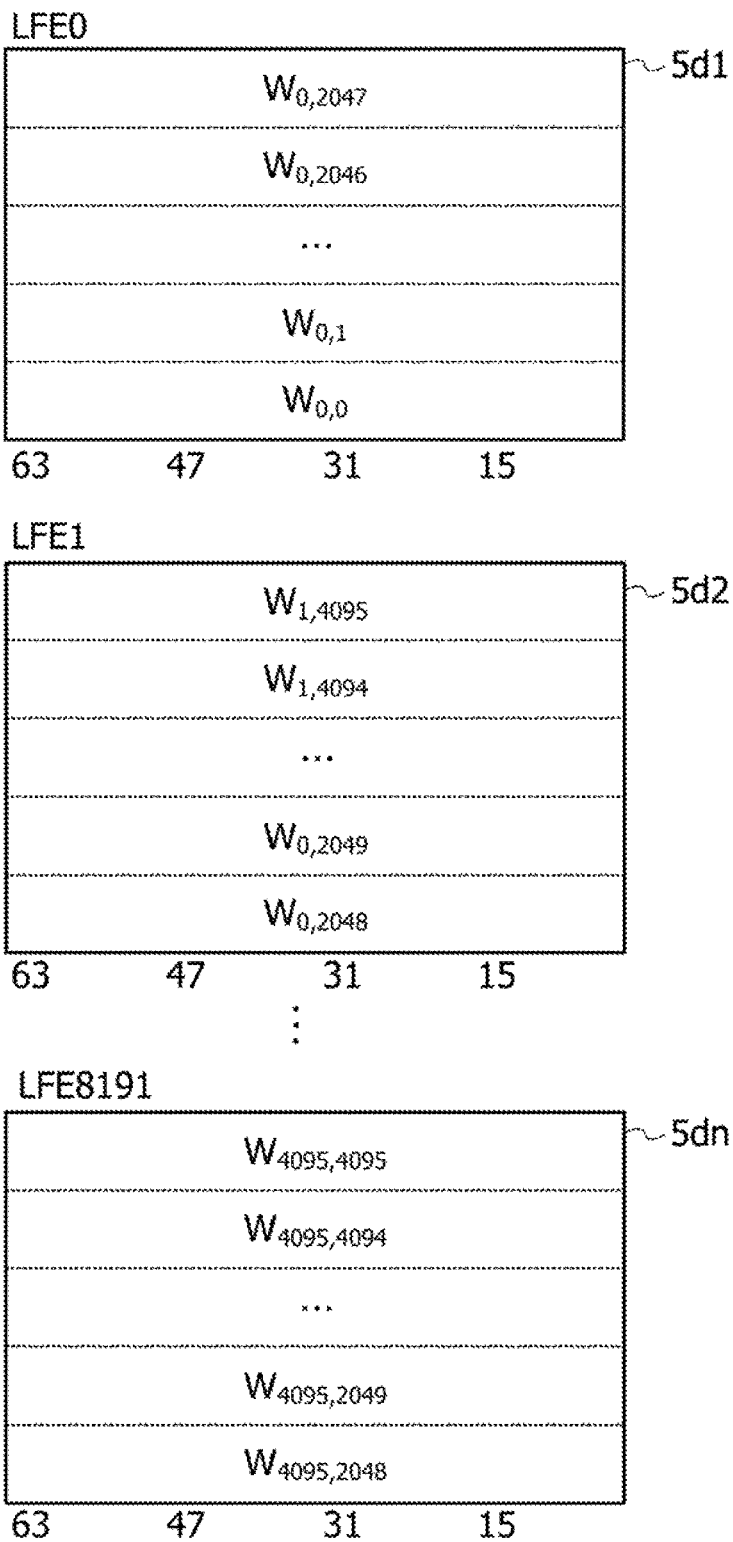
FIG. 16 is an explanatory view (part 5) depicting an example of storage of weighting factors.

FIG. 16 is an explanatory view (part 5) depicting an example of storage of weighting factors. Data 5d1, 5d2, . . . , 5dn indicate an example of storage of weighting factors in the SRAMs 60a1, 60a2, . . . , 60an in the case where the fifth mode (scale 4 Kbits/accuracy 64 bits) is used. Here, n=8192. The data 5d1, 5d2, . . . , 5dn are stored into the SRAMs 60a1, 60a2, . . . , 60an, respectively. In this mode, for a spin bit string, 4K (=4096) LFEs are used, and as a use only for storage of weighting factors, further 4K (=4096) LFEs are used.

The data 5d1 indicates $W_{0,0}$ to $W_{0,2047}$ stored in the SRAM 60a1 of the LFE 51a1 (LFE0). The data 5d2 indicates $W_{0,204}$ to $W_{0,4095}$ stored in the SRAM 60a2 of the LFE 51a2 (LFE1). The data 5dn indicates $W_{4095,2048}$ to $W_{4095,4095}$ stored in the SRAM 60an of the LFE 51an (LFE8191). The bit number of one weighting factor $W_{i,j}$ is 64 bits.

Here, the accuracy switching circuit 61a1 of the LFE 51a1 may acquire a weighting factor also from the SRAM 60a2 of the LFE 51a2 as described hereinabove. For example, the accuracy switching circuit 61a1 may take a method of stopping the functions of the LFE 51a2 other than the SRAM 60a2 and lending the capacity of the SRAM 60a2 to the LFE 51a1 by utilizing a reading out path from the SRAM 60a2 of the LFE 51a2 adjacent the accuracy switching circuit 61a1. For example, it is made possible for the SRAM of an odd-numbered LFE (the top LFE is determined as the first LFE) to utilize the SRAM of an even-numbered LFE (or it can be regarded that it is made possible, where the top LFE is determined as the 0th LFE, for an even-numbered LFE to utilize the SRAM of an odd-numbered LFE).

In the manner, the accuracy switching circuits 61a1, . . . , 61an read out some of weighting factors relating to an own bit and a different bit from the SRAMs of different LFEs that are not used as a spin bit in response to a change of the bit number of weighting factors. In this case, the random selector unit 52 may exclude, for example, bits corresponding to the other LFES that are not used as a spin bit from selection candidates for an inversion bit by setting the flag F that is outputted from such other LFEs compulsorily to 0 (inversion not allowed).

This makes it possible to implement the fifth mode of the scale 4 Kbits/accuracy 64 bits. Similarly, also it is possible to implement a higher accuracy by decreasing the scale. In this manner, according to the optimization apparatus 408 ($j), the scale and the accuracy may be changed flexibility in response to a problem.

Now, the storage substance of a mode setting table 1700 provided in the optimization problem arithmetic apparatus 101 is described. The mode setting table 1700 is stored in a storage device such as the memory 402 or the disk 404 depicted in FIG. 4.

Here, it is assumed that the optimization apparatuses 408($1) to 408($M) the optimization problem arithmetic apparatus 101 includes are optimization apparatuses 408($1) to 408($3) (M=3).

Figure 17:
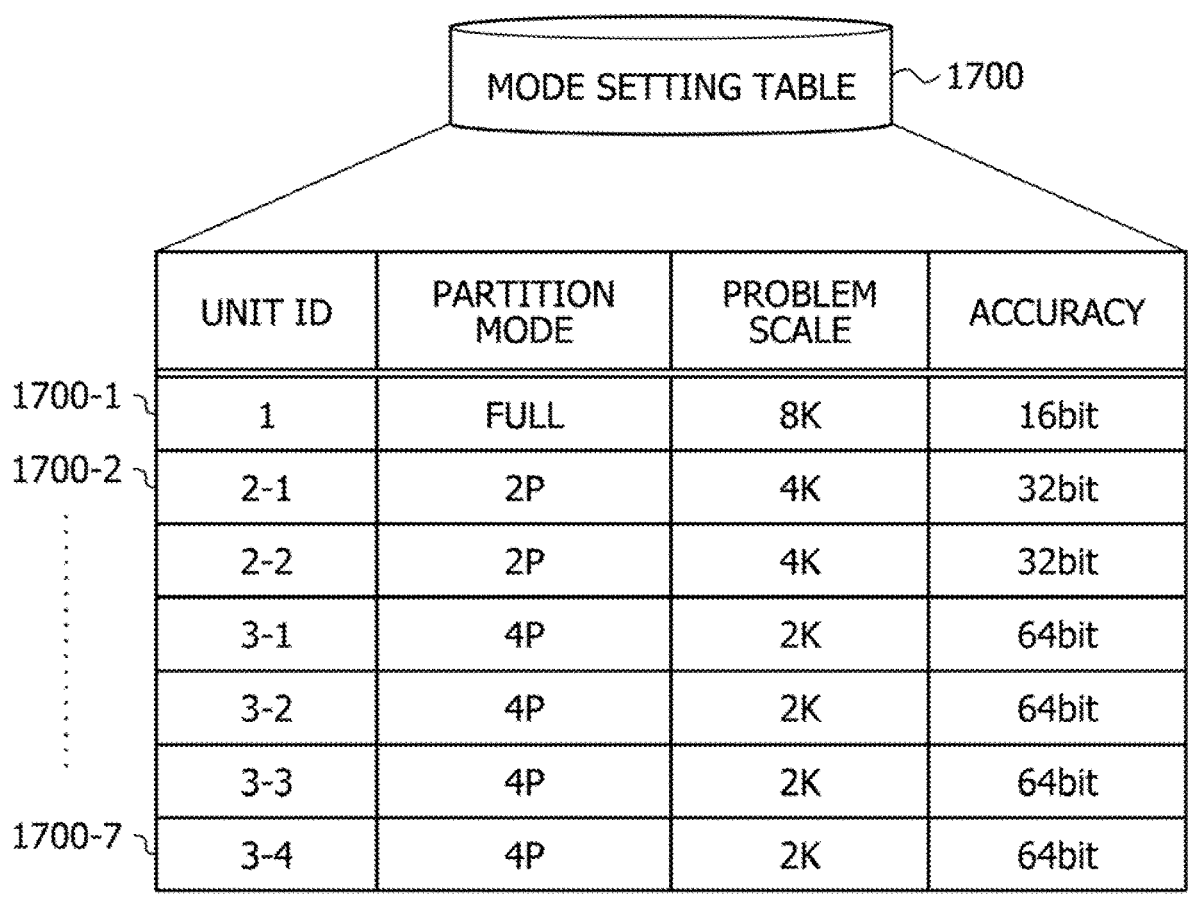
FIG. 17 is an explanatory view depicting an example of storage substance of a mode setting table.

FIG. 17 is an explanatory view depicting an example of the storage substance of the mode setting table 1700. Referring to FIG. 17, the mode setting table 1700 includes fields for a unit ID, a partition mode, a problem scale and an accuracy and stores mode setting information 1700-1 to 1700-7 as records by setting information to the fields.

Here, the unit ID is an identifier for identifying a unit that is to solve a combinatorial optimization problem. The unit corresponds, for example, to a partition in the optimization apparatus 408($j). A partition in the optimization apparatus 408($j) is implemented, for example, by one or more LFBs 505.

For example, the unit 1 corresponds to a partition in the optimization apparatus 408($1). The units 2-1 and 2-2 correspond to two partitions in the optimization apparatus 408($2). The units 3-1 to 3-4 correspond to four partitions in the optimization apparatus 408($3).

The partition mode indicates a mode name of a partition mode. The partition mode "8P" is a mode that logically divides the optimization apparatus 408($j) into eight partitions (not depicted in FIG. 17). Each partition in the partition mode "8P" is implemented, for example, by one LFB 505. The partition mode "8P" corresponds to the first mode described hereinabove.

The partition mode "4P" is a mode that logically divides the optimization apparatus 408($j) into four partitions. Each partition in the partition mode "4P" is implemented, for example, by two LFBs 505. The partition mode "4P" corresponds to the second mode described hereinabove.

The partition mode "2P" is a mode that logically divides the optimization apparatus 408($j) into two partitions. Each partition in the partition mode "2P" is implemented, for example, by four LFBs 505. The partition mode "2P" corresponds to the third mode described hereinabove.

The partition mode "FULL" is a mode that uses the optimization apparatus 408($j) as one partition without dividing the optimization apparatus 408($j). The partition in the partition mode "FULL" is implemented, for example, by eight LFBs 505. It is to be noted that, for the partition mode "FULL," two types are provided corresponding to combinations of a scale and an accuracy and include a partition mode "FULL (scale: 8K, accuracy: 16 bits)" and another partition mode "FULL (scale: 4K, accuracy: 64 bits)." The former corresponds to the fourth mode described hereinabove, and the latter corresponds to the fifth mode described hereinabove (not depicted in FIG. 17).

The problem scale indicates a maximum scale of a problem (combinatorial optimization problem) that can be solved by a partition mode (unit: bit). The accuracy indicates a maximum accuracy of a problem (combinatorial optimization problem) that can be solved by each partition mode.

For example, according to the mode setting information 1700-1, it may be specified that the partition mode of the optimization apparatus 408($1) is the partition mode "FULL." Further, the problem scale "8K" and the accuracy "16 bits" of the unit 1 corresponding to the partition in the optimization apparatus 408($1) may be specified.

It is to be noted that, though not depicted, each piece of the mode setting information in the mode setting table 1700 includes information for specifying, for example, a hardware resource corresponding to each unit (partition) (for example, an identification number of an LFB). The mode setting table 1700 corresponds, for example, to the example of the management information 110 depicted in FIG. 1.

Further, the mode setting information in the mode setting table 1700 in an initial state may be generated, for example, by the optimization problem arithmetic apparatus 101. For example, the optimization problem arithmetic apparatus 101 acquires a maximum scale (spin bit number) and a maximum accuracy (bit number of a weighting factor) of a problem that can be solved by the partition mode in each optimization apparatus 408($j) from the library 502 depicted in FIG. 5. Then, the optimization problem arithmetic apparatus 101 may generate mode setting information for each optimization apparatus 408($j) based on the acquired result.

The library 502 may acquire information of a partition mode set to each optimization apparatus 408($j) by calling a function prepared in advance. For example, the library 502 may acquire a maximum scale of a problem that can be solved by the current partition mode of the optimization apparatus 408($j) by calling a getMaxNumBit( ) function. Further, the library 502 may acquire a maximum accuracy of a problem that can be solved by the partition mode of the optimization apparatus 408($j) by calling a getWeightRange( ) function.

Now, a storage substance of a utilization situation table 1800 the optimization problem arithmetic apparatus 101 includes is described. The utilization situation table 1800 is stored in a storage device such as the memory 402 or the disk 404 depicted in FIG. 4.

FIG. 18 is an explanatory view depicting an example of the storage substance of the utilization situation table 1800. Referring to FIG. 18, the utilization situation table 1800 includes fields for a unit ID, a partition mode, a problem scale, an accuracy, a utilization ratio and waiting time and stores utilization situation information 1800-1 to 1800-3 as records by setting information to the fields.

Here, the unit ID is an identifier for identifying a unit that is to solve a combinatorial optimization problem. The partition mode indicates a mode name of a partition mode. The problem scale indicates a maximum scale of a problem (combinatorial optimization problem) that can be solved by a partition mode (unit: bit). The accuracy indicates a maximum accuracy of a problem (combinatorial optimization problem) that can be solved by each partition mode.

The utilization ratio indicates a utilization ratio of an optimization apparatus 408($j) including a unit that is identified by the unit ID (unit: %). The utilization ratio is one of index values indicative of a utilization situation of an optimization apparatus 408($j). The waiting time indicates a period of waiting time of an optimization apparatus 408($j) including a unit that is identified by the unit ID (unit: second). The waiting time is one of index values indicative of a load situation of the optimization apparatus 408($j).

For example, the utilization situation information 1800-1 indicates the partition mode "FULL," problem scale "8K," accuracy "16 bits," utilization ratio "90 [%]" and waiting time "600 [seconds]" of the optimization apparatus 408($1) including the unit 1. The utilization situation table 1800 corresponds, for example, to the utilization information 120 depicted in FIG. 1.

Figure 19:
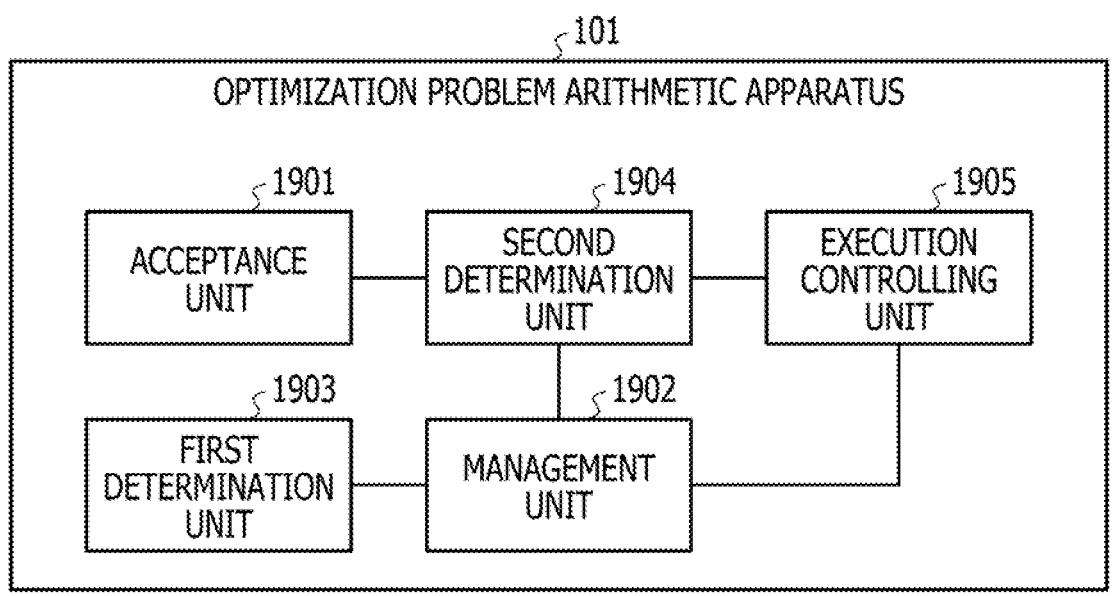
FIG. 19 is a block diagram depicting an example of a functional configuration of an optimization problem arithmetic apparatus.

FIG. 19 is a block diagram depicting an example of a functional configuration of an optimization problem arithmetic apparatus. The optimization problem arithmetic apparatus depicted in FIG. 19 may be the optimization problem arithmetic apparatus 101 depicted in FIG. 1. Referring to FIG. 19, the optimization problem arithmetic apparatus 101 includes an acceptance unit 1901, a management unit 1902, a first determination unit 1903, a second determination unit 1904, and an execution controlling unit 1905. The acceptance unit 1901 to execution controlling unit 1905 have functions implemented by causing the CPU 401 to execute a program stored in a storage device such as the memory 402, disk 404 or portable recording medium 407 depicted in FIG. 4 or implemented by the communication I/F 405. A processing result of each functional unit is stored into a storage device such as the memory 402 or the disk 404.

The acceptance unit 1901 accepts a combinatorial optimization problem. The combinatorial optimization problem accepted here is a problem of a calculation target to be solved. For example, the acceptance unit 1901 accepts a combinatorial optimization problem by accepting an input of information of the combinatorial optimization problem from the client apparatus 301 depicted in FIG. 3. The information of the combinatorial optimization problem includes, for example, initial values and operation conditions according to the problem.

The management unit 1902 holds information relating to a partition mode that defines a logical division state of each of a plurality of optimization apparatuses 408. Here, the plurality of optimization apparatuses 408 are the optimization apparatuses 408 the optimization problem arithmetic apparatus 101 includes and are, for example, the optimization apparatuses 408($1) to 408($M) depicted in FIG. 4.

For example, the management unit 1902 holds information including a partition mode set to each optimization apparatus 408($j) and a maximum scale and a maximum accuracy of a problem that can be solved by the partition mode. For example, the management unit 1902 holds the mode setting table 1700 depicted in FIG. 17.

The first determination unit 1903 sets a partition mode for each of the plurality of optimization apparatuses 408 based on the information held by the management unit 1902 and utilization information of the plurality of optimization apparatuses 408. The utilization information of the plurality of optimization apparatuses 408 includes execution history information of combinatorial optimization problems whose arithmetic operation has been performed by the plurality of optimization apparatuses 408.

Here, a data structure of the execution history information is described with reference to FIG. 20. The execution history information is generated, for example, every time a problem of a calculation target (combinatorial optimization problem) is accepted by the optimization problem arithmetic apparatus 101 and is stored into a storage device such as the memory 402 or the disk 404. Further, the execution history information is updated suitably in response to an execution situation of arithmetic operation of a problem.

Figure 20:
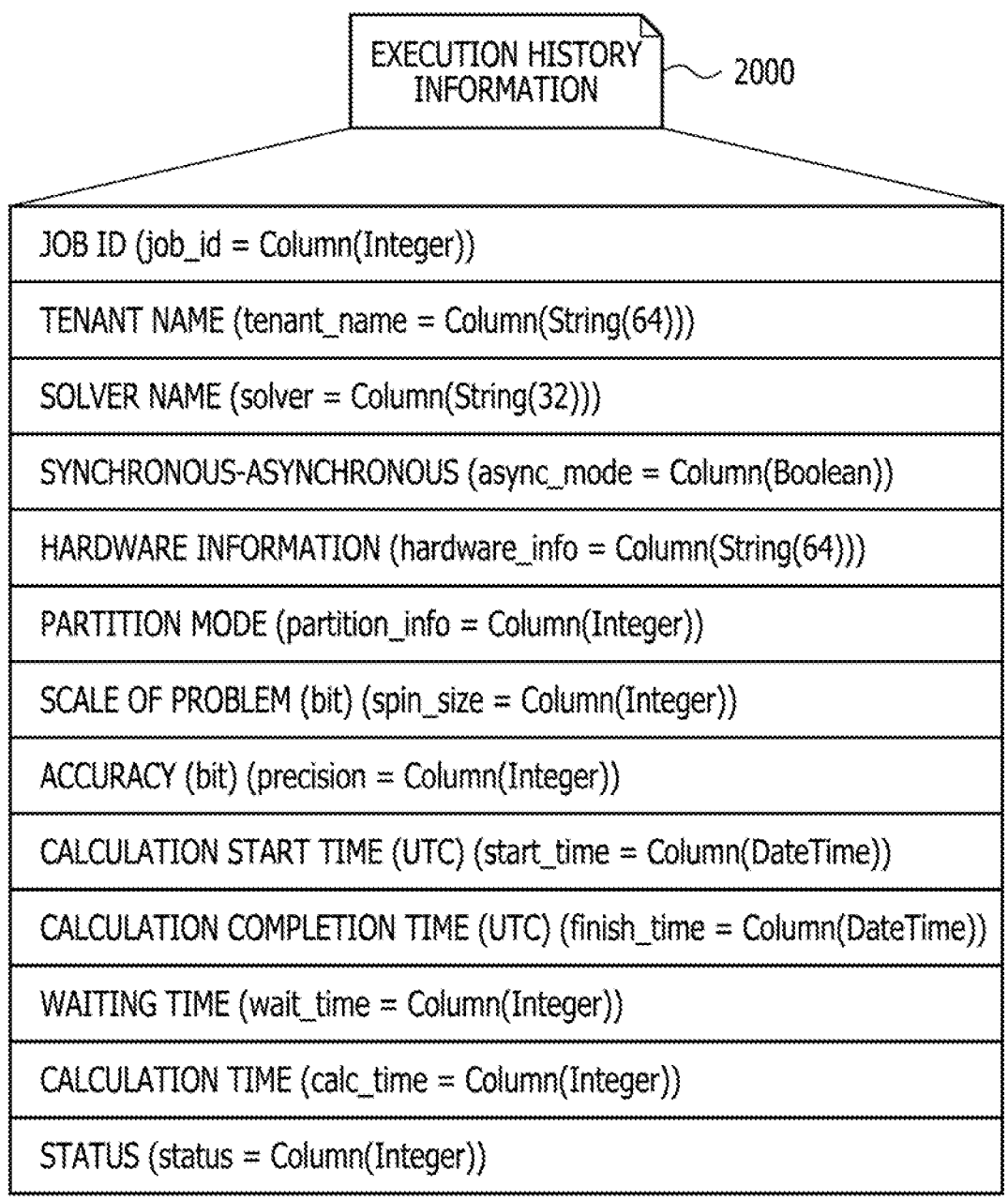
FIG. 20 is an explanatory view depicting an example of a data structure of execution history information.

FIG. 20 is an explanatory view depicting an example of a data structure of the execution history information. Referring to FIG. 20, the execution history information 2000 includes a job ID, a tenant name, a solver name, synchronous-asynchronous, hardware information, a partition mode, a scale of the problem, an accuracy, calculation start time, calculation completion time, waiting time, calculation time and a status.

The job ID is an identifier for specifying a job. The job is equivalent to a problem of a calculation target (combinatorial optimization problem). The tenant name is a name of a tenant. The tenant corresponds to a user. The solver name is a name of a solver that is used to solve the problem. The synchronous-asynchronous indicates a synchronous mode or an asynchronous mode.

The hardware information is information of a hardware element to which a job (arithmetic operation a problem) is assigned. To the hardware information, for example, an apparatus ID or a unit ID of the optimization apparatus 408 is set. The partition mode is a partition mode of a hardware element to which a job (arithmetic operation of a problem) is assigned.

The scale of a problem is a scale of the problem (unit: bit). The accuracy is a requested accuracy for the problem (unit: bit). The calculation start time is time at which execution of a job (calculation of a problem) is started. The calculation completion time is time at which execution of the job (arithmetic operation of the problem) is completed. The calculation start time and the calculation completion time are represented, for example, by universal time coordinate (UTC).

The waiting time is a period of time for which completion of a different process (different problem) is waited and waiting with a processing queue continues. The processing queue is a queue corresponding to the optimization apparatus 408 that is a destination of distribution of a job. The calculation time is a period of time required for execution of a job, for example, a period of time required to solve a problem. The calculation time corresponds to a period of time from the calculation start time to the calculation completion time.

The status indicates an execution situation of a job. For example, the status "normal" Indicates that an execution result of a job (solution to a problem) is obtained normally. The status "abnormal" indicates that an execution result of a job is not obtained normally. The status "during execution" indicates that a job is being executed.

It is to be noted that the waiting time is updated, for example, on the real time basis. Further, the calculation start time is set when execution of a job is started. The calculation completion time and the calculation time are set when the execution of the job is completed.

According to the execution history information 2000, it may be specified to which hardware element which problem is allocated and in which execution situation the problem is. For example, in the information processing system 300, by collecting the execution history information 2000 for each combinatorial optimization problem accepted by the optimization problem arithmetic apparatus 101, it is possible to specify a utilization history and so forth of a hardware element of each user and use the utilization history to perform a charging process for the user or the like.

Referring back to FIG. 19, the first determination unit 1903 may calculate waiting time of each optimization apparatus 408($j), for example, based on such execution history information 2000 as depicted in FIG. 20. For example, the first determination unit 1903 specifies execution history information of problems accumulated in a processing queue corresponding to each optimization apparatus 408($j). The execution history information of the problems accumulated in the processing queue is execution history information in which, for example, the calculation start time is not set as yet.

Then, the first determination unit 1903 calculates waiting time of each optimization apparatus 408($j) by calculating, based on the specified execution history information, the total of the waiting time of the problems accumulated in the processing queue corresponding to the optimization apparatus 408($j).

As an example, it is assumed that the problems accumulated in the processing queue corresponding to the optimization apparatus 408($1) are "problem 1, problem 2 and problem 3" and the waiting time of the problems 1 to 3 is "300 [seconds], 200 [seconds] and 100 [seconds]," respectively. In this case, the waiting time of the optimization apparatus 408($1) is "600 [seconds](=300 [seconds]+200 [seconds]+100 [seconds])."

The calculated waiting time of each optimization apparatus 408($j) is stored, for example, in an associated relation with information of the optimization apparatus 408($j) (unit ID, partition mode, problem scale, accuracy and so forth) Into the utilization situation table 1800 depicted in FIG. 18. For example, the waiting time "600 [seconds]" of the optimization apparatus 408($1) is set to the utilization situation information 1800-1 of the utilization situation table 1800.

Further, the first determination unit 1903 may calculate a utilization ratio of each optimization apparatus 408($j), for example, based on such execution history information 2000 as depicted in FIG. 20. The utilization ratio of each optimization apparatus 408($j) may be represented, for example, by a ratio of a period of time during which arithmetic operation of a problem is performed by the optimization apparatus 408($j) within a given period of time. The given period of time may be set arbitrarily and is set, for example, to approximately last 1 to 12 hours.

For example, the first determination unit 1903 specifies execution history information of a problem in regard to which arithmetic operation is performed within the given period of time. The problem in regard to which arithmetic operation is performed within the given period of time may be, for example, a problem whose calculation start time and calculation completion time are included in the given period of time or may be a problem whose period from the calculation start time to the calculation completion time is included at least at part thereof in the given period of time.

Then, the first determination unit 1903 calculates the calculation time of each optimization apparatus 408($j) within the given period of time by calculating the total of the calculation time of the specified execution history information. Then, the first determination unit 1903 calculates the utilization ratio of each optimization apparatus 408($j) by calculating the ratio of the calculated calculation time of the optimization apparatus 408($j) to the given period of time.

However, the period from the calculation start time to the calculation completion time may possibly include a time zone outside the given period of time. The first determination unit 1903 may not include the time zone in the calculation time of the optimization apparatus 408($j). Further, arithmetic operation of problems may possibly be executed in parallel by a plurality of units in the optimization apparatus 408($j). In this case, the period from the calculation start time to the calculation completion time may include a time zone during which arithmetic operation of the problems is performed in an overlapping relation. The first determination unit 1903 may not include this time zone in the calculation time of the optimization apparatus 408($j).

As an example, it is assumed that the given period of time is "last six hours" and the calculation time of the optimization apparatus 408($1) within the given period of time is "324 [minutes]." The utilization ratio of the optimization apparatus 408($1) is "90 [%] (=324 [minutes]/360 [minutes]×100)."

The calculated utilization ratio of each optimization apparatus 408($j) is stored, for example, in an associated relation with the information (unit ID, partition mode, problem scale, accuracy and so forth) of the optimization apparatus 408($j), into the utilization situation table 1800 depicted in FIG. 18. For example, the utilization ratio "90 [%]" of the optimization apparatus 408($1) is set to the utilization situation information 1800-1 of the utilization situation table 1800.

Then, the first determination unit 1903 refers, for example, to the utilization situation table 1800 to specify the optimization apparatus 408($j) whose waiting time is equal to or longer than a threshold value α. Here, the threshold value α may be set arbitrarily and is set, for example, to a value of approximately 600 [seconds] in response to a requested performance for the information processing system 300.

In the example of FIG. 18, if the threshold value α is "α=600 [seconds]," the optimization apparatus 408($1) including the unit 1 is specified as an optimization apparatus 408 whose waiting time is equal to or longer than the threshold value α.

Further, the first determination unit 1903 refers, for example, to the utilization situation table 1800 to specify the optimization apparatus 408 whose utilization ratio is equal to or lower than a threshold value β. Here, the threshold value β may be set arbitrarily and is set, for example, to a value approximately around 10 [%].

In the example of FIG. 18, if the threshold value β is "β=10 [%]," the optimization apparatus 408($3) including the units 3-1, 3-2, 3-3 and 3-4 is specified as an optimization apparatus 408 whose utilization ratio is equal to or lower than the threshold value β.

Then, the first determination unit 1903 refers, for example, to the mode setting table 1700 depicted in FIG. 17 to specify a partition mode of any optimization apparatus 408 whose specified waiting time is equal to or longer than the threshold value α. Then, the first determination unit 1903 determines the partition mode of the optimization apparatus 408 whose specified utilization ratio is equal to or lower than the threshold value R to the partition mode of the optimization apparatus 408 whose specified waiting time is equal to or longer than the threshold value α. Further, the first determination unit 1903 maintains the current partition mode in regard to any optimization apparatus 408 whose utilization ratio is equal to or higher than the threshold value β (maintains the current status).

For example, it is assumed that the optimization apparatus 408 whose waiting time is equal to or longer than the threshold value α is the "optimization apparatus 408($1)" and the optimization apparatus 408 whose utilization ratio is equal to or lower than the threshold value β is the "optimization apparatus 408($3)." In this case, the first determination unit 1903 refers to the mode setting table 1700 to specify the partition mode "FULL" of the optimization apparatus 408($1) whose waiting time is equal to or longer than the threshold value α. Then, the first determination unit 1903 determines the partition mode of the optimization apparatus 408($3) whose utilization ratio is equal to or lower than the threshold value β is the partition mode "FULL." Further, the first determination unit 1903 maintains the current partition mode in regard to each of the optimization apparatuses 408($1) and 408($2) whose utilization ratio is equal to or higher than the threshold value β.

Further, the first determination unit 1903 changes the partition mode of each specified optimization apparatus 408($j) whose utilization ratio is equal to or lower than the threshold value β to the determined partition mode. However, if the partition mode is changed dynamically, a result of arithmetic operation being performed in regard to each partition may become abnormal. Accordingly, in the case where the partition mode of the optimization apparatus 408($j) is to be changed, the first determination unit 1903 changes the partition mode after it establishes, for example, a state in which arithmetic operation is not performed by the optimization apparatus 408($j). Whether or not arithmetic operation is being performed by the optimization apparatus 408($j) may be specified, for example, from the status of the execution history information.

For example, the first determination unit 1903 first refers to the mode setting table 1700 to specify a problem scale and an accuracy corresponding to the determined partition mode. For example, the scale and the accuracy of a problem corresponding to the partition mode "FULL" are the problem scale "8K (8192 bits)" and the accuracy "16 bits," respectively.

Then, the first determination unit 1903 inputs the specified problem scale (spin bit number) and accuracy (bit number of a weighting factor) to the optimization apparatus 408($3) whose specified utilization ratio is equal to or lower than the threshold value β. In the optimization apparatus 408($3), the control unit 504 accepts the problem scale (spin bit number) and accuracy (bit number of a weighting factor) from the first determination unit 1903 and inputs them to the mode setting register 55 of the LFB 505.

The accuracy (bit number of a weighting factor) inputted to the mode setting register 55 is inputted to the accuracy switching circuit of each LFE. For example, the accuracy switching circuit 61a1 accepts the inputted accuracy (bit number of the weighting factor) and switches the bit number of a weighting factor to be read out from the SRAM 60a1 in response to the accuracy (bit number of the weighting factor).

Meanwhile, the problem scale (spin bit number) inputted to the mode setting register 55 is inputted to the random selector unit 52. For example, the random selector unit 52 uses LFEs corresponding in number to the inputted scale (spin bit number) in an ascending order of index to perform a search for a solution.

Consequently, the partition mode "FULL" is set to the optimization apparatus 408($3). In this case, in the optimization apparatus 408($3), one partition of the partition mode "FULL (scale: 8K, accuracy 16 bits)" is formed. It is to be noted that which hardware resource (for example, which LFB) is to be used to implement each partition may be decided by the first determination unit 1903 or by the control unit 504 of the optimization apparatus 408($j).

The determined determination result is stored, for example, into the mode setting table 1700. For example, the management unit 1902 updates the mode setting table 1700 in response to that the partition mode of the optimization apparatus 408($j) is changed.

Figure 21:
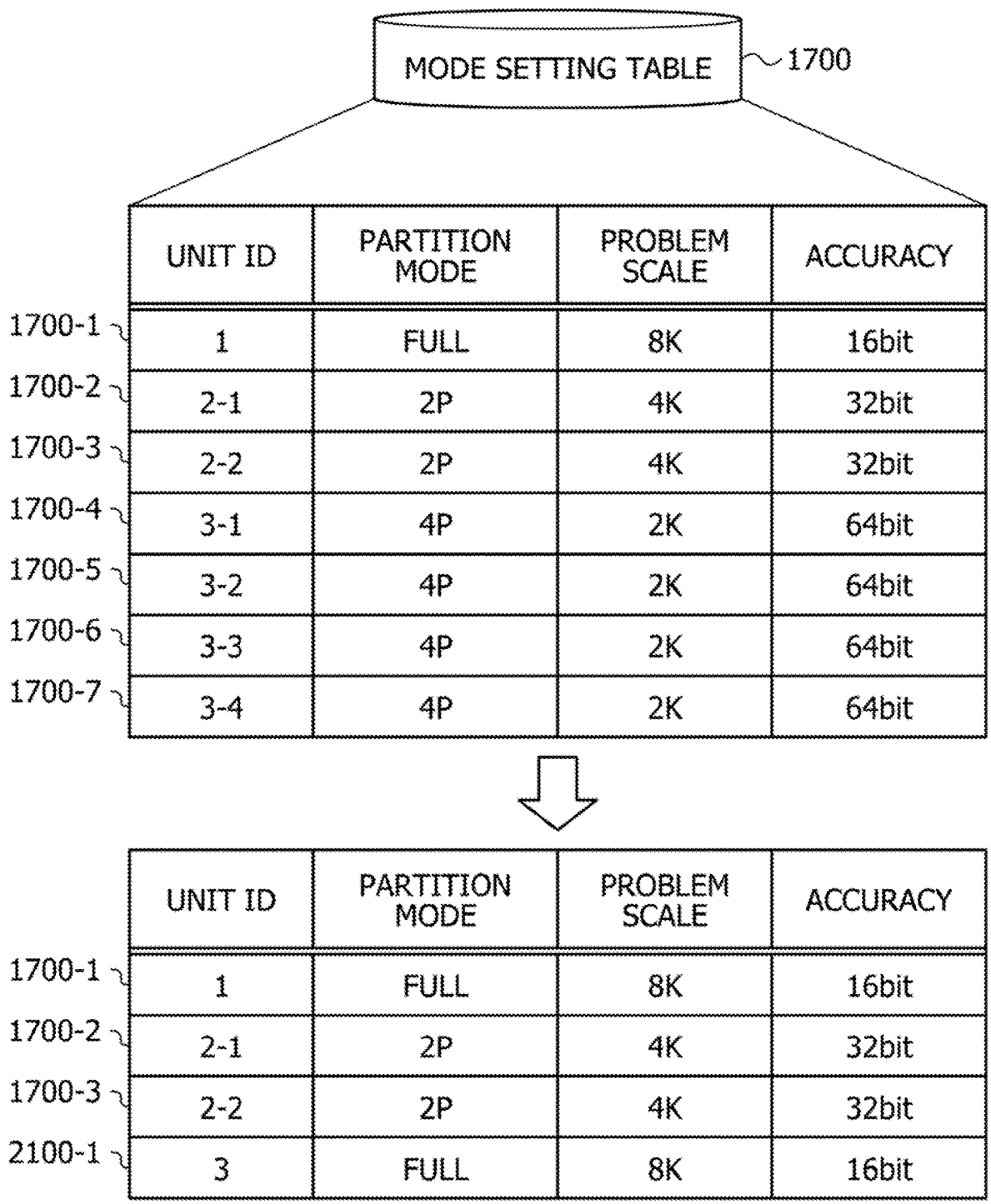
FIG. 21 is an explanatory view depicting an example of update of a mode setting table.

FIG. 21 is an explanatory view depicting an example of update of the mode setting table 1700. Here, a case is assumed in which the partition mode of the optimization apparatus 408($3) is changed from the partition mode "4P" to the partition mode "FULL (scale: 8K, accuracy 16 bits)."

In this case, the mode setting information 1700-4 to 1700-7 in the mode setting table 1700 is updated to mode setting information 2100-1. It is to be noted that the process by the first determination unit 1903 for determining a partition mode for each of the plurality of optimization apparatuses 408 is executed periodically, for example, at intervals of time (5 [minutes] or the like).

Referring back to FIG. 19, the second determination unit 1904 determines an optimization apparatus 408 to which a combinatorial optimization problem is to be assigned based on information relating to the scale or the requested accuracy of the combinatorial optimization problem and information relating to partition modes individually of the plurality of optimization apparatuses 408 determined by the first determination unit 1903.

For example, the second determination unit 1904 first acquires information relating to the scale and the requested accuracy of the accepted combinatorial optimization problem. For example, the second determination unit 1904 acquires, from the library 502 (see FIG. 5), a spin bit number (scale) and a bit number representative of a weighting factor (requested accuracy) of a problem into which the accepted combinatorial optimization problem is converted.

Then, the second determination unit 1904 refers, for example, to the mode setting table 1700 (for example, FIG. 21) to specify available units in response to the acquired scale or requested accuracy of the combinatorial optimization problem. Here, the available units are units that become candidates expected to perform arithmetical operation of the combinatorial optimization problem. Then, the second determination unit 1904 determines the optimization apparatus 408($j) that includes one of the specified available units to the optimization apparatus 408 to which the combinatorial optimization problem is to be assigned.

On this occasion, the second determination unit 1904 may determine a unit in the optimization apparatus 408($j) as an assigned unit of the combinatorial optimization problem. For example, the second determination unit 1904 may determine, as an assigned unit of the combinatorial optimization problem, the optimization apparatus 408($j) and besides a unit in the optimization apparatus 408($j). However, to which unit in the optimization apparatus 408($j) the combinatorial optimization problem is to be assigned may be decided by the control unit 504 (FIG. 5) of the optimization apparatus 408($j).

For example, the second determination unit 1904 refers to the mode setting table 1700 to specify a unit corresponding to a partition mode that can solve a problem of a scale equal to or greater than that of the combinatorial optimization problem as an available unit. Then, the optimization problem arithmetic apparatus 101 may determine the specified available units in an ascending order of the maximum scale of a problem that can be solved to a unit to which the combinatorial optimization problem is to be assigned.

As an alternative, the second determination unit 1904 may refer to the mode setting table 1700 to specify a unit corresponding to a partition mode that can solve a problem of an accuracy equal to or higher than the requested accuracy of the combinatorial optimization problem. Then, the second determination unit 1904 may determine the specified unit to a unit to which the combinatorial optimization problem is to be assigned.

As another alternative, the second determination unit 1904 may refer to the mode setting table 1700 to specify, as an available unit, any unit corresponding to a partition mode that can solve a problem of a scale equal to or greater than the scale of the combinatorial optimization problem and besides can solve a problem of an accuracy equal to or higher than the requested accuracy of the combinatorial optimization problem. Then, the optimization problem arithmetic apparatus 101 may determine the specified available units in an ascending order of the maximum scale of a problem that can be solved to a unit to which the combinatorial optimization problem is to be assigned.

As a further alternative, the second determination unit 1904 may determine an optimization apparatus 408 to which the combinatorial optimization problem is to be assigned based on information relating to an execution situation of a plurality of optimization apparatuses 408. Here, the information relating to an execution situation of the plurality of optimization apparatuses 408 includes, for example, a problem being executed by each optimization apparatus 408($j) or information regarding a processing queue corresponding to each optimization apparatus 408($j). For example, the status or the waiting time of the execution history information 2000 is an example of the information relating to an execution situation of the optimization apparatus 408($j).

For example, the second determination unit 1904 may determine an optimization apparatus 408($j) including a free unit that is not executing a problem from among the specified available units to an optimization apparatus 408 to which the combinatorial optimization problem is to be assigned. However, in the case where the specified available units do not include a free unit, the second determination unit 1904 may determine, from among the optimization apparatus 408 including available units, an optimization apparatus 408($j) in which the number of problems accumulated in the processing queue is smallest to an optimization apparatus 408 to which the combinatorial optimization problem is to be assigned.

It is to be noted that examples of determination of an assigned unit of a combinatorial optimization problem are hereinafter described with reference to FIGS. 23 to 26.

The execution controlling unit 1905 controls the optimization apparatus 408 determined by the second determination unit 1904 to execute arithmetic operation of the combinatorial optimization problem by the partition mode determined for the optimization apparatus 408 by the first determination unit 1903. For example, the execution controlling unit 1905 controls the control unit 504 of the optimization apparatus 408($j), which includes the unit determined as an assigned unit of the combinatorial optimization problem, to execute arithmetic operation of the combinatorial optimization problem designating the unit.

For example, the execution controlling unit 1905 inputs initial values and operation conditions according to the problem to the optimization apparatus 408($j). The initial values include initial values of, for example, an energy value E, a local field hi, a spin bit qi and a temperature parameter T, weighting factors W and so forth. Further, the operation conditions include an update time number N1 of a state in one temperature parameter, an update time number N2 of the temperature parameter and a decreasing width of the temperature parameter.

In the optimization apparatus 408($j), the control unit 504 sets the inputted initial values and operation conditions to the registers and SRAMs of the LFEs. It is to be noted that, in the case where there is an LFE that is not in use, the control unit 504 sets, for example, all 0s as W to the SRAM of the LFE.

The execution controlling unit 1905 inputs an arithmetic operation start flag (for example, the arithmetic operation start flag=1) to the optimization apparatus 408($j). The control unit 504 accepts the input of the arithmetic operation start flag and starts arithmetic operation by a unit (LFB 505) designated from the execution controlling unit 1905. The designation of a unit is performed, for example, by inputting information that specifies a partition corresponding to the unit (identification number or the like of the LFB).

Further, the first determination unit 1903 may decide if there is an increase or decrease in the number of optimization apparatuses 408 to be utilized based on utilization information of the plurality of optimization apparatuses 408. Further, the first determination unit 1903 may increase or decrease the number of optimization apparatuses 408 to be utilized in response to a result of the decision.

Here, to increase the number of optimization apparatuses 408 to be utilized signifies to activate, for example, the spare apparatus 409 depicted in FIG. 4 such that it operates as an optimization apparatus 408. As a result, the number of optimization apparatuses 408 that can be utilized in the optimization problem arithmetic apparatus 101 increases by one (M=M+1). On the other hand, to decrease an optimization apparatus 408 to be utilized signifies to place an optimization apparatus 408 into a sleep state (or into a power-off state) to change the optimization apparatus 408 into a spare apparatus 409. As a result, the number of optimization apparatuses 408 that can be utilized in the optimization problem arithmetic apparatus 101 decreases by one (M=M−1).

For example, the first determination unit 1903 may refer to the utilization situation table 1800 and decide, in the case where the utilization ratios of all of the optimization apparatuses 408($1) to 408($3) are equal to or higher than a threshold value γ, to increase the number of optimization apparatuses 408 to be utilized. The threshold value γ may be set arbitrarily and is set, for example, to a value of approximately 80 [%].

As an alternative, for example, the first determination unit 1903 may refer to the utilization situation table 1800 and decide, in the case where the waiting time of all of the optimization apparatuses 408($1) to 408($3) is equal to or longer than a threshold value δ, to increase the number of optimization apparatuses 408 to be utilized. The threshold value δ may be set arbitrarily and is set, for example, to a value of approximately 300 [seconds].

Further, in the case where the number of optimization apparatuses 408 to be utilized is increased, the first determination unit 1903 sets a partition mode for the added optimization apparatus 408. Thereupon, the first determination unit 1903 sets a partition mode determined in advance (default partition mode) to the added optimization apparatus 408.

For example, the first determination unit 1903 first specifies a problem scale and an accuracy corresponding to the default partition mode. It is to be noted that the problem scale and the accuracy corresponding to the default partition mode are stored in a storage device such as the memory 402 or the disk 404.

For example, it is assumed that the default partition mode is the partition mode "FULL (scale: 8K, accuracy 16 bits)." In this case, the first determination unit 1903 specifies the problem scale "8K (8192 bits)" and the accuracy "16 bits." Then, the first determination unit 1903 inputs the specified problem scale (spin bit number) and accuracy (bit number of a weighting factor) to the added optimization apparatus 408. Consequently, the default partition mode may be set to the added optimization apparatus 408.

Further, for example, the first determination unit 1903 may refer to the utilization situation table 1800 and decide, in the case where the utilization ratio of all optimization apparatuses 408($1) to 408($3) is equal to or lower than the threshold value β, that the number of optimization apparatuses 408 to be utilized is to be reduced. Then, in the case where it is decided that the number of optimization apparatuses 408 to be utilized is to be decreased, the first determination unit 1903 places one of the optimization apparatuses 408($1) to 408($3) into a sleep state so as to be made a spare apparatus 409.

The optimization apparatus 408 to be decreased may be, for example, an optimization apparatus 408 that is lowest in utilization ratio among the optimization apparatuses 408($1) to 408($3) or may be one of the optimization apparatuses 408 to which the default partition mode is set.

Consequently, in the case where the utilization ratio of a plurality of optimization apparatuses 408 is low as a whole, one of the optimization apparatuses 408 may be placed into a sleep state so as to be made a spare apparatus 409, and the power consumption of the optimization problem arithmetic apparatus 101 may be suppressed.

Further, the second determination unit 1904 may decide whether or not a distributed method is used. Here, the distributed method is a technique of solving a problem after the problem is divided into problems of a smaller scale using a division solver or the like. As the distributed method, any existing technology may be used.

For example, the second determination unit 1904 may decide whether or not the scale of the combinatorial optimization problem is greater than a maximum scale of a problem that can be solved by the plurality of optimization apparatuses 408. Here, in the case where the scale of the combinatorial optimization problem is greater than the maximum scale that can be solved, the second determination unit 1904 decides that a distributed method is to be used. On the other hand, in the case where the scale of the combinatorial optimization problem is equal to or smaller than the maximum scale, the second determination unit 1904 decides that a distributed method is not to be used.

For example, in the case where the scale of the combinatorial optimization problem is greater than the maximum scale of a problem that can be solved by the plurality of optimization apparatuses 408, in the state as it is, it is difficult to solve the combinatorial optimization problem. Therefore, the optimization problem arithmetic apparatus 101 may use a distributed method to divide and solve the combinatorial optimization problem.

In the case where it is decided that a distributed method is to be used, the second determination unit 1904 divides the combinatorial optimization problem. Then, the second determination unit 1904 determines an optimization apparatus 408 to which the divisional problems after the division are to be assigned based on the scale or the requested accuracy of each divisional problem and the partition mode of each of the plurality of optimization apparatuses 408 determined by the first determination unit 1903.

In this case, the execution controlling unit 1905 controls the determined an optimization apparatus 408 to execute arithmetic operation of the divisional problems. The solution to the combinatorial optimization problem is an integrated solution of the solutions of the divisional problems. Consequently, even in the case where the scale of the combinatorial optimization problem is greater than a maximum scale of a problem that can be solved by the plurality of optimization apparatuses 408, the combinatorial optimization problem may be solved.

Further, the second determination unit 1904 may decide whether or not scaling is to be used. Here, the scaling is to adjust factors into those in the range of a maximum accuracy with which a problem can be solved to solve the problem. For example, the second determination unit 1904 may decide whether or not the requested accuracy of the combinatorial optimization problem is within the range of a maximum accuracy of a problem that can be solved by the plurality of optimization apparatuses 408.

Here, in the case where the requested accuracy of the combinatorial optimization problem is outside the range of the maximum accuracy for solution, the second determination unit 1904 decides that scaling is to be used. On the other hand, in the case where the requested accuracy of the combinatorial optimization problem is within the range of the maximum accuracy for solution, the second determination unit 1904 decides that scaling is not to be used.

For example, in the case where the requested accuracy of the combinatorial optimization problem is outside the range of the maximum accuracy of a problem that can be solved by a plurality of optimization apparatuses 408, in the state as it is, it is difficult to solve the combinatorial optimization problem. Therefore, the optimization problem arithmetic apparatus 101 may use scaling to adjust the factors of the combinatorial optimization problem to solve the combinatorial optimization problem.

For example, the execution controlling unit 1905 may return a problem obtained by solving, for example, a problem, which is obtained by scaling the combinatorial optimization problem (to N times) so as to fall within the range of the maximum accuracy of a problem, which can be solved by the optimization apparatus 408 (unit) determined as an assigned unit of the distribution of the combinatorial optimization problem and re-calculating the energy (to 1/N times) so as to conform to the original problem.

For example, in the case of the partition mode "FULL (scale: 8K, accuracy 16 bits)," since the maximum accuracy is "16 bits," If "3276700" is designated as the factor to the quadratic term of the problem, in this state, it is difficult to solve the problem. In this case, the execution controlling unit 1905 performs scaling down, for example, to $1/100$ such that the problem becomes a problem in which the factor of the quadratic term is 32767 and solves the scaled down problem, whereafter it performs re-calculation of energy (to 100 times) so as to conform to the original image and returns a result of the calculation.

Consequently, even if the requested accuracy of the combinatorial optimization problem is outside the range of the maximum accuracy of a problem that can be solved by the optimization apparatus 408, the combinatorial optimization problem can be solved.

It is to be noted that the information of the combinatorial optimization problem accepted by the acceptance unit 1901 may be inputted, for example, to a whole queue corresponding to the plurality of optimization apparatuses 408 in prior to determination of assigned units by the second determination unit 1904. Further, the first determination unit 1903 may decide whether or not the number of problems of a specific scale (or requested accuracy) inputted to the whole queue exceeds a given number.

Then, for example, in the case where the number of problems of the specific scale exceeds the given number, the first determination unit 1903 may decide that the possibility that waiting of a problem of the specific scale may occur in the future is high and change the partition mode of an optimization apparatus 408 whose utilization ratio is equal to or lower than the threshold value β to a partition mode corresponding to the specific scale. This makes it possible to predict a problem that waiting occurs in the future and change the partition mode of the optimization apparatus 408 at a stage before the problem is assigned.

Figure 22:
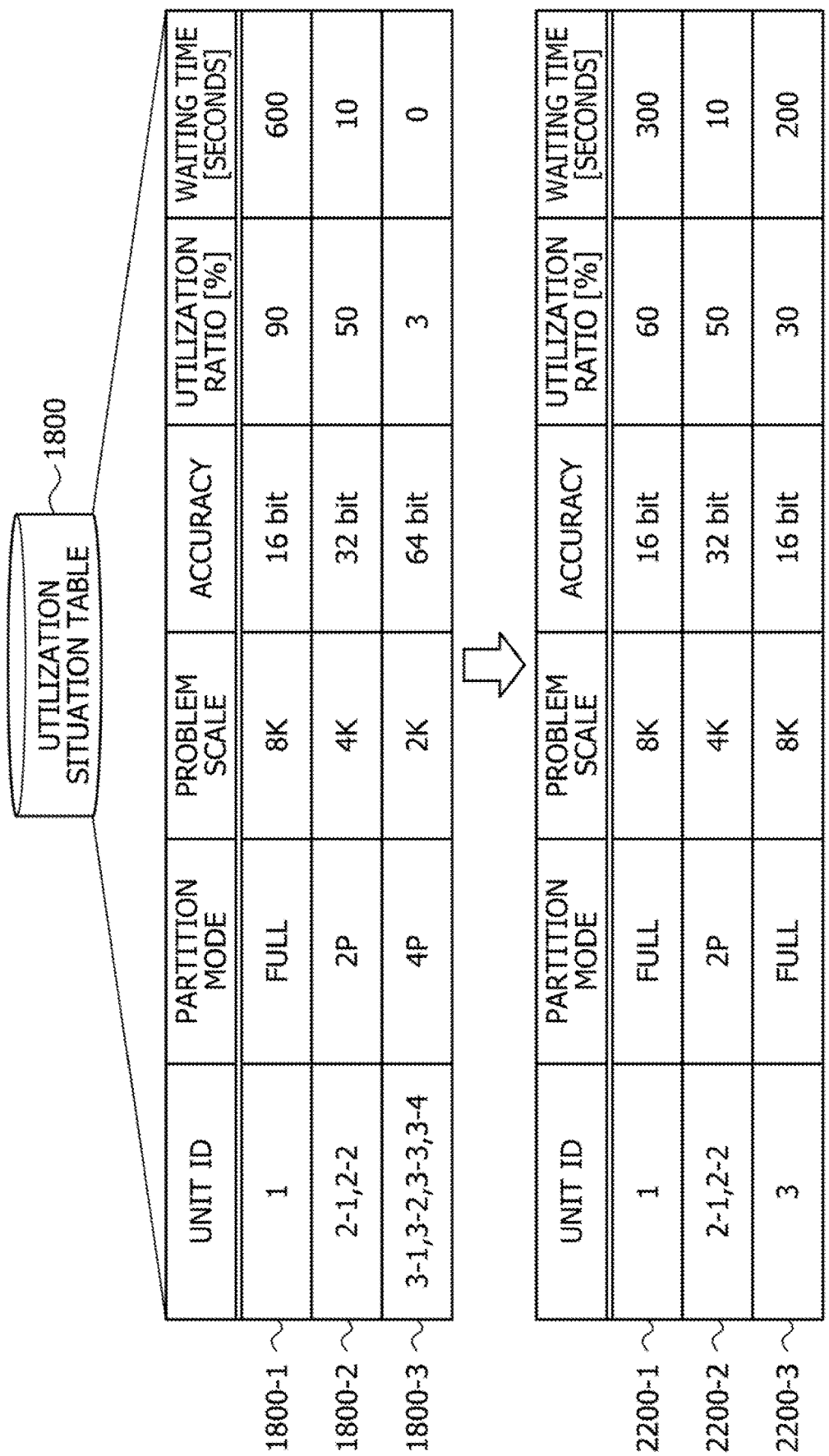
FIG. 22 is an explanatory view depicting an example of transition of storage substance of a utilization situation table.

FIG. 22 is an explanatory view depicting an example of transition of storage substance of a utilization situation table. The utilization situation table depicted in FIG. 22 may be the utilization situation table 1800 depicted in FIG. 18. Here, a case is assumed in which the partition mode of the optimization apparatus 408($3) is changed from the partition mode "4P" to the partition mode "FULL (scale: 8K, accuracy 16 bits)."

For example, a case is assumed in which the partition mode of the optimization apparatus 408($3) whose utilization ratio is equal to or lower than the threshold value β is changed to a partition mode same as that of the optimization apparatus 408($1) in which the waiting time is equal to or longer than the threshold value α, whereafter operation continues for a while. As a result, the utilization situation information 2200-1 to 2200-3 is stored in the utilization situation table 1800.

It may be recognized that, with the utilization situation information 2200-1, since the unit 3 that can solve a problem of the scale of "8K" is additionally used, the waiting time of the unit 1 (optimization apparatus 408($1)) decreases to "300 [seconds]." Further, it may be recognized that, with the utilization situation information 2200-3, since the partition mode of the optimization apparatus 408($3) is changed, the utilization ratio of the optimization apparatus 408($3) increases to 30 [%].

In this case, an optimization apparatus 408 in which the waiting time is equal to or longer than the threshold value α or an optimization apparatus 408 in which the utilization ratio is equal to or lower than the threshold value β does not exist. Therefore, the first determination unit 1903 leaves the partition modes of the optimization apparatuses 408($1) to 408($3) as they are as the current partition modes.

Now, examples of determination of assigned units of a combinatorial optimization problem are described with reference to FIGS. 23 to 26. Here, a case is described in which the optimization problem arithmetic apparatus 101 is applied to a cloud server and units of all partition modes (FULL, 2P, 4P and 8P) are prepared. First, the storage substance of a mode setting table 2300 the optimization problem arithmetic apparatus 101 (cloud) includes is described. The storage substance of the mode setting table 2300 is different from that of the mode setting table 1700 depicted in FIG. 17 because units prepared in advance are different Here, the optimization apparatuses 408($1) to 408($M) the optimization problem arithmetic apparatus 101 includes are optimization apparatuses 408($1) to 408($5) (M=5).

FIG. 23 is an explanatory view depicting an example of the storage substance of the mode setting table 2300. Referring to FIG. 23, the mode setting table 2300 includes fields for a unit ID, a partition mode, a problem scale and an accuracy and stores mode setting information 2300-1 to 2300-16 as records by setting information to the fields.

Now, an assigned unit table 2400 used by the optimization problem arithmetic apparatus 101 (cloud) is described. The assigned unit table 2400 is stored in a storage device such as the memory 402 or the disk 404.

FIG. 24 is an explanatory view depicting an example of the storage substance of the assigned unit table 2400. Referring to FIG. 24, the assigned unit table 2400 includes fields for a problem number, a problem scale, an accuracy, an available unit and an assigned unit and stores assigned unit information (for example, assigned unit information 2400-1 to 2400-8) as records by setting information to the fields.

Here, the problem number is an identifier for identifying a problem (combinatorial optimization problem) of a calculation target. The problem scale indicates a scale of the problem. The accuracy indicates a requested accuracy of the problem. The available unit is a unit that becomes a candidate for performing arithmetic operation of the problem. The assigned unit indicates a unit to which the problem is assigned.

In the following, an example of determination of assigned units of problems Q1 to Q8 is described taking a case in which the problems Q1 to Q8 are accepted sequentially as an example.

First, in the case where the acceptance unit 1901 accepts the problem Q1, the second determination unit 1904 acquires the scale and the requested accuracy of the problem Q1. Here, the scale of the problem Q1 is "1K" and the requested accuracy of the problem Q1 is "128 bits." Then, the second determination unit 1904 refers to the mode setting table 2300 depicted in FIG. 23 to specify available units of the problem Q1.

For example, the second determination unit 1904 specifies, from among units that can solve a problem of a scale equal to or greater than the scale "1K" of the problem Q1, a unit in which the maximum scale of a problem that can be solved is in the minimum as an available unit. In the example of FIG. 23, the units 5-1, 5-2, 5-3, 5-4, 5-5, 5-6, 5-7 and 5-8 are specified.

Then, the second determination unit 1904 excludes, from the specified available units, any unit in which the requested accuracy "128 bits" of the problem Q1 is outside the range of a maximum accuracy of a problem that can be solved. In the example of FIG. 23, none of the units 5-1, 5-2, 5-3, 5-4, 5-5, 5-6, 5-7 and 5-8 is excluded.

Then, the second determination unit 1904 determines a free unit from among the available units as a unit to which the problem Q1 is to be assigned. It is to be noted that, in the case where a plurality of free units exist, the second determination unit 1904 may determine a unit the branch part of whose unit ID is lowest. Here, the available unit 5-1 is determined as a unit to which the problem Q1 is to be assigned. As a result, the assigned unit information 2400-1 is stored into the assigned unit table 2400.

Then, in the case where the acceptance unit 1901 accepts the problem Q2, the second determination unit 1904 acquires the scale and the requested accuracy of the problem Q2. Here, the scale of the problem Q2 is "4K," and the requested accuracy of the problem Q2 is "32 bits." Then, the second determination unit 1904 refers to the mode setting table 2300 to specify available units of the problem Q2.

For example, the second determination unit 1904 specifies, from among units that can solve a problem of a scale equal to or greater than the scale "4K" of the problem Q2, a unit in which the maximum scale of a problem that can be solved is in the minimum as an available unit. In the example depicted in FIG. 23, the units 2, 3-1 and 3-2 are specified.

Then, the second determination unit 1904 excludes, from the specified available units, any unit in which the requested accuracy "32 bits" of the problem Q2 is outside the range of the maximum accuracy of a problem that can be solved. In the example of FIG. 23, none of the units 2, 3-1 and 3-2 is excluded. However, the unit 2 may solve a problem of an accuracy higher than the requested accuracy "32 bits" of the problem Q2. Therefore, the second determination unit 1904 excludes the unit 2 from the available units supposing that a problem of an accuracy higher than 32 bits is inputted. For example, the available units become the units 3-1 and 3-2.

Then, the second determination unit 1904 determines a free unit among the available units as a unit to which the problem Q2 is to be assigned. Here, the available unit 3-1 is determined as a unit to which the problem Q2 is to be assigned. As a result, assigned unit information 2400-2 is stored into the assigned unit table 2400.

Then, in the case where the acceptance unit 1901 accepts the problem Q3, the second determination unit 1904 acquires the scale and the requested accuracy of the problem Q3. Here, the scale of the problem Q3 is "8K" and the requested accuracy of the problem Q3 is "16 bits." Then, the second determination unit 1904 refers to the mode setting table 2300 to specify available units of the problem Q3.

For example, the second determination unit 1904 specifies, from among units that can solve a problem of a scale equal to or greater than the scale "8K" of the problem Q3, a unit in which the maximum scale of a problem that can be solved by the unit is in the minimum as an available unit. In the example of FIG. 23, the unit 1 is specified.

Then, the second determination unit 1904 excludes, from the specified available units, any unit in which the requested accuracy "16 bits" of the problem Q3 is outside the range of the maximum accuracy of a problem that can be solved. In the example of FIG. 23, since the requested accuracy "16 bits" of the problem Q3 is within the range of the maximum accuracy of a problem that can be solved by the unit 1, the unit 1 is not excluded.

Then, the second determination unit 1904 determines a free unit among the available units as a unit to which the problem Q3 is to be assigned. Here, the available unit 1 is determined as a unit to which the problem Q3 is to be assigned. As a result, assigned unit information 2400-3 is stored into the assigned unit table 2400.

Then, in the case where the acceptance unit 1901 accepts the problem Q4, the second determination unit 1904 acquires the scale and the requested accuracy of the problem Q4. Here, the scale of the problem Q4 is "4K" and the requested accuracy of the problem Q4 is "64 bits." Then, the second determination unit 1904 refers to mode setting table 2300 to specify any available unit of the problem Q4.

For example, the second determination unit 1904 specifies, from among units that can solve a problem of a scale equal to or greater than the scale "4K" of the problem Q4, a unit in which the maximum scale of a problem that can be solved is in the minimum as an available unit. In the example of FIG. 23, the units 2, 3-1 and 3-2 are specified.

Then, the second determination unit 1904 excludes, from the specified available units, any unit in which the requested accuracy "64 bits" of the problem Q4 is outside the range of the maximum accuracy of a problem that can be solved by the unit. In the example of FIG. 23, the requested accuracy "64 bits" of the problem Q4 is outside the range of the maximum accuracy of a problem that can be solved by the units 3-1 and 3-2. Therefore, the units 3-1 and 3-2 are excluded from the available units. For example, the available unit is the unit 2.

Then, the second determination unit 1904 determines a free unit among the available units as a unit to which the problem Q4 is to be assigned. Here, the available unit 2 is determined as a unit to which the problem Q4 is to be assigned. As a result, assigned unit information 2400-4 is stored into the assigned unit table 2400.

Then, in the case where the acceptance unit 1901 accepts the problem Q5, the second determination unit 1904 acquires the scale and the requested accuracy of the problem Q5. Here, the scale of the problem Q5 is "2K" and the requested accuracy of the problem Q5 is "64 bits." Then, the second determination unit 1904 refers to the mode setting table 2300 to specify available units of the problem Q5.

For example, the second determination unit 1904 specifies, from among units that can solve a problem of a scale equal to or greater than the scale "2K" of the problem Q5, a unit in which the maximum scale of a problem that can be solved is in the minimum as an available unit. In the example of FIG. 23, the units 4-1, 4-2, 4-3 and 4-4 are specified.

Then, the second determination unit 1904 excludes, from the specified available units, any unit in which the requested accuracy "64 bits" of the problem Q5 is outside the range of the maximum accuracy of a problem that can be solved. In the example of FIG. 23, none of the units 4-1, 4-2, 4-3 and 4-4 is excluded.

Then, the second determination unit 1904 determines a free unit among the available units as a unit to which the problem Q5 is to be assigned. Here, the available unit 4-1 is determined as a unit to which the problem Q5 is to be assigned. As a result, assigned unit information 2400-5 is stored into the assigned unit table 2400.

Then, in the case where the acceptance unit 1901 accepts the problem Q6, the second determination unit 1904 acquires the scale and the requested accuracy of the problem Q6. Here, the scale of the problem Q6 is "1K" and the requested accuracy of the problem Q6 is "128 bits." Then, the second determination unit 1904 refers to the mode setting table 2300 to specify available units of the problem Q6.

For example, the second determination unit 1904 specifies, from among units that can solve a problem of a scale equal to or greater than the scale "1K" of the problem Q6, a unit in which the maximum scale of a problem that can be solved is in the minimum as an available unit. In the example of FIG. 23, the units 5-1, 5-2, 5-3, 5-4, 5-5, 5-6, 5-7 and 5-8 are specified.

Then, the second determination unit 1904 excludes, from the specified available units, any unit in which the requested accuracy "128 bits" of the problem Q6 is outside the range of the maximum accuracy of a problem that can be solved. In the example of FIG. 23, none of the units 5-1, 5-2, 5-3, 5-4, 5-5, 5-6, 5-7 and 5-8 is excluded.

Then, the second determination unit 1904 determines a free unit among the available units as a unit to which the problem Q6 is to be assigned. Here, the unit 5-1 is determined as the unit to which the problem Q1 is to be assigned (assigned unit information 2400-1). Therefore, the available unit 5-2 is determined as a unit to which the problem Q6 is to be assigned. As a result, assigned unit information 2400-6 is stored into the assigned unit table 2400.

Then, in the case where the acceptance unit 1901 accepts the problem Q7, the second determination unit 1904 acquires the scale and the requested accuracy of the problem Q7. Here, the scale of the problem Q7 is "1K" and the requested accuracy of the problem Q7 is "128 bits." Then, the second determination unit 1904 refers to the mode setting table 2300 to specify available units of the problem Q7.

For example, the second determination unit 1904 specifies, from among units that can solve a problem of a scale equal to or greater than the scale "1K" of the problem Q7, a unit in which the maximum scale of a problem that can be solved is in the minimum as an available unit. In the example of FIG. 23, the units 5-1, 5-2, 5-3, 5-4, 5-5, 5-6, 5-7 and 5-8 are specified.

Then, the second determination unit 1904 excludes, from the specified available units, any unit in which the requested accuracy "128 bits" of the problem Q7 is outside the range of the maximum accuracy of a problem that can be solved. In the example of FIG. 23, none of the units 5-1, 5-2, 5-3, 5-4, 5-5, 5-6, 5-7 and 5-8 is excluded.

Then, the second determination unit 1904 determines a free unit among the available units as a unit to which the problem Q7 is to be assigned. Here, the units 5-1 and 5-2 are determined as the assigned units of the problems Q1 and Q6 (assigned unit information 2400-1 and 2400-6), respectively. Therefore, the available unit 5-3 is determined as a unit to which the problem Q7 is to be assigned. As a result, assigned unit information 2400-7 is stored into the assigned unit table 2400.

Then, in the case where the acceptance unit 1901 accepts the problem Q8, the second determination unit 1904 acquires the scale and the requested accuracy of the problem Q8. Here, the scale of the problem Q8 is "4K" and the requested accuracy of the problem Q8 is "32 bits." Then, the second determination unit 1904 refers to the mode setting table 2300 to specify available units of the problem Q8.

For example, the second determination unit 1904 specifies, from among units that can solve a problem of a scale equal to or greater than the scale "4K" of the problem Q8, a unit in which the maximum scale of a problem that can be solved is in the minimum as an available unit. In the example of FIG. 23, the units 2, 3-1 and 3-2 are specified.

Then, the second determination unit 1904 excludes, from the specified available units, any unit in which the requested accuracy "32 bits" of the problem Q8 is outside the range of the maximum accuracy of a problem that can be solved. In the example of FIG. 23, none of the units 2, 3-1 and 3-2 is excluded. However, the unit 2 may solve a problem of an accuracy higher than the requested accuracy "32 bits" of the problem Q8. Therefore, the unit 2 is excluded from the available units. For example, the available units are the units 3-1 and 3-2.

Then, the second determination unit 1904 determines a free unit among the available units as a unit to which the problem Q8 is to be assigned. Here, the unit 3-1 is determined as the unit to which the problem Q2 is to be assigned (assigned unit information 2400-2). Therefore, the available unit 3-2 is determined as a unit to which the problem Q8 is to be assigned. As a result, assigned unit information 2400-8 is stored into the assigned unit table 2400.

It is to be noted that the execution controlling unit 1905 may refer, for example, to the assigned unit table 2400 to specify units to which the problems Q1 to Q8 determined by the second determination unit 1904. Further, if arithmetic operation of each problem is completed, the assigned unit information in the assigned unit table 2400 corresponding to the problem is deleted.

Now, a case is described in which the optimization problem arithmetic apparatus 101 is applied to an on-premise server and units only of some partition modes are prepared. First, the storage substance of a mode setting table 2500 the optimization problem arithmetic apparatus 101 (on-premise) includes is described. The storage substance of the mode setting table 2500 is different from the storage substance of the mode setting table 1700 depicted in FIG. 17 because units prepared in advance are different. Here, it is assumed that the optimization apparatuses 408($1) to 408 ($M) the optimization problem arithmetic apparatus 101 includes are "optimization apparatuses 408($1) and 408 ($2)" (M=2).

Figure 25:
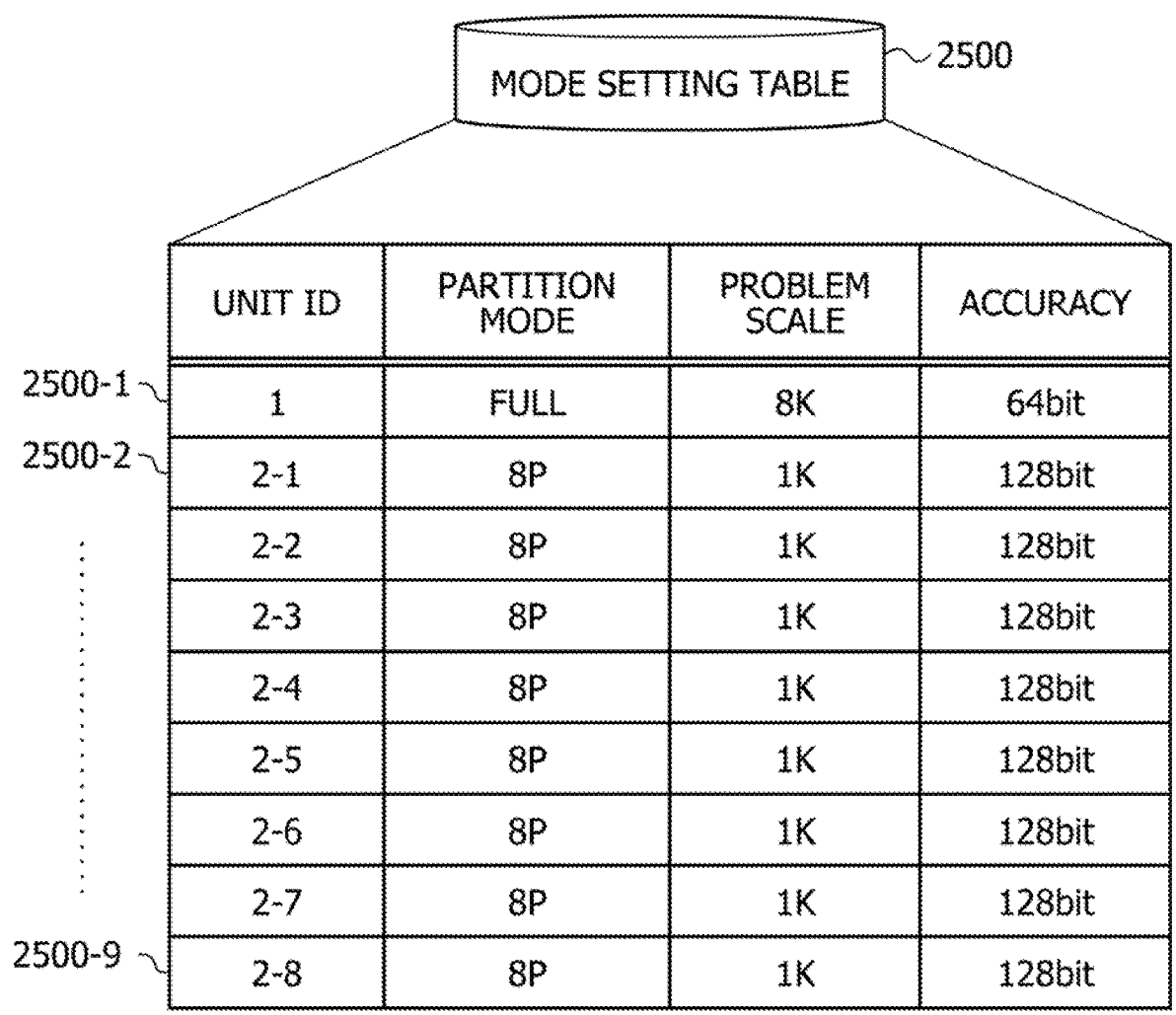
FIG. 25 is an explanatory view depicting an example of storage substance of a mode setting table.

FIG. 25 is an explanatory view depicting an example of the storage substance of the mode setting table 2500. Referring to FIG. 25, the mode setting table 2500 includes fields for a unit ID, a partition mode, a problem scale and an accuracy and stores mode setting information 2500-1 to 2500-9 as records by setting information to the fields.

Now, an assigned unit table 2600 used by the optimization problem arithmetic apparatus 101 (on-premise) is described. FIG. 26 is an explanatory view depicting an example of the storage substance of the assigned unit table 2600. Referring to FIG. 26, the assigned unit table 2600 includes fields for a problem number, a problem scale, an accuracy, an available unit and an assigned unit and stores assigned unit information (for example, assigned unit information 2600-1 to 2600-5) as records by setting information to the fields.

In the following, an example of determination of assigned units of problems Q1' to Q5' is described taking a case in which the problems Q1' to Q5' are accepted sequentially as an example.

First, in the case where the acceptance unit 1901 accepts the problem Q1', the second determination unit 1904 acquires the scale and the requested accuracy of the problem Q1'. Here, the scale of the problem Q1' is "1K" and the requested accuracy of the problem Q1' is "128 bits." Then, the second determination unit 1904 refers to the mode setting table 2500 depicted in FIG. 25 to specify available units of the problem Q1'.

For example, the second determination unit 1904 specifies, from among units that can solve a problem of a scale equal to or greater than the scale "1K" of the problem Q1', a unit in which the maximum scale of a problem that can be solved is in the minimum as an available unit. In the example of FIG. 25, the units 2-1, 2-2, 2-3, 2-4, 2-5, 2-6, 2-7 and 2-8 are specified.

Then, the second determination unit 1904 excludes, from the specified available units, any unit in which the requested accuracy "128 bits" of the problem Q1' is outside the range of the maximum accuracy of a problem that can be solved. In the example of FIG. 25, none of the units 2-1, 2-2, 2-3, 2-4, 2-5, 2-6, 2-7 and 2-8 is excluded.

Then, the second determination unit 1904 determines a free unit among the available units as a unit to which the problem Q1' is to be assigned. Here, the available unit 2-1 is determined as the unit to which the problem Q1' is to be assigned. As a result, assigned unit information 2600-1 is stored into the assigned unit table 2600.

Then, in the case where the acceptance unit 1901 accepts the problem Q2', the second determination unit 1904 acquires the scale and the requested accuracy of the problem Q2'. Here, the scale of the problem Q2' is "8K" and the requested accuracy of the problem Q2' is "16 bits." Then, the second determination unit 1904 refers to the mode setting table 2500 to specify available units of the problem Q2'.

For example, the second determination unit 1904 specifies, from among units that can solve a problem of a scale equal to or greater than the scale "8K" of the problem Q2', a unit in which the maximum scale of a problem that can be solved is in the minimum as an available unit. In the example of FIG. 25, the unit 1 is specified.

Then, the second determination unit 1904 excludes, from the specified available units, any unit in which the requested accuracy "16 bits" of the problem Q2' is outside the range of the maximum accuracy of a problem that can be solved. In the example of FIG. 25, the unit 1 is not excluded because the requested accuracy "16 bits" of the problem Q2' is within the range of the maximum accuracy of a problem that can be solved by the unit 1.

Then, the second determination unit 1904 determines a free unit among the available units as a unit to which the problem Q2' is to be assigned. Here, the available unit 1 is determined as the unit to which the problem Q2' is to be assigned. As a result, assigned unit information 2600-2 is stored into the assigned unit table 2600.

Then, in the case where the acceptance unit 1901 accepts the problem Q3', the second determination unit 1904 acquires the scale and the requested accuracy of the problem Q3'. Here, the scale of the problem Q3' is "1K" and the requested accuracy of the problem Q3' is "128 bits." Then, the second determination unit 1904 refers to the mode setting table 2500 to specify available units of the problem Q3'.

For example, the second determination unit 1904 specifies, from among units that can solve a problem of a scale equal to or greater than the scale "1K" of the problem Q3', a unit in which the maximum scale of a problem that can be solved is in the minimum as an available unit. In the example of FIG. 25, the units 2-1, 2-2, 2-3, 2-4, 2-5, 2-6, 2-7 and 2-8 are specified.

Then, the second determination unit 1904 excludes, from the specified available units, any unit in which the requested accuracy "128 bits" of the problem Q3' is outside the range of the maximum accuracy of a problem that can be solved. In the example of FIG. 25, none of the units 2-1, 2-2, 2-3, 2-4, 2-5, 2-6, 2-7 and 2-8 is excluded.

Then, the second determination unit 1904 determines a free unit among the available units as a unit to which the problem Q3' is to be assigned. Here, the available unit 2-1 is determined as the unit to which the problem Q1' is to be assigned (assigned unit information 2600-1. Therefore, the available unit 2-2 is determined as a unit to which the problem Q3' is to be assigned. As a result, assigned unit information 2600-3 is stored into the assigned unit table 2600.

Then, in the case where the acceptance unit 1901 accepts the problem Q4, the second determination unit 1904 acquires the scale and the requested accuracy of the problem Q4'. Here, the scale of the problem Q4' is "4K" and the requested accuracy of the problem Q4' is "64 bits." Then, the second determination unit 1904 refers to the mode setting table 2500 to specify available units of the problem Q4'.

For example, the second determination unit 1904 specifies, from among units that can solve a problem of a scale equal to or greater than the scale "4K" of the problem Q4', a unit in which the maximum scale of a problem that can be solved is in the minimum as an available unit. In the example of FIG. 25, the unit 1 is specified.

Then, the second determination unit 1904 excludes, from the specified available units, any unit in which the requested accuracy "64 bits" of the problem Q4' is outside the range of the maximum accuracy of a problem that can be solved. In the example of FIG. 25, the unit 1 is not excluded because the requested accuracy "64 bits" of the problem Q4' is within the range of the maximum accuracy of a problem that can be solved by the unit 1.

Then, the second determination unit 1904 determines a free unit among the available units as a unit to which the problem Q4' is to be assigned. Here, the unit 1 is the assigned unit of the problem Q2' (assigned unit information 2600-2). Further, no available unit other than the unit 1 exists.

In this case, the second determination unit 1904 waits that arithmetic operation of the problem Q2' is completed in the unit 1. For example, the second determination unit 1904 places the problem Q4' into the processing queue corresponding to the unit 1 (optimization apparatus 408($1)). As a result, assigned unit information 2600-4 is stored into the assigned unit table 2600. In the assigned unit information 2600-4, the assigned unit is "during waiting."

Then, in the case where the acceptance unit 1901 accepts the problem Q5', the second determination unit 1904 acquires the scale and the requested accuracy of the problem Q5'. Here, the scale of the problem Q5' is "1K" and the requested accuracy of the problem Q5' is "128 bits." Then, the second determination unit 1904 refers to the mode setting table 2500 to specify available units of the problem Q5'.

For example, the second determination unit 1904 specifies, from among units that can solve a problem of a scale equal to or greater than the scale "1K" of the problem Q5', a unit in which the maximum scale of a problem that can be solved is in the minimum as an available unit. In the example of FIG. 25, the units 2-1, 2-2, 2-3, 2-4, 2-5, 2-6, 2-7 and 2-8 are specified.

Then, the second determination unit 1904 excludes, from the specified available units, any unit in which the requested accuracy "128 bits" of the problem Q5' is outside the range of the maximum accuracy of a problem that can be solved. In the example of FIG. 25, none of the units 2-1, 2-2, 2-3, 2-4, 2-5, 2-6, 2-7 and 2-8 is excluded.

Then, the second determination unit 1904 determines a free unit among the available units as a unit to which the problem Q5' is to be assigned. Here, the available units 2-1 and 2-2 are determined as the units to which the problems Q1' and Q3' are to be assigned (assigned unit information 2600-1 and 2600-3), respectively. Therefore, the available unit 2-3 is determined to a unit to which the problem Q5' is to be assigned. As a result, assigned unit information 2600-5 is stored into the assigned unit table 2600.

It is to be noted that, if arithmetic operation of the problem Q2' by the unit 1 is completed, the assigned unit information 2600-2 is deleted from the assigned unit table 2600 and the unit 1 is determined as a unit to which the problem Q4' is to be assigned. As a result, the unit ID "1" is set to the assigned unit of the assigned unit information 2600-4.

Now, an optimization problem arithmetic processing procedure of the optimization problem arithmetic apparatus 101 is described. The optimization problem arithmetic process of the optimization problem arithmetic apparatus 101 is executed in parallel, for example, for each combinatorial optimization problem.

Figure 27A:
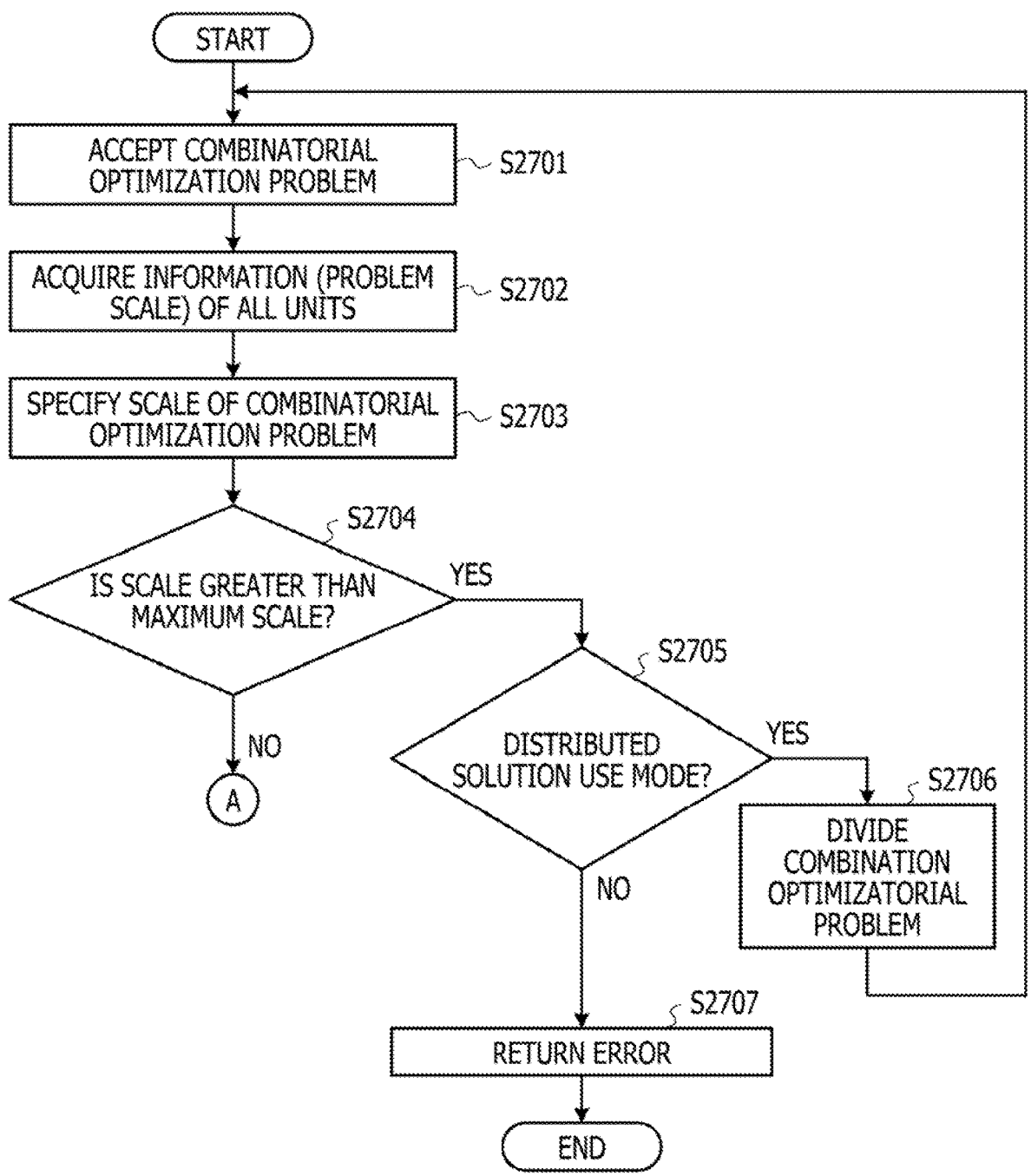
FIGS. 27A and 27B are a flow chart (part 1) depicting an example of an optimization problem arithmetic processing procedure of an optimization problem arithmetic apparatus.
Figure 27B:
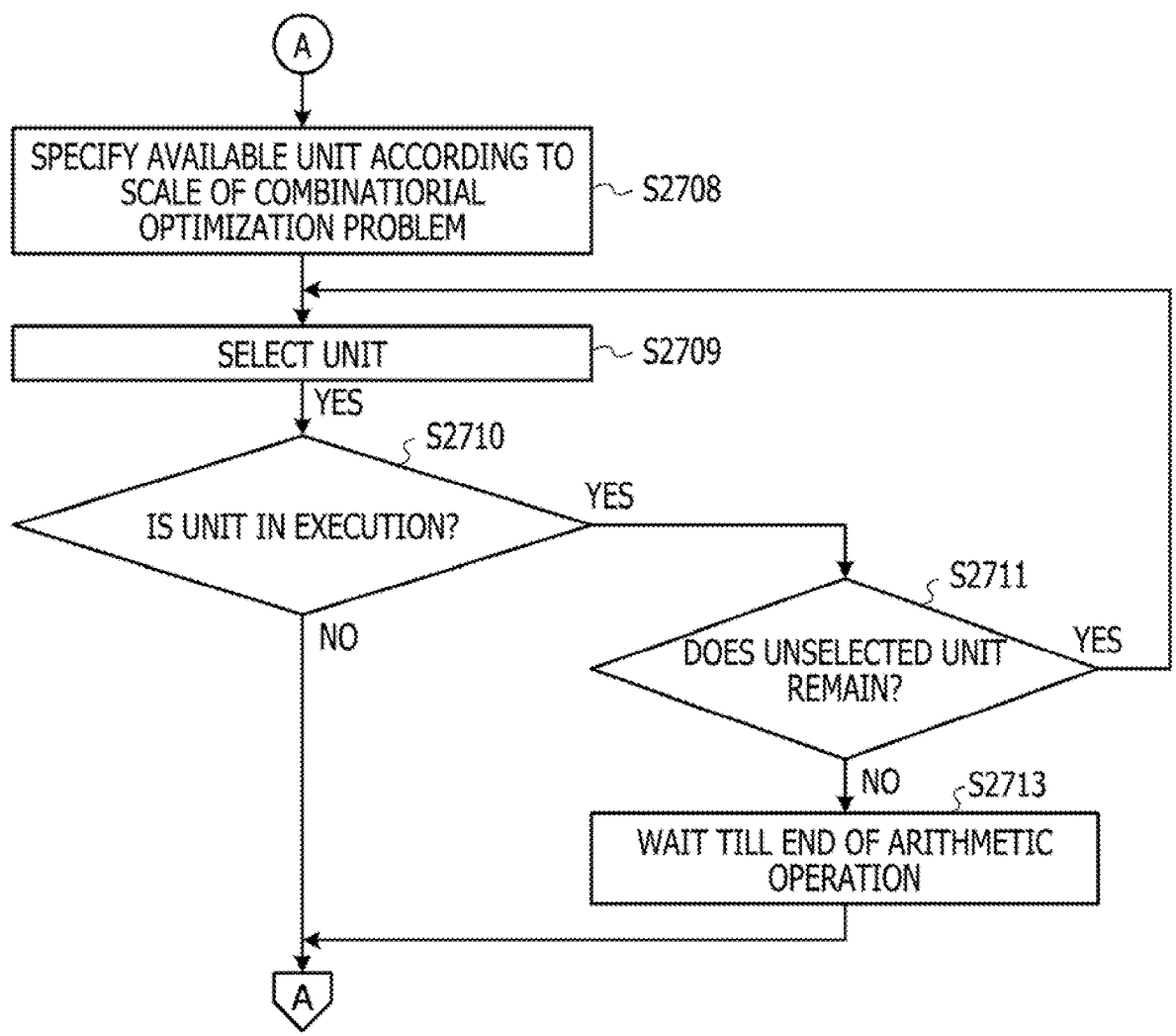
Figure 28:
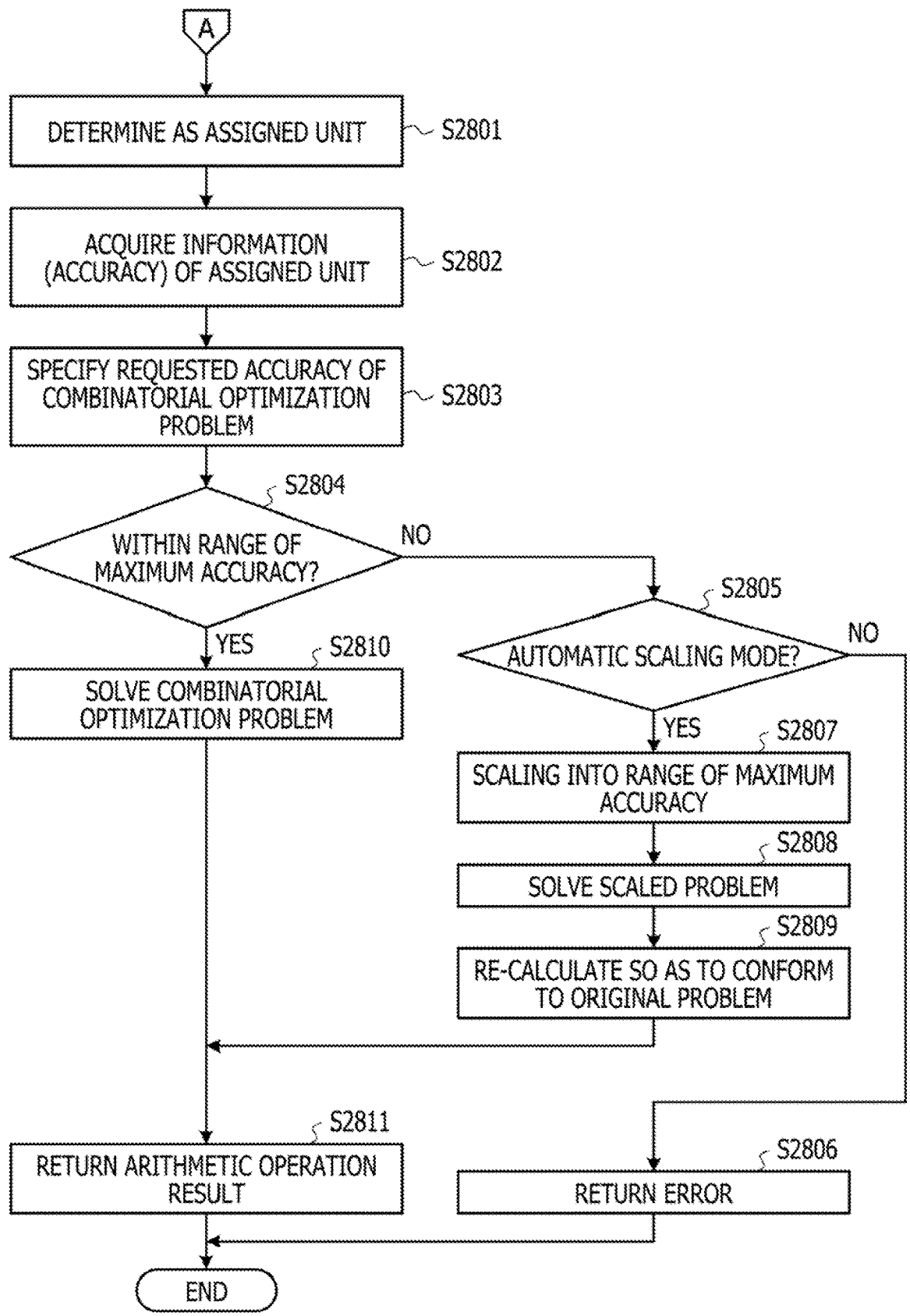
FIG. 28 is a flow chart (part 2) depicting an example of an optimization problem arithmetic processing procedure of an optimization problem arithmetic apparatus.

FIGS. 27 and 28 are flow charts depicting an example of an optimization problem arithmetic processing procedure of the optimization problem arithmetic apparatus 101. Referring first to the flow chart of FIGS. 27A and 27B, the optimization problem arithmetic apparatus 101 first accepts information of a combinatorial optimization problem of a calculation target (step S2701).

Then, the optimization problem arithmetic apparatus 101 refers to the mode setting table 1700 to acquire information (problem scale) of all units (step S2702). The information of a unit (problem scale) is information indicative of a maximum scale (spin bit number) of a problem that can be solved by the unit. Then, the optimization problem arithmetic apparatus 101 specifies the scale of the accepted combinatorial optimization problem (step S2703).

Then, the optimization problem arithmetic apparatus 101 decides whether or not the specified scale of the combinatorial optimization problem is greater than the maximum scale among the problem scales of all units based on the acquired information (problem scale) of all units (step S2704). Here, in the case where the scale of the combinatorial optimization problem is greater than the maximum scale (step S2704: Yes), the optimization problem arithmetic apparatus 101 decides whether or not a distributed method usage mode is set (step S2705).

It is to be noted that the distributed method usage mode is a mode in which a problem is divided and solved by a distributed method. The distributed method usage mode may be set arbitrarily in advance.

Here, in the case where the distributed method usage mode is set (step S2705: Yes), the optimization problem arithmetic apparatus 101 divides the accepted combinatorial optimization problem by a division solver or the like (step S2706), whereafter the processing returns to step S2701. As a result, at step S2701, each problem after division is accepted as the combinatorial optimization problem of a calculation target.

On the other hand, in the case where the distributed method usage mode is not set (step S2705: No), the optimization problem arithmetic apparatus 101 returns an error to the user (step S2707) and ends the series of processes according to the present flow chart.

In the case where the scale of the combinatorial optimization problem is not greater than the maximum scale at step S2704 (step S2704: No), the optimization problem arithmetic apparatus 101 refers to the mode setting table 1700 to specify an available unit according to the scale of the combinatorial optimization problem (step S2708). For example, the optimization problem arithmetic apparatus 101 specifies, from among units that can solve a problem of a scale equal to or greater than the scale of the combinatorial optimization problem, any unit in which the maximum scale of a problem that can be solved is in the minimum is an available unit.

Then, the optimization problem arithmetic apparatus 101 selects a non-selected unit that has not been selected as yet from among the specified available units (step S2709). Then, the optimization problem arithmetic apparatus 101 refers to the mode setting table 1700 to decide whether or not the selected unit is executing arithmetic operation (step S2710).

Here, in the case where the selected unit is not executing arithmetic operation (step S2710: No), the optimization problem arithmetic apparatus 101 advances its processing to step S2801 depicted in FIG. 28.

On the other hand, in the case where the selected unit is executing arithmetic operation (step S2710: Yes), the optimization problem arithmetic apparatus 101 decides whether or not there remains a non-selected unit that has not been selected as yet among the specified available units (step S2711). Here, in the case where there remains a non-selected unit (step S2711: Yes), the optimization problem arithmetic apparatus 101 returns the processing to step S2709.

On the other hand, in the case where there remains no non-selected unit (step S2711: No), the optimization problem arithmetic apparatus 101 waits that arithmetic operation of the selected unit is completed (step S2712) and then advances the processing to step S2801 depicted in FIG. 28.

Referring to the flow chart of FIG. 28, the optimization problem arithmetic apparatus 101 first determines the selected unit to an assigned unit of the combinatorial optimization problem (step S2801). Then, the optimization problem arithmetic apparatus 101 refers to the mode setting table 1700 to acquire the information (accuracy) of the determined assigned unit (step S2802). The information (accuracy) of a unit is information indicative of a maximum accuracy (bit number of a weighting factor) of a problem that can be solved by the unit.

Then, the optimization problem arithmetic apparatus 101 specifies the requested accuracy of the accepted combinatorial optimization problem (step S2803). Then, the optimization problem arithmetic apparatus 101 decides based on the acquired information (accuracy) of the unit whether or not the requested accuracy of the specified combinatorial optimization problem is within the range of the maximum accuracy of the assigned unit (step S2804).

Here, in the case where the requested accuracy of the combinatorial optimization problem is outside the range of the maximum accuracy (step S2804: No), the optimization problem arithmetic apparatus 101 decides whether or not an automatic scaling mode is set (step S2805). It is to be noted that the automatic scaling mode is a mode in which a problem is solved after the requested accuracy of the combinatorial optimization problem is scaled into the range of the maximum accuracy. The automatic scaling mode may be set arbitrarily in advance.

Here, in the case where the automatic scaling mode is not set (step S2805: No), the optimization problem arithmetic apparatus 101 returns an error to the user (step S2806) and ends the series of processes according to the present flow chart.

On the other hand, in the case where the automatic scaling mode is set (step S2805: Yes), the optimization problem arithmetic apparatus 101 scales (multiplies by N) the combinatorial optimization problem into the range of the maximum accuracy of the assigned unit (step S2807).

Then, the optimization problem arithmetic apparatus 101 solves the scaled problem by the assigned unit (step S2808). Then, the optimization problem arithmetic apparatus 101 re-calculates the energy so as to conform to the original image (to 1/N times) (step S2809) and then advances the processing to step S2811.

On the other hand, in the case where the requested accuracy of the combinatorial optimization problem is within the range of the maximum accuracy at step S2804 (step S2804: Yes), the optimization problem arithmetic apparatus 101 solves the combinatorial optimization problem by the assigned unit (step S2810).

Then, the optimization problem arithmetic apparatus 101 returns an arithmetic operation result of the combinatorial optimization problem to the user (step S2811) and ends the series of processes according to the present flow chart. Consequently, arithmetic operation may be performed using appropriate hardware resources according to the scale of the combinatorial optimization problem, and the combinatorial optimization problem may be solved efficiently.

Now, a mode determination processing procedure of the optimization problem arithmetic apparatus 101 is described. The mode determination process of the optimization problem arithmetic apparatus 101 is executed, for example, after every given interval of time.

Figure 29:
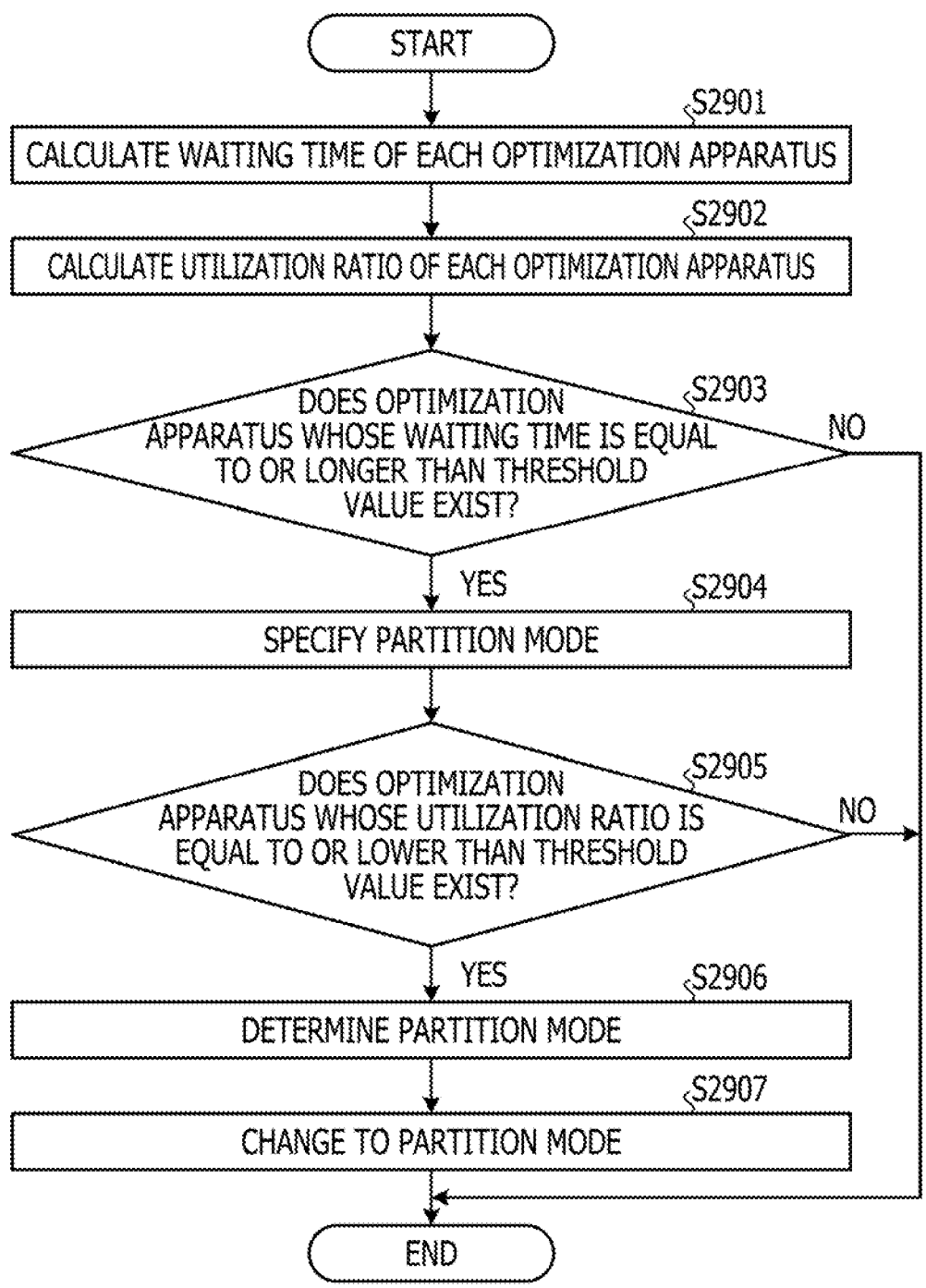
FIG. 29 is a flow chart depicting an example of a mode determination processing procedure of an optimization problem arithmetic apparatus.

FIG. 29 is a flow chart depicting an example of the mode determination processing procedure of the optimization problem arithmetic apparatus 101. Referring to the flow chart of FIG. 29, the optimization problem arithmetic apparatus 101 first calculates waiting time of each optimization apparatus 408($j) based on execution history information (for example, refer to FIG. 20) of each problem accepted at step S2701 depicted in FIGS. 27A and 27B (step S2901).

Then, the optimization problem arithmetic apparatus 101 calculates a utilization ratio of each optimization apparatus 408($j) within a given period of time based on the execution history information (for example, refer to FIG. 20) of each problem (step S2902). The calculated waiting time and utilization ratio of each optimization apparatus 408($j) are stored into the utilization situation table 1800.

Then, the optimization problem arithmetic apparatus 101 refers to the utilization situation table 1800 to decide whether or not there is an optimization apparatus 408 whose waiting time is equal to or longer than the threshold value $\alpha$ (step S2903). Here, in the case where there is no optimization apparatus 408 whose waiting time is equal to or longer than the threshold value $\alpha$ (step S2903: No), the optimization problem arithmetic apparatus 101 ends the series of processes according to the present flow chart.

On the other hand, in the case where there is an optimization apparatus 408 whose waiting time is equal to or longer than the threshold value $\alpha$ (step S2903: Yes), the optimization problem arithmetic apparatus 101 refers to the mode setting table 1700 to specify a partition mode of optimization apparatus 408 whose waiting time is equal to or longer than the threshold value $\alpha$ (step S2904).

Then, the optimization problem arithmetic apparatus 101 refers to the utilization situation table 1800 to decide whether or not there is an optimization apparatus 408 whose utilization ratio is equal to or lower than the threshold value $\beta$ (step S2905). Here, in the case where there is no optimization apparatus 408 whose utilization ratio is equal to or lower than the threshold value $\beta$ (step S2905: No), the optimization problem arithmetic apparatus 101 ends the series of processes according to the present flow chart.

On the other hand, in the case where there is any optimization apparatus 408 whose utilization ratio is equal to or lower than the threshold value $\beta$ (step S2905: Yes), the optimization problem arithmetic apparatus 101 determines the partition mode of the optimization apparatus 408 whose utilization ratio is equal to or lower than the threshold value $\beta$ to the partition mode specified at step S2904 (step S2906). At this time, the optimization problem arithmetic apparatus 101 maintains the current partition mode as it is for any optimization apparatus 408 whose utilization ratio is higher than the threshold value $\beta$.

Then, the optimization problem arithmetic apparatus 101 changes the partition mode of any optimization apparatus 408 whose utilization ratio is equal to or lower than the threshold value $\beta$ to the determined partition mode (step S2907) and ends the series of processed according to the present flow chart. Consequently, the partition mode of each optimization apparatus 408($j) may be changed in response to the utilization situation of the optimization apparatus 408($j).

It is to be noted that, in the case where the waiting time of all optimization apparatuses 408($j) is equal to or longer than the threshold value $\delta$ at step S2903, the optimization problem arithmetic apparatus 101 may increase the number of optimization apparatuses 408 to be utilized. Further, in the case where the utilization ratio of all optimization apparatuses 408($j) is equal to or higher than the threshold value $\gamma$ at step S2905, the optimization problem arithmetic apparatus 101 may increase the number of optimization apparatuses 408 to be utilized.

Further, in the case where an optimization apparatus 408 whose waiting time is equal to or longer than the threshold value α does not exist at step S2903 (step S2903: No), the optimization problem arithmetic apparatus 101 may decide whether or not the utilization ratio of all optimization apparatuses 408($j) is equal to or lower than the threshold value β. Then, in the case where the utilization ratio of all optimization apparatuses 408($j) is equal to or lower than the threshold value β, the optimization problem arithmetic apparatus 101 may decrease an optimization apparatus 408 to be utilized.

Now, an example of an apparatus configuration of the optimization apparatus 408 is described. The optimization apparatus 408($j) described below is different in part of a circuit configuration from the optimization apparatus 408 ($j) described hereinabove with reference to FIGS. 5 to 16.

Figure 30:
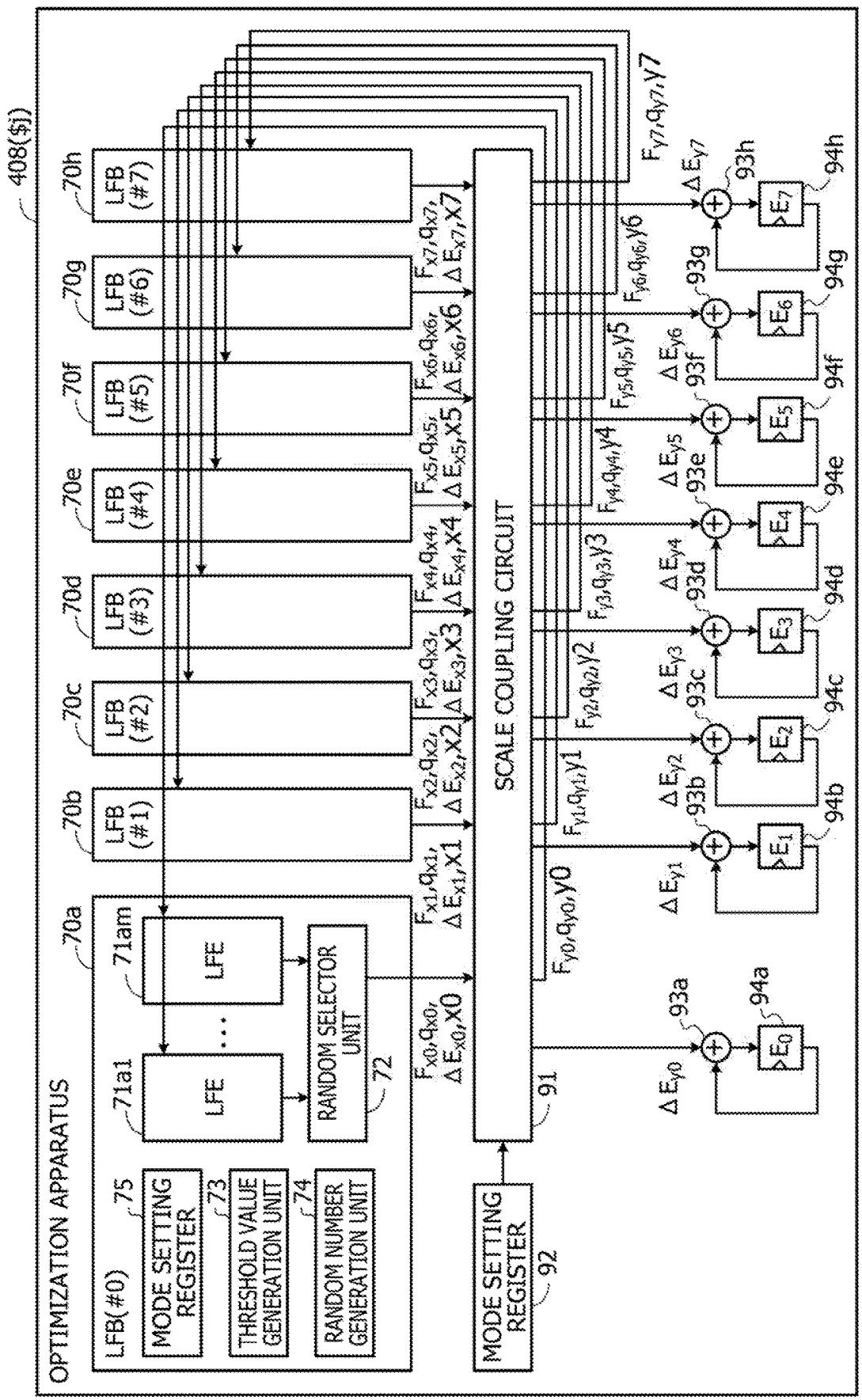
FIG. 30 is an explanatory view depicting an example of an apparatus configuration of an optimization apparatus.

FIG. 30 is an explanatory view depicting an example of an apparatus configuration of the optimization apparatus 408($j). The optimization apparatus 408($j) includes a plurality of LFBs. The optimization apparatus 408($j) further includes a control unit 504 for controlling the plurality of LFBs (not depicted).

Here, it is assumed that, as an example, the number of LFEs belonging to one LFB is m (m is an integer equal to or greater than 2), and the optimization apparatus 408($j) includes LFBs 70a, 70b, 70c, 70d, 70e, 70f, 70g and 70h. In this case, the optimization apparatus 408($j) includes totaling 8 m LFEs and may implement a maximum scale of 8 m bits. In the optimization apparatus 408($j), a partition is implemented, for example, by one or more LFBs from among the LFBs 70a, 70b, 70c, 70d, 70e, 70f, 70g and 70h. However, the number of LFBs the optimization apparatus 408($j) includes may be 8 or a different number.

The plurality of LFEs provided in the LFBs 70a, ..., 70h are an example of the bit arithmetic circuits 1a1, ..., 1aN depicted in FIG. 2. Each of the LFBs 70a, ..., 70h may be considered as one group of LFEs including a given number of (m) LFEs as elements thereof. Further, to the LFBs 70a, ..., 70h, identification numbers #0 to #7 are allocated, respectively.

The optimization apparatus 408($j) further includes a scale coupling circuit 91, a mode setting register 92, adders 93a, 93b, 93c, 93d, 93e, 93f, 93g and 93h, and storage registers 94a, 94b, 94c, 94d, 94e, 94f, 94g and 94h.

Here, the LFB 70a includes LFEs 71a1, ..., 71am, a random selector unit 72, a threshold value generation unit 73, a random number generation unit 74 and a mode setting register 75. The LFEs 71a1, ..., 71am, random selector unit 72, threshold value generation unit 73, random number generation unit 74 and mode setting register 75 correspond to hardware elements having same names as those described hereinabove with reference to FIG. 8, and therefore, description of them is omitted. However, the random selector unit 72 outputs a set of state signals (flag $F_{x0}$, spin bit $q_{x0}$ and energy variation amount $\Delta E_{x0}$) regarding a selected inversion bit to the scale coupling circuit 91. Further, the random selector unit 72 may not include the flag controlling unit 52a (however, may include the flag controlling unit 52a). For example, in the random selector unit 72, state signals from the LFEs are inputted two by two to the selection circuits at the first stage of the random selector unit 72 without the intervention of the flag controlling unit 52a. It is to be noted that also the LFBs 70b, ..., 70h include a circuit configuration similar to that of the LFB 70a.

The scale coupling circuit 91 accepts state signals from the LFBs 70a, ..., 70h and performs selection of an inversion bit based on the state signals. The scale coupling circuit 91 supplies a signal relating to the inversion bit to the LFEs of the LFBs 70a, ..., 70h.

For example, the scale coupling circuit 91 outputs a flag $F_{y0}$, a bit $q_{y0}$ and index indicative of the inversion bit=y0 to the LFEs 71a1, ..., 71am of the LFB 70a1. Here, in the succeeding figures, such representation as "index=x0" outputted from the random selector unit 72 and the scale coupling circuit 91 is sometimes referred to in an abbreviated form like "x0." The scale coupling circuit 91 outputs an energy variation amount $\Delta E_{y0}$ to the adder 93a.

The scale coupling circuit 91 outputs a flag $F_{y1}$, a bit $q_{y1}$ and index indicative of the inversion bit=y1 to the LFEs of the LFB 70b. The scale coupling circuit 91 outputs an energy variation amount $\Delta E_{y1}$ to the adder 93b.

The scale coupling circuit 91 outputs a flag $F_{y2}$, a bit $q_{y2}$ and index indicative of the inversion bit=y2 to the LFEs of the LFB 70c. The scale coupling circuit 91 outputs an energy variation amount $\Delta E_{y2}$ to the adder 93c.

The scale coupling circuit 91 outputs a flag $F_{y3}$, a bit $q_{y3}$ and index indicative of the inversion bit=y3 to the LFEs of the LFB 70d. The scale coupling circuit 91 outputs an energy variation amount $\Delta E_{y3}$ to the adder 93d.

The scale coupling circuit 91 outputs a flag $F_{y4}$, a bit $q_{y4}$ and index indicative of the inversion bit=y4 to the LFEs of the LFB 70e. The scale coupling circuit 91 outputs an energy variation amount $\Delta E_{y4}$ to the adder 93e.

The scale coupling circuit 91 outputs a flag $F_{y5}$, a bit $q_{y5}$ and index indicative of the inversion bit=y5 to the LFEs of the LFB 70f. The scale coupling circuit 91 outputs an energy variation amount $\Delta E_{y5}$ to the adder 93f.

The scale coupling circuit 91 outputs a flag $F_{y6}$, a bit q6 and index indicative of the inversion bit=y6 to the LFEs of the LFB 70g. The scale coupling circuit 91 outputs an energy variation amount $\Delta E_{y6}$ to the adder 93g.

The scale coupling circuit 91 outputs a flag $F_{y7}$, a bit $q_{y7}$ and index indicative of the inversion bit=y7 to the LFEs of the LFB 70h. The scale coupling circuit 91 outputs an energy variation amount $\Delta E_{y7}$ to the adder 93h.

The random selector units (including the random selector unit 72) each of the LFBs 70a, ..., 70h includes and the scale coupling circuit 91 are an example of the selection circuit unit 2 depicted in FIG. 2.

The mode setting register 92 performs setting of an operation mode (partition mode) to the scale coupling circuit 91. For example, the mode setting register 92 performs setting of an operation mode (partition mode) to the scale coupling circuit 91 in response to a scale (spin bit number) and an accuracy (bit number of a weighting factor) inputted from the execution controlling unit 1905 of the optimization problem arithmetic apparatus 101. The mode setting register 92 sets an operation mode same as the operation mode set to the LFEs 71a1, ..., 71am and the random selector unit 72 by the mode setting register 75 to the scale coupling circuit 91. Details of mode setting by the mode setting registers 75 and 92 are hereinafter described. The mode setting registers (including the mode setting register 75) each of the LFBs 70a, ..., 70h includes and the mode setting register 92 are an example of the setting changing unit 5 depicted in FIG. 2.

The adder 93a adds $\Delta E_{y0}$ to the energy value $E_0$ stored in the E storage register 94a to update the energy value $E_0$. The E storage register 94a fetches the energy value $E_0$ calculated by the adder 93a, for example, in synchronism with a dock signal (not depicted) (this similarly applies also to the other E storage registers).

The adder 93*b* adds $\Delta E_{y1}$ to the energy value $E_1$ stored in the E storage register 94*b* to update the energy value $E_1$. The E storage register 94*b* fetches the energy value $E_1$ calculated by the adder 93*b*.

The adder 93*c* adds $\Delta E_{y2}$ to the energy value $E_2$ stored in the E storage register 94*c* to update the energy value $E_2$. The E storage register 94*c* fetches the energy value $E_2$ calculated by the adder 93*c*.

The adder 93*d* adds $\Delta E_{y3}$ to the energy value $E_3$ stored in the E storage register 94*d* to update the energy value $E_3$. The E storage register 94*d* fetches the energy value $E_3$ calculated by the adder 93*d*.

The adder 93*e* adds $\Delta E_{y4}$ to the energy value $E_4$ stored in the E storage register 94*e* to update the energy value $E_4$. The E storage register 94*e* fetches the energy value $E_4$ calculated by the adder 93*e*.

The adder 93*f* adds $\Delta E_{y5}$ to the energy value $E_5$ stored in the E storage register 94*f* to update the energy value $E_5$. The E storage register 94*f* fetches the energy value $E_5$ calculated by the adder 93*f*.

The adder 93*g* adds $\Delta E_{y6}$ to the energy value $E_6$ stored in the E storage register 94*g* to update the energy value $E_6$. The E storage register 94*g* fetches the energy value $E_6$ calculated by the adder 93*g*.

The adder 93*h* adds $\Delta E_{y7}$ to the energy value $E_7$ stored in the E storage register 94*h* to update the energy value $E_7$. The E storage register 94*h* fetches the energy value $E_7$ calculated by the adder 93*h*.

Each of the E storage registers 94*a*, . . . , 94*h* is, for example, a flip-flop.

Subsequently, an example of a circuit configuration of the LFB 70*a* is described. Also the LFBs 70*b*, . . . , 70*h* include a circuit configuration similar to that of the LFB 70*a*.

Figure 31:
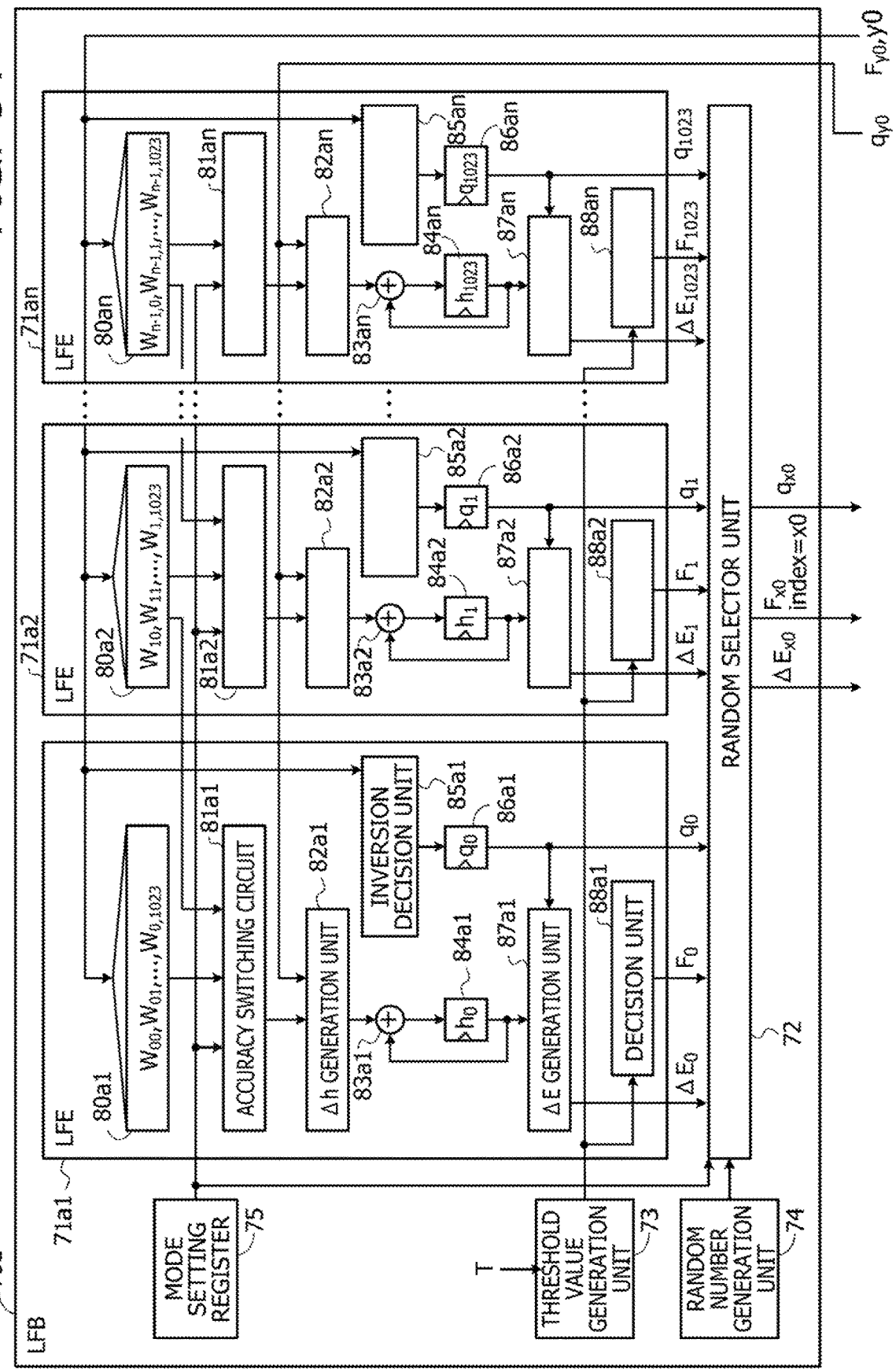
FIG. 31 is an explanatory view depicting an example of a circuit configuration of an LFB.

FIG. 31 is an explanatory view depicting an example of a circuit configuration of an LFB. Each of the LFEs 71*a*1, 71*a*2, . . . , 71*am* is used as a 1 bit of a spin bit. m is an integer equal to or greater than 2 and indicates the number of LFEs provided in each LFB 70. In the example of FIG. 31, m=1024 as an example. However, m may be a different value.

With each of the LFEs 71*a*1, 71*a*2, . . . , 71*am*, identification information (index) is associated. With the LFEs 71*a*1, 71*a*2, . . . , 71*am*, index=0, 1, . . . , 1023 are associated, respectively.

In the following, a circuit configuration of the LFE 71*a*1 is described. Also the LFEs 71*a*2, . . . , 71*am* are implemented by a circuit configuration similar to that of the LFE 71*a*1. It is sufficient, for description of the circuit configuration of the LFEs 71*a*2, . . . , 71*am*, if the representation "a1" at the tail end of a reference character of each factor in the following description is replaced with "a2," . . . , "am" (for example, in such a manner that the reference character of "80*a*1" is replaced with "80*am*").

The LFE 71*a*1 includes an SRAM 80*a*1, an accuracy switching circuit 81*a*1, a Δh generation unit 82*a*1, an adder 83*a*1, an h storage register 84*a*1, an inversion decision unit 85*a*1, a bit storage register 86*a*1, a ΔE generation unit 87*a*1 and a decision unit 88*a*1.

Here, the SRAM 80*a*1, accuracy switching circuit 81*a*1, Δh generation unit 82*a*1, adder 83*a*1, h storage register 84*a*1, inversion decision unit 85*a*1, bit storage register 86*a*1, ΔE generation unit 87*a*1 and decision unit 88*a*1 individually have similar functions to those of the hardware components having same names as those described hereinabove with reference to FIG. 8. However, to the SRAM 80*a*1 (or accuracy switching circuit 81*a*1) and the inversion decision unit 85*a*1, index=y0 and the flag $F_{y0}$ indicative of revers-ibility outputted from the scale coupling circuit 91 are supplied. Further, to the Δh generation unit 82*a*1, an inversion bit $q_{y0}$ outputted from the scale coupling circuit 91 is supplied.

The mode setting register 75 performs setting of a bit number (accuracy) of a weighting factor to the accuracy switching circuits 81*a*1, 81*a*2, . . . , 81*am*. The mode setting register 75 does not include signal lines for performing setting to the random selector unit 72 therethrough (however, may include such signal lines). Here, as an example, the five different modes described hereinabove are available.

The first mode is a mode of the scale 1 Kbit/accuracy 128 bits and corresponds to the partition mode "8P (8 division)." The mode of the scale 1 Kbit/accuracy 128 bits uses one LFB. Partitions of the first mode may be implemented only by one of the LFBs 70*a*, . . . , 70*h*.

The second mode is a mode of the scale 2 Kbits/accuracy 64 bits and corresponds to the partition mode "4P (4 division)." The mode of the scale 2 Kbits/accuracy 64 bits uses two LFBs. For example, partitions of the second mode may be implemented by one of a combination of the LFBs 70*a* and 70*b*, a combination of the LFBs 70*c* and 70*d*, a combination of the LFBs 70*e* and 70*f*, and a combination of the LFBs 70*g* and 70*h*.

The third mode is a mode of the scale 4 Kbits/accuracy 32 bits and corresponds to the partition mode "2P (2 division)." The mode of the scale 4 Kbits/accuracy 32 bits uses four LFBs. For example, partitions of the third mode may be implemented by one of a combination of the LFBs 70*a*, 70*b*, 70*c* and 70*d* and a combination of the LFBs 70*e*, 70*f*, 70*g* and 70*h*.

The fourth mode is a mode of the scale 8 Kbits/accuracy 16 bits and corresponds to the partition mode "FULL (scale: 8K, accuracy 16 bits)." The mode of the scale 8 Kbits/accuracy 16 bits uses eight LFBs. The partitions of the fourth mode may be implemented using a combination of the LFBs 70*a*, . . . , 70*h*.

The fifth mode is a mode of the scale 4 Kbits/accuracy 64 bits and corresponds to the partition mode "FULL (scale: 4K, accuracy: 64 bits)." The mode of the scale 4 Kbits/accuracy 64 bits uses eight LFBs. Partitions of the fifth mode may be implemented by a combination of the LFBs 70*a*, . . . , 70*h*. However, as described hereinabove with reference to FIG. 16, the number of LFEs used in one LFB is one half the number of LFEs provided in one LFB.

The optimization apparatus 408($j) may execute arithmetic operation of a same problem or different problems in parallel by a combination of the mode of the scale 1 Kbit/accuracy 128 bits, the mode of the scale 2 Kbits/accuracy 64 bits and the mode of the scale 4 Kbits/accuracy 32 bits.

To this end, the scale coupling circuit 91 selects the number of LFBs to be combined (the number of groups to be combined) such that a plurality of LFBs (combination of LFBs) include LFEs the number of which corresponds to a spin bit number in response to a setting of a spin bit number by the mode setting register 92. The scale coupling circuit 91 includes, for example, the following circuit configuration.

Figure 32:
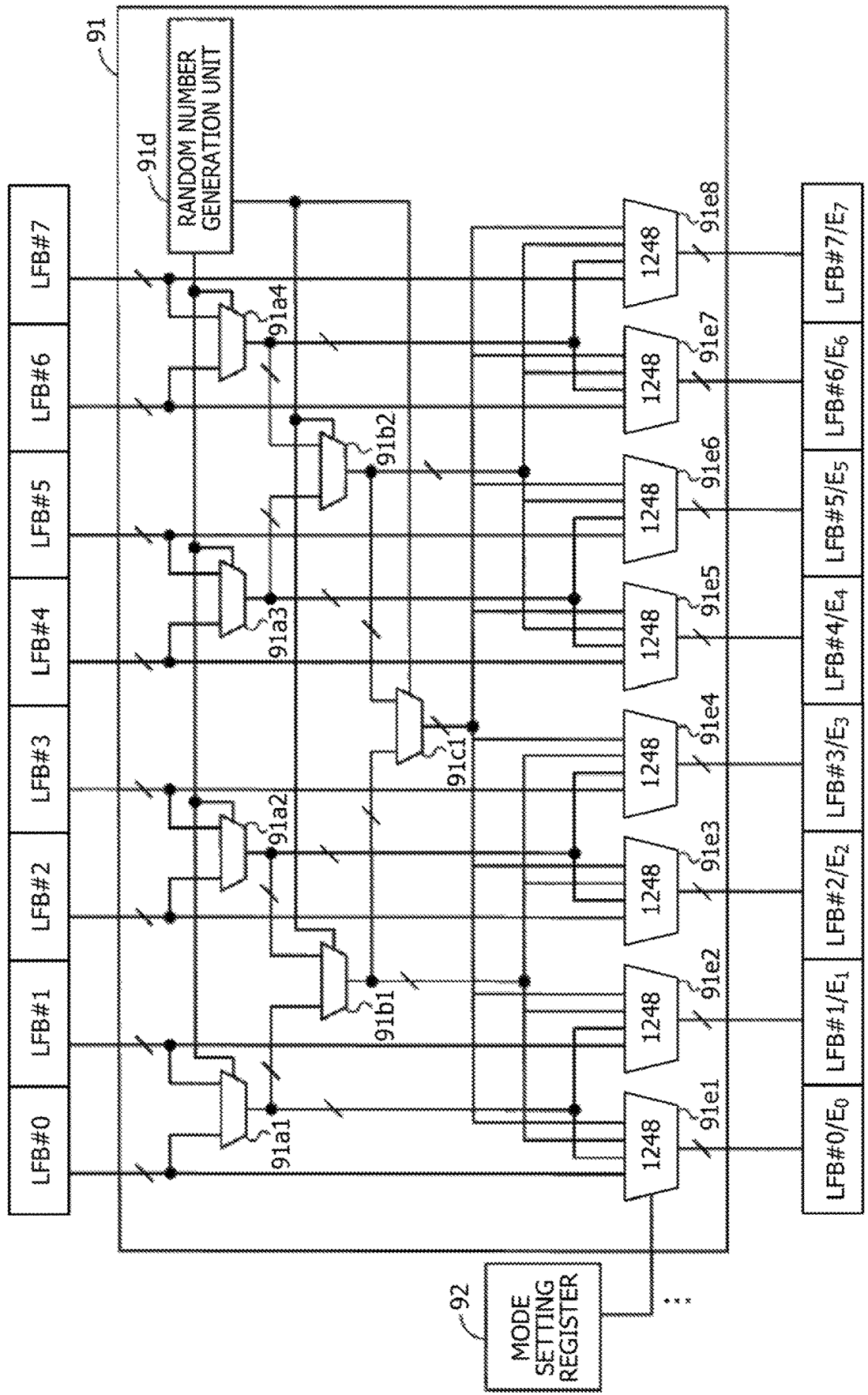
FIG. 32 is an explanatory view depicting an example of a circuit configuration of a scale coupling circuit.

FIG. 32 is an explanatory view depicting an example of a circuit configuration of the scale coupling circuit. The scale coupling circuit 91 includes a plurality of selection circuits 91*a*1, 91*a*2, 91*a*3, 91*a*4, 91*b*1, 91*b*2 and 91*c*1 coupled like a tree over a plurality of stages, a random number generation unit 91*d*, and a plurality of mode selection circuits 91*e*1, 91*e*2, 91*e*3, 91*e*4, 91*e*5, 91*e*6, 91*e*7 and 91*e*8.

To each of the selection circuits 91a1, ..., 91a4 at the first stage, two sets (state signal) each including a variable $q_i$, $F_i$, $\Delta E_i$ and index=i outputted from each of the LFBs 70a, ..., 70h are inputted. For example, to the selection circuit 91a1, a set of ($q_{x0}$, $F_{x0}$, $\Delta E_{x0}$ and index=x0) outputted from the LFB 70a (#0) and another set of ($q_{x1}$, $F_{x1}$, $\Delta E_{x1}$ and index=x1) outputted from the LFB 70b (#1) are inputted. Further, to the selection circuit 91a2, a set of ($q_{x2}$, $F_{x2}$, $\Delta E_{x2}$ and index=x2) outputted from the LFB 70c (#2) and another set of ($q_{x3}$, $F_{x3}$, $\Delta E_{x3}$ and index=x3) outputted from the LFB 70d (#3) are inputted. To the selection circuit 91a3, a set of ($q_{x4}$, $F_{x4}$, $\Delta E_{x4}$ and index=x4) outputted from the LFB 70e (#4) and another set of ($q_{x5}$, $F_{x5}$, $\Delta E_{x5}$ and index=x5) outputted from the LFB 70f (#5) are inputted. To the selection circuit 91a4, a set of ($q_{x6}$, $F_{x6}$, $\Delta E_{x6}$ and index=x6) outputted from the LFB 70g (#6) and another set of ($q_{x7}$, $F_{x7}$, $\Delta E_{x7}$ and index=x7) outputted from the LFB 70h (#7) are inputted.

Then, each of the selection circuits 91a1, ..., 91a4 selects ($x_i$, $F_i$, $\Delta E_i$ and index=i) of one of the two sets based on a one-bit random number outputted from the random number generation unit 91d. At this time, each of the selection circuits 91a1, ..., 91a4 preferentially selects a set in which Fi is 1 and selects, in the case where Fi is 1 in both sets, one of the sets based on a one-bit random number (it is to be noted that this similarly applies also to the selection circuits 91b1, 91b2 and 91c1). Here, the random number generation unit 91d generates a one-bit random number individually for each selection circuit and outputs the one-bit random number to the selection circuit. Further, each of the selection circuits 91a1, ..., 91a4 generates an identification value indicative of which one of the sets is selected based on index included in both sets, and outputs a state signal including the selected variable $q_i$, $F_i$, $\Delta E_i$ and identification value. It is to be noted that the identification value outputted from each of the selection circuits 91a1, ..., 91a4 has one additional bit to that of inputted index.

To each of the selection circuits 91b1 and 91b2 at the second stage, state signals outputted from the selection circuits 91a1, ..., 91a4 are inputted two by two. For example, to the selection circuit 91b1, state signals outputted from the selection circuits 91a1 and 91a2 are inputted, and to the selection circuit 91b2, state signals outputted from the selection circuits 91a3 and 91a4 are inputted.

Then, each of the selection circuits 91b1 and 91b2 selects one of two state signals based on the two state signals and a one-bit random number outputted from the random number generation unit 91d. Further, each of the selection circuits 91b1 and 91b2 adds one bit to the identification value included in the selected state signal so as to indicate which one of the state signals is selected to update the identification value and outputs the selected state signal.

To the selection circuit 91c1 at the final stage, two state signals outputted from the selection circuits 91b1 and 91b2 are inputted. The selection circuit 91c1 selects one of the two state signals based on the two state signals and a one-bit random number outputted form the random number generation unit 91d. Further, the selection circuit 91c1 adds one bit to the identification value included in the selected state signal so as to indicate which one of the state signals is selected to update the identification value and outputs the selected state signal.

As described hereinabove, the identification value corresponds to index. The scale coupling circuit 91 may perform selection of index inputted from the random selector units by the selection circuits similarly to the variable $q_i$, $F_i$ and $\Delta E_i$ such that it outputs index corresponding to the inversion bit.

In this case, each random selector unit receives index supplied together with the variable q or the flag F from each LFE. The control unit 504 performs setting of index, for example, according to a combination of LFBs to a given index storage register of each LFE.

Each of the mode selection circuits 91e1, ..., 91e8 includes input terminals according to the scales (for example, 1 Kbit, 2 Kbits, 4 Kbits and 8 Kbits). In FIG. 25, the numeral "1" written in each of the mode selection circuits 91e1, ..., 91e8 indicates an input terminal corresponding to the scale of 1 Kbit. Similarly, the numeral "2" Indicates an input terminal corresponding to the scale of 2 Kbits; the numeral "4" indicates an input terminal corresponding to the scale of 4 Kbits (accuracy 32 bits); and "8" indicates an input terminal corresponding to the scale of 8 Kbits (or the scale of 4 Kbits/accuracy of 64 bits).

To the input terminal for the scale 1 Kbit of the mode selection circuit 91e1, a state signal outputted from the LFB 70a (#0) is inputted. To the input terminal for the scale 1 Kbit of the mode selection circuit 91e2, a state signal outputted from the LFB 70b (#1) is inputted. To the input terminal for the scale 1 Kbit of the mode selection circuit 91e3, a state signal outputted from the LFB 70c (#2) is inputted. To the input terminal for the scale 1 Kbit of the mode selection circuit 91e4, a state signal outputted from the LFB 70d (#3) is inputted. To the input terminal for the scale 1 Kbit of the mode selection circuit 91e5, a state signal outputted from the LFB 70e (#4) is inputted. To the input terminal for the scale 1 Kbit of the mode selection circuit 91e6, a state signal outputted from the LFB 70f (#5) is inputted. To the input terminal for the scale 1 Kbit of the mode selection circuit 91e7, a state signal outputted from the LFB 70g (#6) is inputted. To the input terminal for the scale 1 Kbit of the mode selection circuit 91e8, a state signal outputted from the LFB 70h (#7) is inputted.

To the input terminal for the scale 2 Kbits of each of the mode selection circuits 91e1 and 91e2, a state signal outputted from the selection circuit 91a1 is inputted. To the input terminal for the scale 2 Kbits of each of the mode selection circuits 91e3 and 91e4, a state signal outputted from the selection circuit 91a2 is inputted. To the input terminal for the scale 2 Kbits of each of the mode selection circuits 91e5 and 91e6, a state signal outputted from the selection circuit 91a3 is inputted. To the input terminal for the scale 2 Kbits of each of the mode selection circuits 91e7 and 91e8, a state signal outputted from the selection circuit 91a4 is inputted.

To the input terminal for the scale 4 Kbits of each of the mode selection circuits 91e1, 91e2, 91e3 and 91e4, a state signal outputted from the selection circuit 91b1 is inputted. To the input terminal for the scale 4 Kbits of each of the mode selection circuits 91e5, 91e6, 91e7 and 91e8, a state signal outputted from the selection circuit 91b2 is inputted.

To the input terminal for the scale 8 Kbits of each of the mode selection circuits 91e1, ..., 91e8, a state signal outputted from the selection circuit 91c1 is inputted.

Each of the mode selection circuits 91e1, ..., 91e8 accepts a setting of a scale (spin bit number) from the mode setting register 92. However, in FIG. 25, each of signal lines from the mode setting register 92 to the mode selection circuits 91e2, ..., 91e8 is abbreviated with " ... " Each of the mode selection circuits 91e1, ..., 91e8 selects a state signal inputted to an input terminal thereof according to the set scale, and outputs ($x_j$, $F_j$, index=j) to the LFBs 70a, ..., 70h and outputs $\Delta E_j$ to the adders 93a, ..., 93h.

For example, the mode selection circuit 91e1 outputs ($x_{y0}$, $F_{y0}$, index=y0) to the LFB 70a and outputs $\Delta E_{y0}$ to the adder 93a. The adder 93a updates $E_0$ based on $\Delta E_{y0}$. The mode selection circuit 91e2 outputs ($x_{y1}$, $F_{y1}$, index=y1) to the LFB 70b and outputs $\Delta E_1$ to the adder 93b. The adder 93b updates $E_1$ based on $\Delta E_{y1}$. The mode selection circuit 91e3 outputs ($x_{y2}$, $F_{y2}$, index=y2) to the LFB 70c and outputs $\Delta E_{y2}$ to the adder 93c. The adder 93c updates $E_2$ based on $\Delta E_{y2}$. The mode selection circuit 91e4 outputs ($x_{y3}$, $F_{y3}$, index=y3) to the LFB 70d and outputs $\Delta E_{y3}$ to the adder 93d. The adder 93d updates $E_3$ based on $\Delta E_{y3}$. The mode selection circuit 91e5 outputs ($x_{y4}$, $F_{y4}$, index=y4) to the LFB 70e and outputs $\Delta E_{y4}$ to the adder 93e. The adder 93e updates $E_4$ based on $\Delta E_{y4}$. The mode selection circuit 91e6 outputs ($x_{y5}$, $F_{y5}$, index=y5) to the LFB 70f and outputs $\Delta E_{y5}$ to the adder 93f. The adder 93f updates $E_5$ based on $\Delta E_{y5}$. The mode selection circuit 91e7 outputs ($x_{y6}$, $F_{y6}$, index=y6) to the LFB 70g and outputs $\Delta E_{y6}$ to the adder 93g. The adder 93g updates $E_6$ based on $\Delta E_{y6}$. The mode selection circuit 91e8 outputs ($x_{y7}$, $F_7$, index=y7) to the LFB 70h and outputs $\Delta E_{y7}$ to the adder 93h. The adder 93h updates $E_7$ based on $\Delta E_{y7}$.

For example, the optimization apparatus 408($j) includes, for each LFB, a random selector unit that selects one of bits based on a signal outputted from each LFE belonging to the LFB (group) and indicative of reversibility and outputs a signal indicative of the selected bit to the scale coupling circuit 91. The scale coupling circuit 91 combines one or more LFBs in response to a setting of a spin bit number and selects a bit to be inverted based on signals indicative of bits elected by random selector units individually corresponding to the one or more LFBs. The scale coupling circuit 91 outputs a signal indicative of the bit to be inverted to each of the LFEs belonging to the one or more LFBs.

Here, the mode setting register 92 performs setting of a scale individually to the mode selection circuits 91e1, . . . , 91e8. However, in a mode of a certain scale, a common scale is set to mode selection circuits corresponding to the LFBs used in combination.

For example, the mode setting register 92 may set the spin bit number of a first spin bit string corresponding to a first combination of LFBs and the spin bit number of a second spin bit string corresponding to a second combination of LFBs to a same bit number or to different bit numbers. Further, the mode setting registers of the LFBs including the mode setting register 75 may set the bit number of a weighting factor for LFEs belonging to a first combination of LFBs and the bit number of a weighting factor for LFEs belonging to a second combination of LFBs to a same bit number or to different bit numbers.

For example, in the case where the LFBs 70a and 70b are used in combination to utilize the mode of the scale 2 Kbits, a selection signal for selecting the mode of the scale 2 Kbits is supplied from the mode setting register 92 to the mode selection circuits 91e1 and 91e2. At this time, for example, the optimization apparatus 408($j) may execute a same problem as that of arithmetic operation by the LFBs 70a and 70b or different problems from each other in parallel using the remaining six LFBs by the setting of the mode setting register 92.

For example, the scale coupling circuit 91 may implement, from among the remaining six LFBs, three modes of the scale 2 Kbits through combination of each two of the six LFBs. This makes it possible to implement four partitions of the partition mode "4P."

The combination of modes to be implemented in parallel is not limited to the combinations described above, and for example, a combination of eight modes of the scale 1 Kbit, a combination of two modes of the scale 4 Kbits and so forth are available.

In this manner, the scale coupling circuit 91 accepts a setting of spin bit numbers individually to a plurality of spin bit strings by the mode setting register 92, selects an LFB number (group number) to be combined for each spin bit number of the plurality of spin bit strings and combines such LFBs. This makes it possible to implement a plurality of Ising models on the single optimization apparatus 408($j).

It is to be noted that, into a set of E storage registers corresponding to a set of LFBs used in combination, common energy is stored. For example, in the case where the LFBs 70a and 70b are utilized in combination, $E_0$ and $E_1$ stored in the E storage registers 94a and 94b have an equal value. In this case, when an energy value for the set of the LFBs 70a and 70b is to be read out, it is sufficient if the control unit 504 reads out an energy value stored in one of the E storage registers 94a and 94b (for example, in the E storage register 94a corresponding to the LFB 70a). The control unit 504 reads out an energy value in a similar manner also in regard to the other combinations of LFBs.

For example, the control unit 504 accepts an input of initial values or operation conditions of problems to be arithmetically operated in parallel from the execution controlling unit 1905 of the optimization problem arithmetic apparatus 101. Then, the control unit 504 sets the scale/accuracy according to each problem inputted from the execution controlling unit 1905 of the optimization problem arithmetic apparatus 101 to the mode setting registers of the LFBs and the mode setting register 92 for each group of the LFBs to be used for one problem (for example, for each partition).

For example, the control unit 504 sets, in regard to a first problem, the scale 2 Kbits/accuracy 64 bits to the mode setting registers of the LFBs 70a and 70b and sets the scale 2 Kbits/accuracy 64 bits to the mode setting register 92 such that outputting for the scale 2 Kbits to the mode selection circuits 91e1 and 91e2 is to be performed. Further, the control unit 504 sets, in regard to a second problem, the scale 2 Kbits/accuracy 64 bits to the mode setting registers of the LFBs 70c and 70d and sets the scale 2 Kbits/accuracy 64 bits to the mode setting register 92 such that outputting for the scale 2 Kbits to the mode selection circuits 91e3 and 91e4 is to be performed.

In this case, the optimization apparatus 408($j) may arithmetically operate two problems (otherwise the two problems may be a same problem) in parallel. For example, the control unit 504 controls the LFBs so as to perform the procedure of the flow chart depicted in FIG. 15 for a combination of LFBs corresponding to each problem.

The control unit 504 reads out a spin bit string for the first problem from the LFEs of the LFBs 70a and 70b after the arithmetic operation ends and determines the spin bit string as a solution to the first problem. Further, the control unit 504 reads out a spin bit string for the second problem from the LFEs of the LFBs 70c and 70d after the arithmetic operation ends and determines the spin bit string as a solution to the second problem. Also for three or more problems, parallel arithmetic operation may be performed. This makes it possible to efficiently perform arithmetic operation for a plurality of problems.

Further, in the case where a same problem is solved in parallel by a plurality of sets of LFBs, it is conceivable that the control unit 504 performs arithmetic operation at a high speed, for example, by a technique called replica exchange method. In the replica exchange method, update of a spin bit string with temperature parameters that are different among different sets of LFBs (among replicas) is performed and, after a given number of times of update, temperature parameters are exchanged with a given probability between sets of LFBs (for example, between replicas) to perform a search for a solution at a high speed.

Alternatively, as a search method for a solution, also a method is conceivable by which the procedure of FIG. 15 from the start (START) to the end (END) is performed repeatedly and a spin bit string whose energy is lowest is determined as a solution from among a plurality of results of the arithmetic operation. In this case, the control unit 504 may reduce the number of repetitions to perform arithmetic operation at a high speed by solving a same problem in parallel using a plurality of sets of LFBs.

As described above, with the optimization problem arithmetic apparatus 101 according to the embodiment, a partition mode for each of a plurality of optimization apparatuses 408 may be determined based on information relating to a partition mode that defines a logical division state of each of the plurality of optimization apparatuses 408 and utilization information of the plurality of optimization apparatuses 408. The utilization information of the plurality of optimization apparatuses 408 includes execution history information of combinatorial optimization problems whose arithmetic operation has been executed, for example, by the plurality of optimization apparatuses 408. The utilization information of the plurality of optimization apparatuses 408 may further include information relating to a processing queue of each of the plurality of optimization apparatuses 408 (for example, waiting time of each optimization apparatus 408($j)). Further, the utilization information of the plurality of optimization apparatuses 408 may include information relating to a utilization situation of the plurality of optimization apparatuses 408 (for example, a utilization ratio of each optimization apparatus 408($j)).

Consequently, a partition mode for each of the plurality of optimization apparatuses 408 may be determined in response to the utilization situation of the plurality of optimization apparatuses 408. For example, it is possible to change the partition mode of an optimization apparatus 408 whose utilization ratio is low such that it has a configuration same as another optimization apparatus 408 whose waiting time is long. Consequently, it is possible to increase the number of hardware resources that can solve a problem of a scale or a requested accuracy similar to that of a problem with regard to which waiting occurs without increasing the number of optimization apparatuses 408 and thereby reduce the waiting time and besides reduce opportunity loss arising from a failure in sufficient processing of a problem requested from a user.

Further, with the optimization problem arithmetic apparatus 101, it is possible to accept a combinatorial optimization problem and determine an optimization apparatus 408 to which the combinatorial optimization problem is to be assigned based on the scale or the requested accuracy of the accepted combinatorial optimization problem and the partition mode of each of the determined plurality of optimization apparatuses 408. Further, with the optimization problem arithmetic apparatus 101, the determined optimization apparatus 408 may execute arithmetic operation of the combinatorial optimization problem by the partition mode determined for the optimization apparatus 408.

Consequently, it is possible to perform arithmetic operation of the combinatorial optimization problem using the optimization apparatus 408 set to a partition mode according to the scale or the requested accuracy of the problem. Therefore, the range of hardware resources to be utilized upon arithmetic operation may be selected appropriately in response to the scale or the requested accuracy of the problem and the arithmetic operation performance may be increased to achieve higher speed arithmetic operation processing.

Further, with the optimization problem arithmetic apparatus 101, information relating to the partition modes that define logical division states individually of the plurality of optimization apparatuses 408 may be updated in response to a change of the partition modes of the optimization apparatuses 408 to determined partition modes.

Consequently, information relating to the partition modes individually of a plurality of optimization apparatuses 408 may be updated in response to execution situations individually of the plurality of optimization apparatuses 408. For example, if processes are accumulated in a processing queue of a certain optimization apparatus 408 and increase the waiting time, the partition mode of another optimization apparatus 408 whose utilization ratio is lower is changed and information relating to the partition modes individually of the plurality of optimization apparatuses 408 is updated.

Further, with the optimization problem arithmetic apparatus 101, it is possible to decide based on utilization information of the plurality of optimization apparatuses 408 whether or not there is an increase or decrease in the number of optimization apparatuses 408 to be used and increase or decrease the number of optimization apparatuses 408 to be used in response to a result of the decision.

Consequently, the number of hardware resources to be used may be controlled in response to a utilization situation of the plurality of optimization apparatuses 408. For example, when the utilization ratio of the plurality of optimization apparatuses 408 is low as a whole, it is possible to place one of the optimization apparatuses 408 into a sleep state to make a spare apparatus 409 and suppress the power consumption of the optimization problem arithmetic apparatus 101.

Further, with the optimization problem arithmetic apparatus 101, in the case where the number of optimization apparatuses 408 to be utilized is increased, a partition mode for the added optimization apparatus 408 may be set. For example, the optimization problem arithmetic apparatus 101 sets a partition mode determined in advance to the added optimization apparatus 408.

This makes it possible to use the added optimization apparatus 408 in an arbitrary partition mode determined by a manager of the optimization problem arithmetic apparatus 101 or the like.

Further, with the optimization problem arithmetic apparatus 101, from among optimization apparatuses 408 to which a partition mode by which a problem of a scale equal to or greater than the scale of a combinatorial optimization problem can be solved is set, an optimization apparatus 408 in which the maximum scale of a problem that can be solved is in the minimum may be determined to the optimization apparatus 408 to which the combinatorial optimization problem is to be assigned.

This makes it possible to suppress the range of hardware resources to be utilized upon arithmetic operation of a combinatorial optimization problem to the minimum and suppress useless DMA transfer and so forth thereby to increase the arithmetic operation performance.

Further, with the optimization problem arithmetic apparatus 101, an optimization apparatus 408 to which a combinatorial optimization problem is to be assigned may be determined further based on information relating to execution situations individually of the plurality of optimization apparatuses 408.

This makes it possible to preferentially assign a combinatorial optimization problem to free units that are not executing a problem or units of an optimization apparatus 408 in which the number of problems accumulated in its queue is small. Therefore, when arithmetic operation of a combinatorial optimization problem is to be executed, it is possible to suppress such a situation that waiting time occurs and delays starting of arithmetic operation processing.

Further, with the optimization problem arithmetic apparatus 101, an optimization apparatus 408 in which a partition mode in which a problem of an accuracy equal to or greater than a requested accuracy of a combinatorial optimization problem can be solved is set may be determined to an optimization apparatus 408 to which the combinatorial optimization problem is to be assigned.

This makes it possible to appropriately select a range of hardware resources to be utilized upon arithmetic operation to efficiently solve a combinatorial optimization problem in response to the requested accuracy of the combinatorial optimization problem.

It is to be noted that the optimization problem arithmetic method described in the description of the present embodiment may be implemented by a program prepared in advance and executed by a computer such as a personal computer or a work station. The present optimization problem arithmetic program is recorded in a computer-readable recording medium such as a hard disk, a flexible disk, a CD-ROM, a magneto-optical disk (MO), a DVD or a USB memory and is executed by reading out from the recording medium by a computer. Further, the preset optimization problem arithmetic program may be delivered through a network such as the Internet.

Further, the functional units of the optimization problem arithmetic apparatus 101 described hereinabove in the description of the present embodiment may be implemented also by an application specific IC such as a standard cell or a structured application specific integrated circuit (ASIC) or a programmable logic device (PLD) such as an FPGA.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A computer-implemented optimization problem arithmetic method comprising:
   determining, based on management information indicating a partition mode that defines a logically divided state of each of a plurality of arithmetic circuits and utilization information relating to each of the plurality of arithmetic circuits, the partition mode of each of the plurality of arithmetic circuits;
   receiving a combinatorial optimization problem whose solution is represented with a combination of values of a plurality of bits;
   selecting, based on a number of the plurality of bits and a magnitude of an interaction between the plurality of bits and the partition mode, a first arithmetic circuit from among the plurality of arithmetic circuits; and
   causing the selected first arithmetic circuit to determine the combination of values of the plurality of bits as the solution for the combinatorial optimization problem based on a first partition mode determined as the partition mode of the first arithmetic circuit.

2. The optimization problem arithmetic method according to claim 1, further comprising:
   updating the management information when the partition mode of a second arithmetic circuit from among the plurality of arithmetic circuits is changed.

3. The optimization problem arithmetic method according to claim 1, further comprising:
   changing, based on the utilization information, a number of arithmetic circuits to be utilized from among the plurality of arithmetic circuits.

4. The optimization problem arithmetic method according to claim 3, wherein the changing of the number of arithmetic circuits includes setting, when the number of arithmetic circuits to be utilized is increased, the partition mode of a newly added arithmetic circuit.

5. The optimization problem arithmetic method according to claim 4, wherein the partition mode of the newly added arithmetic circuit is a specific partition mode.

6. The optimization problem arithmetic method according to claim 1, wherein the utilization information includes an execution history of combinatorial optimization problems whose arithmetic operation has been executed by each of the plurality of arithmetic circuits.

7. The optimization problem arithmetic method according to claim 1, wherein the utilization information includes information relating to a processing queue of each of the plurality of arithmetic circuits.

8. The optimization problem arithmetic method according to claim 1, wherein the utilization information includes information relating to a utilization situation of each of the plurality of arithmetic circuits.

9. An optimization problem arithmetic apparatus comprising:
   a memory; and
   a processor coupled to the memory and the processor configured to:
      determine, based on management information indicating a partition mode that defines a logically divided state of each of a plurality of arithmetic circuits and utilization information relating to each of the plurality of arithmetic circuits, the partition mode of each of the plurality of arithmetic circuits,
      receive a combinatorial optimization problem whose solution is represented with a combination of values of a plurality of bits,
      select, based on a number of the plurality of bits and a magnitude of an interaction between the plurality of bits and the partition mode, a first arithmetic circuit from among the plurality of arithmetic circuits, and
      cause the selected first arithmetic circuit to determine the combination of values of the plurality of bits as the solution for the combinatorial optimization problem based on a first partition mode determined as the partition mode of the first arithmetic circuit.

10. The optimization problem arithmetic apparatus according to claim 9, wherein the processor is further configured to update the management information when the partition mode of a second arithmetic circuit from among the plurality of arithmetic circuits is changed.

11. The optimization problem arithmetic apparatus according to claim 9, wherein the processor is further configured to perform, based on the utilization information, modification of a number of arithmetic circuits to be utilized from among the plurality of arithmetic circuits.

12. The optimization problem arithmetic apparatus according to claim 11, wherein the modification of the number of arithmetic circuits includes setting, when the number of arithmetic circuits to be utilized is increased, the partition mode of a newly added arithmetic circuit.

13. The optimization problem arithmetic apparatus according to claim 12, wherein the partition mode of the newly added arithmetic circuit is a specific partition mode.

14. The optimization problem arithmetic apparatus according to claim 9, wherein the utilization information includes an execution history of combinatorial optimization problems whose arithmetic operation has been executed by each of the plurality of arithmetic circuits.

15. The optimization problem arithmetic apparatus according to claim 9, wherein the utilization information includes information relating to a processing queue of each of the plurality of arithmetic circuits.

16. The optimization problem arithmetic apparatus according to claim 9, wherein the utilization information includes information relating to a utilization situation of each of the plurality of arithmetic circuits.

17. A non-transitory computer-readable medium storing instructions executable by one or more computers, the instructions comprising:
one or more instructions for determining, based on management information indicating a partition mode that defines a logically divided state of each of a plurality of arithmetic circuits and utilization information relating to each of the plurality of arithmetic circuits, the partition mode of each of the plurality of arithmetic circuits;
one or more instructions for receiving a combinatorial optimization problem whose solution is represented with a combination of values of a plurality of bits;
one or more instructions for selecting, based on a number of the plurality of bits and a magnitude of an interaction between the plurality of bits and the partition mode, a first arithmetic circuit from among the plurality of arithmetic circuits; and
one or more instructions for causing the selected first arithmetic circuit to determine the combination of values of the plurality of bits as the solution for the combinatorial optimization problem based on a first partition mode determined as the partition mode of the first arithmetic circuit.

\* \* \* \* \*